BOWLING SCORER UTILIZING SEMICONDUCTOR ELEMENTS

Filed April 9, 1963 24 Sheets-Sheet 1

INVENTORS
ROBERT W. HOUSE
ROLLAND D. KING
ROBERT F. ROLLER
DAVID A. WILLIAMS
By Hofgren, Wegner, Allen, Stellman & McCord
Attys.

BOWLING SCORER UTILIZING SEMICONDUCTOR ELEMENTS

Filed April 9, 1963

BOWLING SCORER UTILIZING SEMICONDUCTOR ELEMENTS

Filed April 9, 1963

24 Sheets-Sheet 11

March 26, 1968 R. W. HOUSE ETAL 3,375,352
BOWLING SCORER UTILIZING SEMICONDUCTOR ELEMENTS
Filed April 9, 1963 24 Sheets-Sheet 22
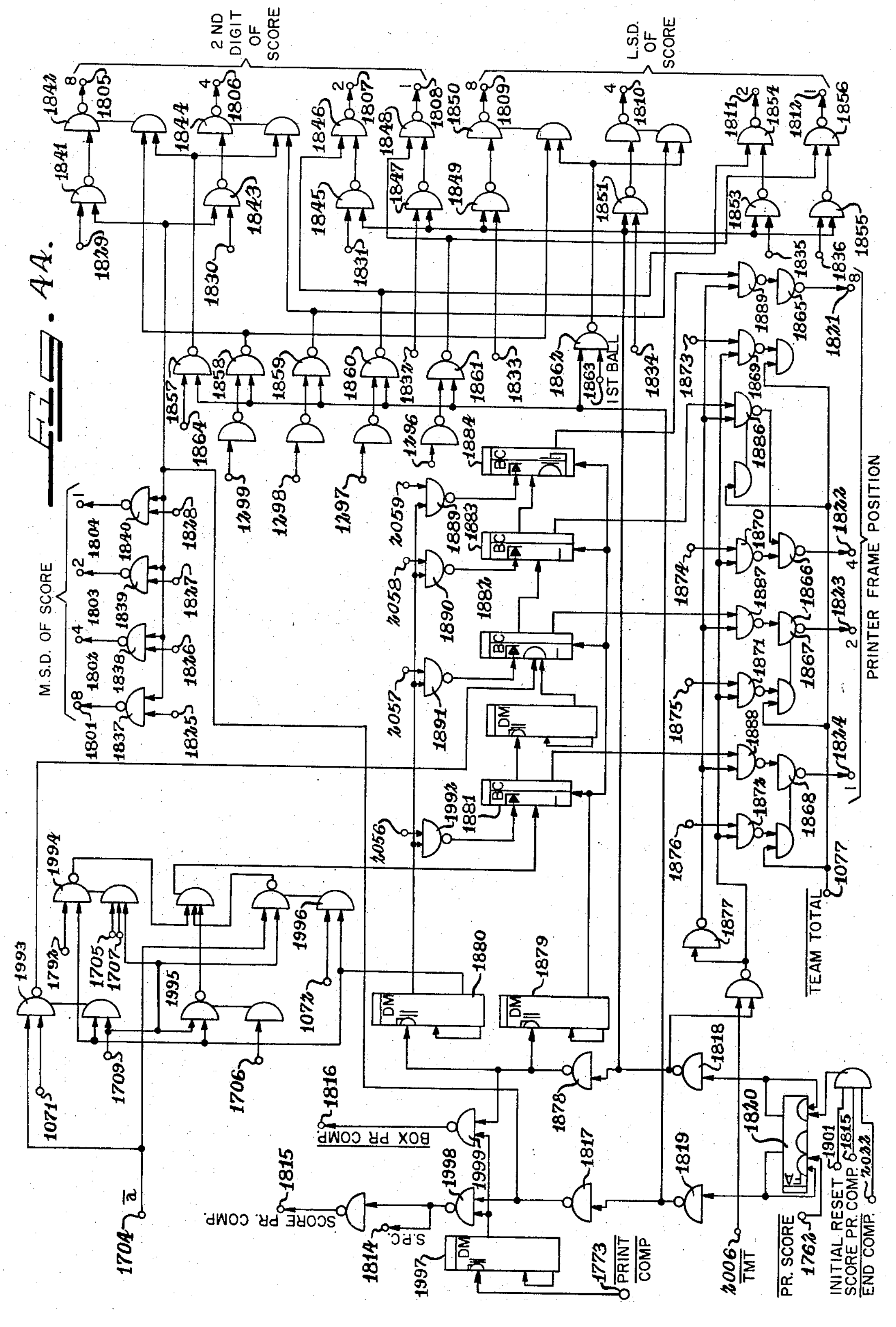
FIG. AA.

United States Patent Office 3,375,352
Patented Mar. 26, 1968

3,375,352
BOWLING SCORER UTILIZING SEMICONDUCTOR ELEMENTS

Robert W. House, Rolland D. King, and Robert F. Roller, Columbus, Ohio, and David A. Williams, Largo, Fla., assignors, by mesne assignments, to Brunswick Corporation, Muskegon, Mich., a corporation of Delaware
Filed Apr. 9, 1963, Ser. No. 271,644
51 Claims. (Cl. 235—151)

The present invention relates to automatic bowling scorers and more particularly to electrical bowling scoring devices capable of producing information required for a complete bowling score sheet.

In the past, bowling score devices of electrical-mechanical construction had been devised to permit the automatic calculation and display of only part of the bowling score information which is normally manually placed upon a score sheet during the progress of a bowling game. These devices have contained only the score at a particular point in the game rather than providing information for a complete score sheet. These devices have not accurately calculated and displayed all of the special marks associated with the bowling game such as strikes, spares, fouls, ball scores, and team mark totals. For the purpose of official league bowling contests, it is particularly desirable that a complete bowling score sheet be produced and be in a form which can be preserved for an indefinite period of time as a permanent record of a game. The present invention overcomes the limitation of past scorers in that it does for the first time compute and provide all the necessary scoring information that is required to print a complete bowling score sheet.

As is well known to those skilled in the art, both mechanical computers and electrical-mechanical computers require a substantial amount of preventative maintenance and are subject to definite reliability limitations. The recent rapid advancement in the semiconductor electronic art has made it possible to produce computer elements which require substantially no preventative maintenance and have a much higher reliability than either mechanical or electrical-mechanical devices. The present invention reduces preventative maintenance to a minimum and increases the reliability of a scorer over devices presently utilized in the art by providing a scorer which is constructed almost entirely of semiconductor electronic elements.

In the past, it has been necessary to provide a separate score computer for each bowling lane or pair of lanes with a score totaling register in each such computer for each player participating in a game. The present invention overcomes these past limitations by providing an electronic scorer which is capable of computing the scoring in a multiplicity of bowling games which are simultaneously occurring on a number of bowling lanes. In addition, the present invention overcomes the necessity of providing a number of totalizing registers by a construction which requires only one totalizing register and a storage memory which stores a code word for the scoring information that is associated with each player as the bowling game progresses.

It is, therefore, an object of the present invention to provide a new and improved automatic scorer.

Another object is to provide a completely electrical bowling scorer.

A further object of the present invention is to provide an electrical scorer for computing bowling scores and special marks which consists almost entirely of semiconductor electronic elements.

An additional object is to provide a bowling scorer which totalizes pinfalls to produce bowling scores in a single register for a multiplicity of players.

A principal object of the preseit invention is to provide an electronic scorer wherein the status of each player's game and his determinable earned score at any such status of the game are recorded in a code word with an identification for the player which may be transferred between an operating register and a memory.

Still another object is to provide a computer for a bowling scoer which will compute all of the scores and marks which are necessary to produce a complete bowling score sheet in accordance with the American Bowling Congress rules.

Another principal object of the present invention is to provide a computer in a bowling scorer which will provide sufficient information for a printing device to directly print a bowling score sheet with all of the required scores and special marks as a bowling game progresses.

Still another object is to provide a bowling scorer which is capable of separately processing the score resulting from the pinfall of each ball rolled on a lane and switching to process other scores resulting from pinfall on another lane between the processing of the scores of a player's first ball and second ball pinfall in any frame of play on the aforementioned lane.

A still further object is to provide a bowling scorer capable of processing scores resulting from the simultaneous bowling on two lanes of two members of a single team.

An additional object is to provide a bowling scorer that utilizes a stored state of a player's game, frame and ball indication, player's earned score and pinfall count from the most recently rolled ball to selected one or more formulas for computing frame, mark and team total scores.

A further object is to provide a bowling scorer that sequences bowling lanes between games during team play.

Another object is to provide a scorer which completes a full cycle of score computation resulting from the roll of a ball following an electrical power failure during the cycle in order to prevent any loss of scoring information.

A still further object is to provide a first and second ball indicator in a bowling scorer.

Yet another object of the present invention is to provide an electrical scorer which can compute bowling scores including all ball, frame, special marks, and total scores for a multiplicity of bowlers playing games simultaneously on a plurality of bowling lanes.

Further objects and advantages will become apparent from the following detailed description taken in connection with the accompanying drawings, in which:

FIGURE 44 is a schematic diagram of an output unit shown in FIGURE 4;

Figure 1:
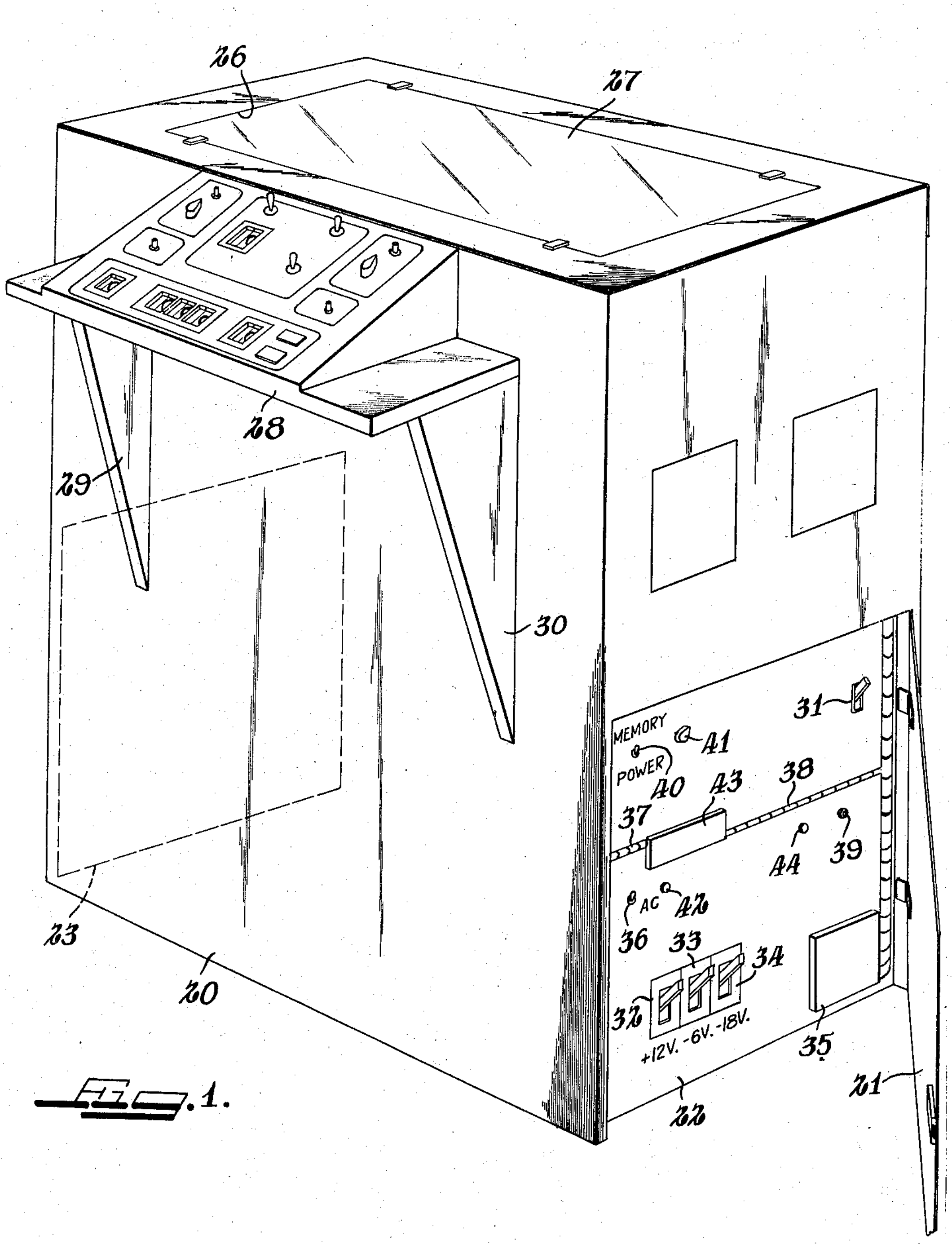
FIGURE 1 is a perspective view of a computer portion of an embodiment of the present invention.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

TABLE OF CONTENTS

| | Column |
|---|---|
| Structure | 5 |
| Major Units | 8 |
| Logic Circuits | 11 |
| NAND gate | 11 |
| AND gate | 12 |
| Binary Counters | 12 |
| Delay Multivibrator | 14 |
| AC Bistable Multivibrator | 14 |
| Simple Bistable Multivibrator | 15 |
| Power Amplifier | 15 |
| Universal Bistable Multivibrator | 15 |
| Shift Register | 16 |
| Multivibrator Clock | 16 |
| Solenoid Driver | 16 |
| Player Sequencer | 17 |
| Pinfall Sequencer | 23 |
| Comparator | 27 |
| Shift Counter | 28 |
| Correction and Out-of-Turn Unit | 31 |
| Memory Circuits | 33 |
| Memory Reset Unit | 34 |
| State and Output Control Unit | 35 |
| Arithmetic Unit | 42 |
| Timing Unit | 55 |
| Output Unit | 56 |
| Output Indicator Unit | 60 |
| Power Circuits | 62 |
| Scorer Operation | 64 |
| Placing the Scorer in Standby Condition | 64 |
| Placing the Scorer in Operating Status | 64 |
| First Ball Following an Open Frame | 67 |
| First Ball Following a Single Strike | 69 |
| Second Ball Following an Open Frame | 70 |
| First Ball Following Two Strikes | 71 |
| Second Ball Following a Strike | 73 |
| First Ball Following a Spare | 75 |
| Stop State | 77 |
| Out-of-Turn Bowling | 79 |
| Correction Procedure | 80 |
| De-energizing the Scorer | 80 |

In the prior art devices, it has been customary to provide a mechanical or an electrical-mechanical register for totalizing pinfall to arrive at a total score for each individual player at any point in a bowling game and to provide additional registers which indicate the point to which each player has progressed in the game. Thus, in the prior devices, it was necessary to have a totalizing register for each player on each and every alley and to provide a register or similar device for each player to keep track of his individual progress in the game. Thus, at least two register-type devices were required for each and every player. In the present invention, a single operating register is used for totalizing pinfall for multiplicity of players playing simultaneously on a plurality of bowling lanes. Therefore, the weight, size, and complexity of the totalizing register system are greatly reduced as compared to the prior art devices. For the purpose of illustration, an embodiment of the present invention is shown in the drawings which can accommodate up to a maximum number of six players for each of two bowling teams alternatively on two bowling lanes. As each frame score is totalized in the operating register for a player and as each team's total score is totalized in the same register, an output unit may provide suitable score and positioning control signals to any output indicator such as a projection display device or a printer which prints a bowling score sheet. The computer also produces a mark total as the game progresses which may be sent by the output unit to a projection display device or the printer.

The single register must contain the proper code word for each individual player at the time the computer attempts to add further pinfall data to the code word in the register. In order to provide for the storage of the code words upon which computations are not momentarily being made, an electronic memory is connected to the register from which a shift control may transfer the code words to the register as they are called for by various player indicating units.

STRUCTURE

Figure 2:
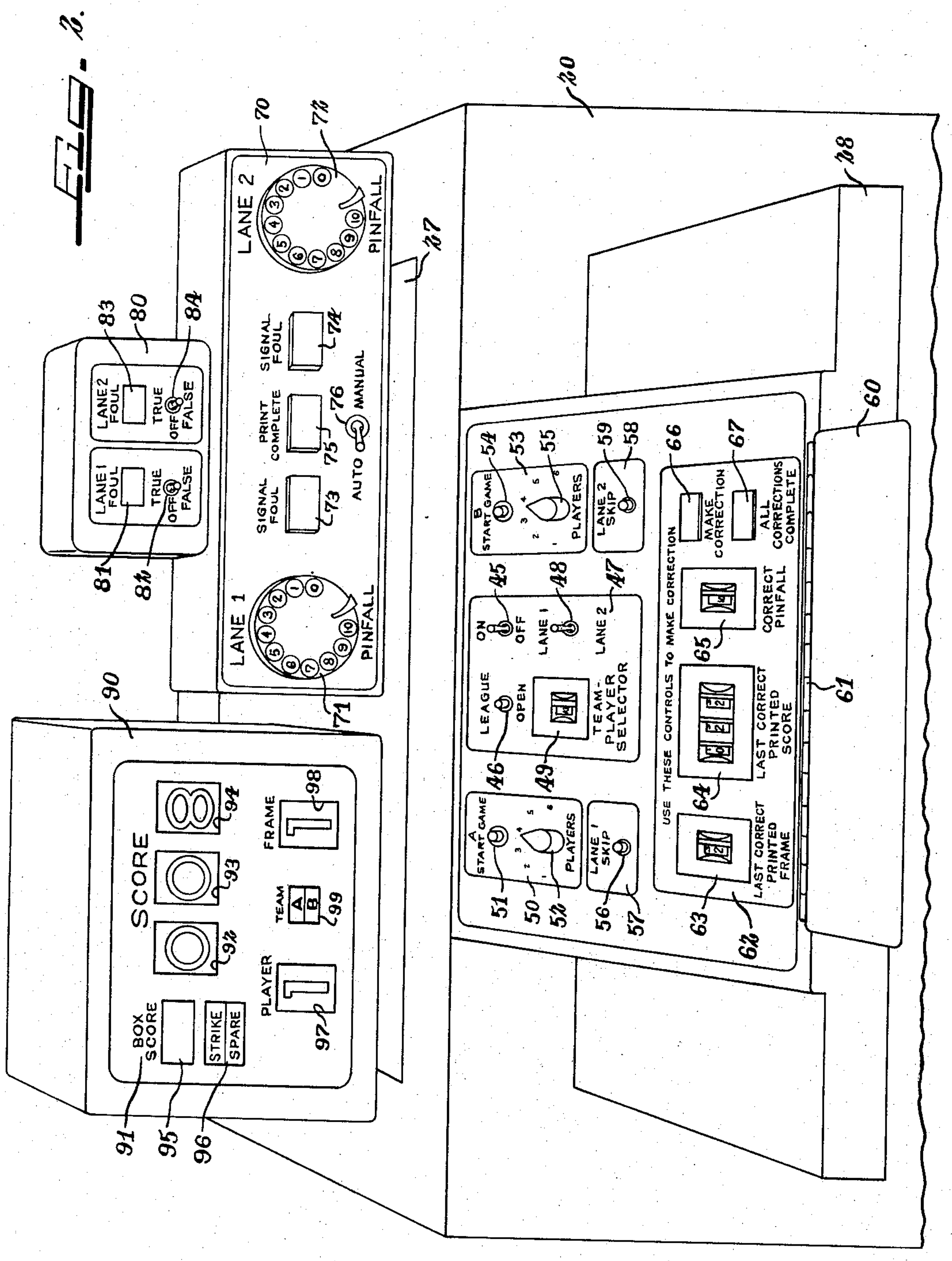
FIGURE 2 is a perspective view of the portion of the computer ahown in FIGURE 1 and other units comprising an embodiment of the invention.
Figure 3:
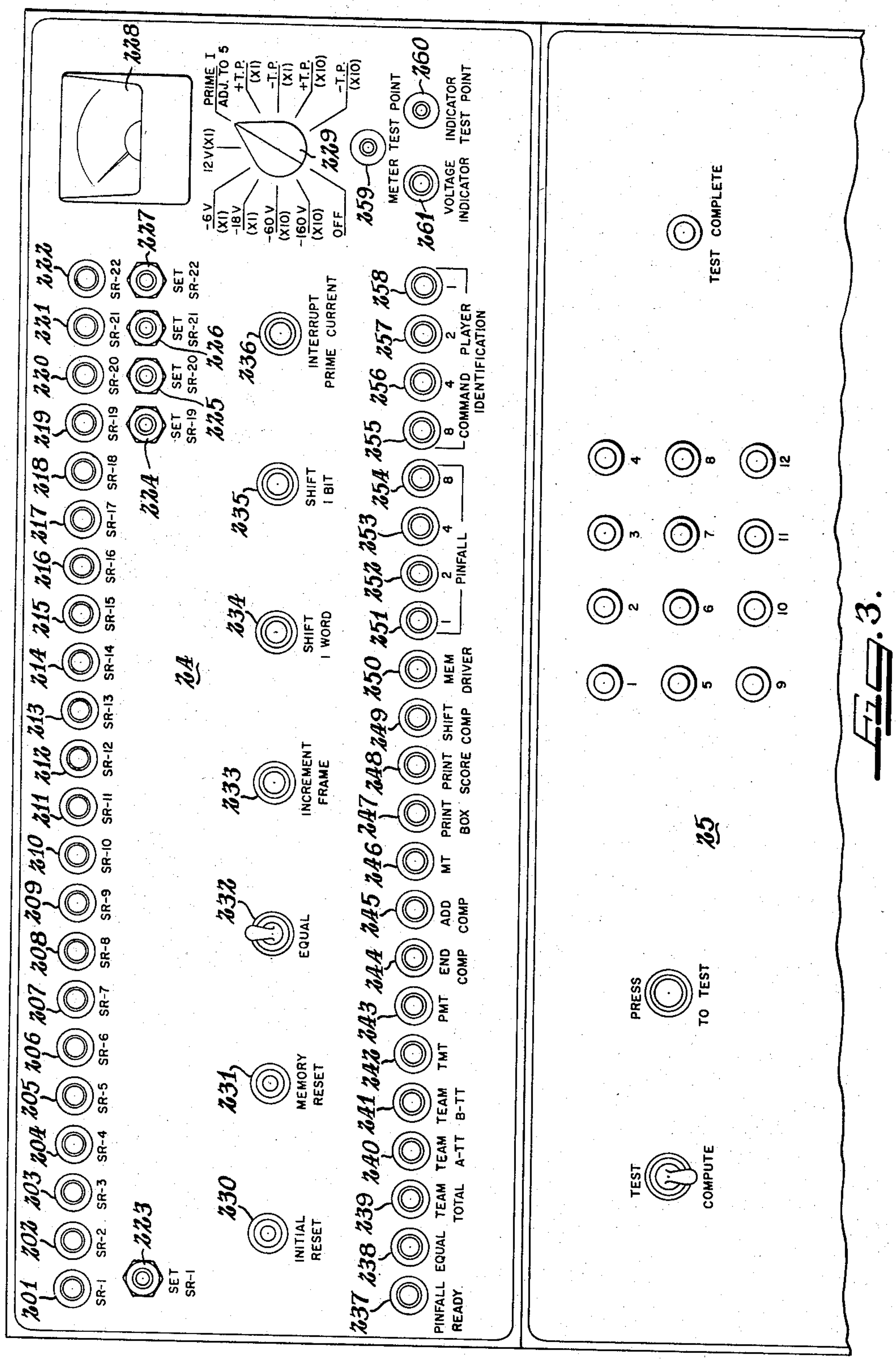
FIGURE 3 is a perspective view of a test panel forming a portion of the computer portion illustrated in FIGURE 1.

Referring first to FIGURES 1, 2, and 3, a housing cabinet 20 contains an electric bowling score computer and has a door 21 which provides access to a power supply panel 22 and a door 23 which provides for access to a test panel 24 and a comparator tester panel 25 shown in FIGURE 3. An access opening 26 in the top of the cabinet is provided with a removable transparent glass panel 27 provided for observation of a large number of the printed circuit boards which constitute the electronic circuits of the computer. The cabinet top is hinged at the back and opens to permit servicing. A control panel 28 is secured to the front of the cabinet 20 and is supported by support members 29 and 30.

Referring now in particular to FIGURE 1, an AC power switch 36 is mounted near the top of panel 22 for energizing a main power supply of the computer and three DC current power switches 32, 33, and 34 are mounted side-by-side in the center of panel 22 for the purpose of energizing a plus 12 volt series of output terminals, a minus 6 volt series of output terminals, and a minus 18 volt series of output terminals on a terminal board 35. The switch 36 is normally in an "ON" position at all times since the power supply is usually controlled by a main power switch 31. Suitable cables (not shown) are connected to these terminals for the purpose of supplying plus 12 minus 6, and minus 18 volts to various binary computer components utilized in the coupling circuits of the computer as will be presently described in detail. The main power switch 31 is provided to energize components requiring alternating current in the computer scorer by energizing the main power supply. An AC indicator lamp 42 is lit when the switch 36 and switch 31 are in their "ON" positions. An input fuse holder 44 is installed in panel 22 to provide easy access to a fuse which protects the main power supply which is energized by switch 36. A DC fail light 39 is provided to indicate failure of any of the DC outputs of the main power supply. An additional terminal board 43, used for memory inputs, outputs and voltages, is provided on the power supply panel 22 to which are connected groups of cables 37 and 38. In the upper left-hand corner of panel 22 is located a memory power "ON" switch 40 and a "PRIME CURRENT ADJUST" knob 41 for the purpose of supplying power to an electrical serial memory and to adjust the prime current thereto, respectively, as will be presently described in greater detail.

Referring now specifically to FIGURE 2, a computer "POWER OFF-ON" switch 45, and a "LEAGUE-OPEN BOWL" switch 46 are provided at the top of a panel portion 47 located centrally in the control panel 28 to allow an operator to energize the scorer and to select either league or open bowling. Since the embodiment of the invention being presently described is designated to compute scoring on two lanes, these lanes may be used either for open bowling where a bowler remains on the same lane for an entire game or in league play where a bowler alternates with his team between lanes with each new frame of the game. Thus, by the proper positioning of switch 46, the scorer will be set for league or open bowling as desired. Below these switches on the panel portion 47 are located an "OUT-OF-TURN PLAYER LANE" switch 48 and a rotating "OUT-OF-TURN PLAYER" selector thumbwheel switch 49 which are utilized to indicate to the scorer which bowler is bowling out-of-turn and on which lane he is bowling. Selector thumbwheel switch 49 is also used in making corrections.

A Team A panel portion 50 has mounted thereon a "START GAME" switch 51 and a "TEAM SIZE" selector switch 52, and a Team B panel portion 53 has mounted thereon a "START GAME" switch 54 and a "TEAM SIZE" selector switch 55. Whenever a team in league bowling is ready to start their game, they push their appropriate "START GAME" switch and set their "TEAM SIZE" selector switch to the number of players on their team.

A lane 1 panel portion 56 has a push button "SKIP NEXT BOWLER" switch 58 mounted thereon and a lane 2 panel portion 58 has a press "SKIP NEXT BOWLER" switch 59 mounted thereon. Whenever a bowler who should be the next bowler to bowl in normal sequence on a particular lane is not going to bowl in his proper turn for some reason, the "SKIP NEXT BOWLER" switch for the appropriate lane is pressed so that the computer may go on to scoring the pinfall of a subsequent bowler as will be described in greater detail presently.

A cover plate 60 is hinged at 61 so that it will normally cover a score correction panel 62 as shown in FIGURE 1. Cover plate 60 is shown turned down in FIGURE 2 to reveal the correction panel portion 62. As shown in FIGURE 2 mounted in the correction panel portion 62 is a frame thumbwheel switch 63 for indicating a last correct printed frame, a series of three thumbwheel switches 64 for indicating a last correct printed score, a pinfall thumbwheel switch 65 for indicating a correct pinfall count, and a "MAKE CORRECTION" push button switch 66 which is constructed of a yellow transparent material and has a light positioned behind to illuminate it, and a green "ALL CORRECTIONS COMPLETE" lighted panel switch 67. All of the switches are utilized in correcting a printed or displayed score if such should be necessary. Their utilization in the circuits of the scorer will presently be described in detail.

Placed on top of the computer cabinet 20 in FIGURE 2 are an input panel 70, a judge's foul control box 80, and an output indicator unit 90. Mounted on the front of the panel 70 are a pair of telephone dial switches 71 and 72 for indicating pinfall on lane 1 and lane 2, respectively. Between these telephone dial switches are mounted a "PRESS TO SIGNAL FOUL, LANE 1" switch 73, a "PRESS TO SIGNAL FOUL, LANE 2" switch 74, and a "PRINT COMPLETE" press switch 75. Both press switches 73 and 74 are of the illuminated panel type having illuminated lamps positioned therebehind. An "AUTOMATIC-MANUAL" switch 76 is mounted on the simulator to indicate whether the "PRINT COMPLETE" signal is to be generated by the scorer internally or by the manually operated "PRINT COMPLETE" switch 75. The manually operated switch may be replaced by an external source such as a printer or pinsetter. In the present embodiment, the switch 75 is connected to generate this signal when switch 76 is in its "MANUAL" position.

The judge's foul control box 80 has a lane 1 foul panel on which is mounted a green illumination panel 81 with a light behind it which is switched on when a possible foul has been indicated and a "TRUE-FALSE DECISION" switch 82 and a lane 2 foul panel having a similar green illumination panel 83 with a foul light and a similar "TRUE-FALSE DECISION" switch 84. When a possible foul has been indicated automatically on a lane, the respective panel 81 or 83 will be illuminated and a judge will decide whether it was a true or a false foul and indicate his decision by switching the appropriate switch 82 or 84 to its "TRUE" or "FALSE" foul indication position.

An output indicator unit 90 has a front panel with apertures 92, 93 and 94 therein through which are displayed a player's ball, frame or total score or a team total score by a set of three self-decoding binary-to-decimal read-out units mounted behind a panel portion 91. An indicator light panel 95 indicates whether a box score or other score is appearing in apertures 92–94. A light indicator panel 96 indicates that a strike or a spare has been made when it is illuminated. An aperture 97 has a self-decoding digital decimal read-out unit indicating the vertical position (player number) on the score sheet of the score appearing in apertures 92–94 and an aperture 98 has another self-decoding digital decimal read-out unit displaying the frame number to which the score appearing in apertures 92–94 applies. A pair of light panels 99 for Team A and Team B indicate to which team the information appearing in the various apertures (and lights) on panel 91 apply.

The scoring computer housed in cabinet 20 can receive inputs from an automatic detection device mounted on an automatic pinsetter or at another position where it can detect the number of pins downed following the roll of the ball and provide a pulse for each pin downed. In the embodiment of the invention shown in the drawings, the input panel 70 is the system for supplying pinfall to a computer. It is a manually operated device which may be continuously utilized in lieu of an automatic detection device or only as test equipment for checking the operation of the scorer. The output indicator unit 90 may be used as a normal display or only as a method for checking the output signals of the computer. These signals may be used to display the score of a game as it progresses on a score sheet type score board or operate a printer to print a complete bowling score sheet. Thus, the output indicator unit 90 is not in itself a complete score sheet display device but it does simulate a score sheet type display or a printer for printing a complete score sheet in that it utilizes all the signals which the computer must provide to control such devices and does display the information on its panel which these devices would display. It differs from these devices in that the scores and other information displayed on its panel are removed as new scores are computed so that they may, in turn, be displayed thereon rather than forming a permanent record of all information computed and read out of the electronic scoring computer in cabinet 20. Thus, output indicating unit 90 forms a compact output test unit for the computer and an indicator which displays score information that can be manually copied onto a score sheet.

Figure 4:
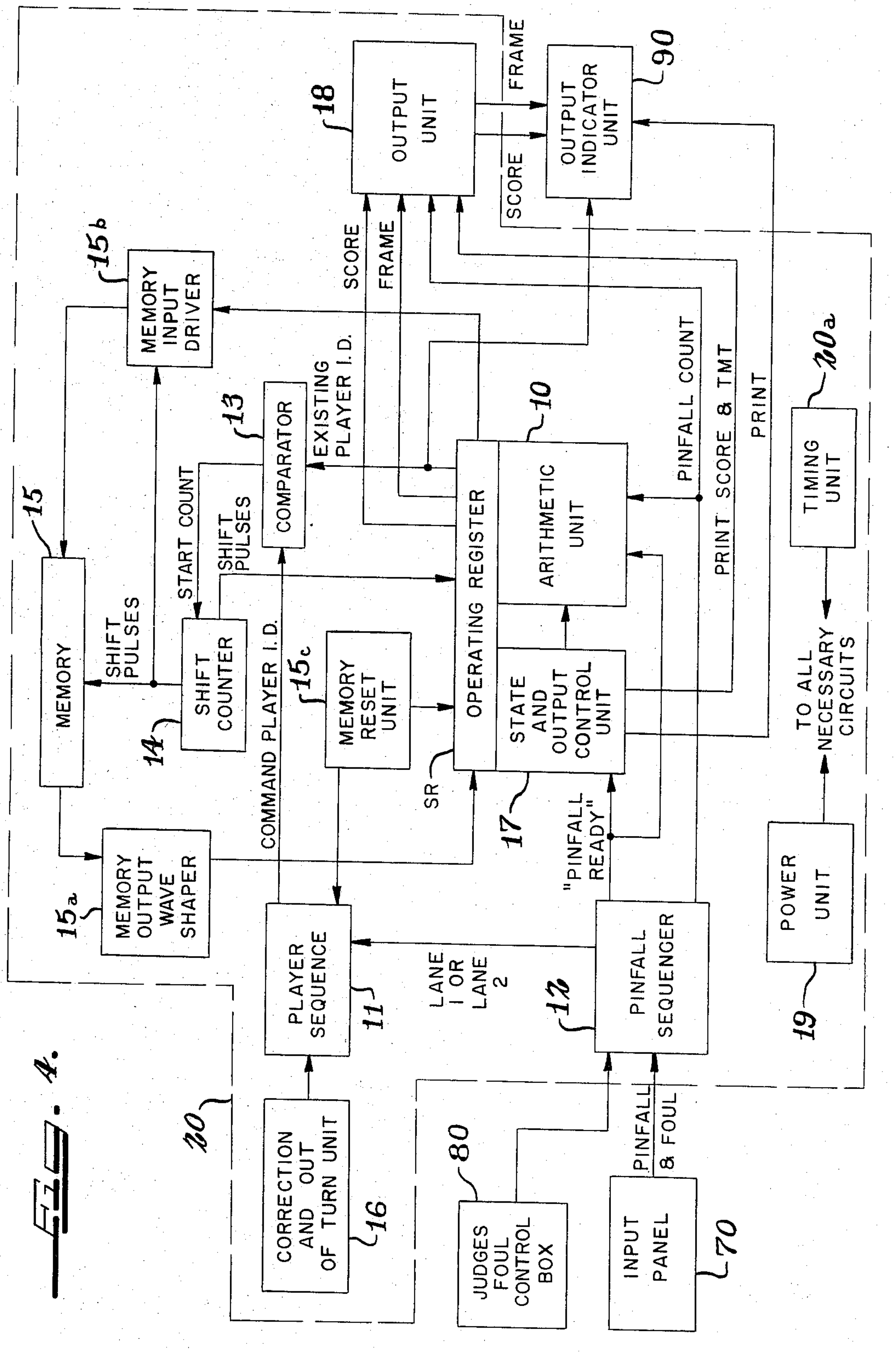
FIGURE 4 is a block diagram of the principal circuits of the embodiment of the present invention illustrated in FIGURES 1–3.

Referring now specifically to the test panel 24 illustrated in FIGURE 3, a series of twenty-two neon lamps 201–222 are mounted across the top of the panel to display the binary word contained in an operating register SR which is connected to an arithmetic unit 10 and a state and output control unit 17 as indicated in FIGURE 4. The neon lamps are labeled SR–1 to SR–22 to indicate the number of the bit position in the operating register. Each lamp is connected to an output point of one of a set of twenty-two multivibrators, whose label it bears. These multivibrators compose the operating register of twenty-two bit positions. Each lamp will be lit whenever the corresponding multivibrator contains a binary one. A press switch labeled "SET SR–1" 223 is located on the panel immediately below the SR–1 neon lamp 201. In like manner, a series of four press switches 224–227 labeled 'SET SR–19, SET SR–20, SET SR–21, and SET SR–22," respectively, are located below the set of corresponding neon lamps 219–222. The five aforementioned press switches enable loading of information into the operating register. Each is connected to the multivibrator whose label it bears in a manner that will place a binary one in the multivibrator when the switch is pressed. By pressing the appropriate switches 219–222 for each binary one in a player's or team's identification binary code, each word may be identified thereafter with a particular player or team. A DC voltmeter is mounted in the upper right-hand corner of panel 24 to record the internal voltages applied to different points of the computer as selected by a selector switch 229 located directly below the voltmeter. Across the center of the panel are a number of switches which are utilized in properly loading a memory unit of the computer as will presently be described. These switches are a press switch 230 labeled "INITIAL RESET," a press switch 231 labeled "MEMORY RESET," a toggle switch 232 labeled "EQUAL," a press switch 233 labeled "INCREMENT FRAME," a press switch 234 labeled "SHIFT ONE WORD," a press switch 235 labeled "SHIFT ONE BIT," and a press switch 236 labeled "INTERRUPT PRIME CIRCUIT."

Across the bottom of panel 24 are a series of neon lights which indicate certain operations are occurring in the computer. These are a "PINFALL READY" light 237, an "EQUAL" light 238, a "TEAM TOTAL" light 239, a "TEAM A TEAM TOTAL" light 240, a "TEAM B TEAM TOTAL" light 241, a "TEAM OR MARK TOTAL" light 242, a "PRINT MARK TOTAL" light 243, an "END COMPUTATION" light 244, an "ADD COMPLETE" light 245, a "MARK TOTAL" light 246, a "PRINT BOX SCORE" light 247, a "PRINT SCORE" light 248, a "SHIFT COMPLETE" light 249, a "MEMORY DRIVER" light 250, a set of four pinfall count lights 251–254 labeled "1, 2, 4 and 8" to indicate their respective binary weights, and a set of four "COMMAND PLAYER IDENTIFICATION" lights 255–258 which are labeled "8, 4, 2, and 1," respectively, to indicate their binary weights. Lights 237 through 250 are connected in the circuits of the scorer so that they are lit when the respective labeled operations are in progress. Lights 251–254 are connected to a binary counter-register composed of multivibrators 1001–1004 in arithmetic unit 10, and lights 255–258 are connected to thumbwheel 49 so that they indicate the presence of a binary one in the respective components. In the lower right-hand corner of panel 24 are located two test points 259 and 260 and a voltage indicator light 261.

The comparator tester panel 25 is not a portion of the present invention, but has been indicated on the drawing to show that space is reserved within the scoring computer cabinet 20 for the installation of such a device.

MAJOR UNITS

With the aid of FIGURE 4, the major units of the scorer will be described prior to a detailed circuit description of any particular unit. FIGURE 4 indicates the units contained within the housing cabinet 20 by enclosing them within a dashed line. The input panel 70, the judge's foul control box 80, and the output indicator unit 90 are the only units of the scorer outside the cabinet 20. The central units of the computer are the operating register SR, the arithmetic unit 10 and the state and output control unit 17. The operating register SR consists of twenty-two bistable multivibrators SR–1 to SR–22 for holding a twenty-two bit binary word. They are shown in detail in FIGURES 36, 39, and 40. The state and output control unit 17 is connected to the first three multivibrators SR–1 to SR–3, and the arithmetic unit 10 is connected to the last nineteen multivibrators SR–4 to SR–22. The arithmetic unit 10 contains the necessary computing circuitry to add a correct multiple of a pinfall count for either or both a first and second pinfall of any given frame. In order to provide a counter for totalizing the number of pins downed by each ball rolled, a suitable detection device is placed, either in an automatic pinsetting machine or at some other location in the vicinity of each pin to detect the fact that that particular pin has been knocked down following the rolling of a ball, or the input panel 70 is manually operated. Upon detecting a downed pin, each individual detecting device will provide a pulse which may be transmitted to a pinfall sequencer unit 12. The automatic pinfall detectors may be of any conventional design presently utilized in the art, such as microswitches on the pinsetter which will actuate circuitry to provide a pulse when the detectors are sequentially sampled following the rolling of a bowling ball. Therefore, a pinfall detection system or a pinfall simulator of any conventional design which will send a series of one to eleven pulses to the pinfall sequencer 12 may be employed. The input panel 70 provides this function in FIGURE 4. Sequential pulses are produced by manually operated telephone switches mounted on the panel. A variation between one to eleven pulses is required to record zero to ten pins downed as a result of the rolling of each ball, a single pulse being the indication that no pins were downed. A counter in the pinfall sequencer 12 totalizes the number of pulses received as a result of each pinfall and stores this information until required by the arithmetic unit 10.

A player sequencer 11 determines which bowler is bowling on each lane. When a series of pinfall pulses are received from the lane-pair simulator 70 in the pinfall sequencer 12, this sequencer takes cognizance of the lane from which the pinfall was received and sends this information to the player sequencer 11. The player sequencer 11 sends the player's identification for the player bowling on that lane to a comparator 13. The comparator 13 receives from the operating register SR the identity of the bowler's code word in the operating register and compares it to the identity of the bowler received from the player sequencer 11. If the two identities are the same, no further action is taken by the comparator. However, if they are not identical, the comparator sends an actuation signal to a shift counter 14 which in turns sends a shift signal to the arithmetic unit 10 and a magnetic core memory 15. The operating register SR and the magnetic core memory 15 are serially connected in a loop with a memory output waveshaper 15a and a memory input driver 15b in order that three hundred fifty-two binary bits from sixteen words of twenty-two bits each. The shift counter counts the number of bits in a code word until a new code word is in the operating register and then stops the shifting of code words from and to the register. The identity portion of the new code word in the register is then sent to the comparator 13 to compare it with the identity received from the player sequencer 11. By this means, the code words in the register of the arithmetic unit 10 are shifted sequentially until a code word arises in the register which is identical to the one being called for by the player sequencer 11. The words received by the register in the arithmetic unit 10 are shifted bit-by-bit back into the serial memory 15 as each subsequent word is shifted into the register. The cooperating operation of the arithmetic unit 10 and the memory 15 will be described in greater detail presently.

The code word provided for each player is twenty-two bits in length and utilizes standard binary form. The first four bits of a word carry the player's identification. An additional ten bits indicate the player's score after the crediting of the last ball rolled. Five of the remaining eight bits serve to indicate which ball is to be rolled next; the last three bits indicate the state after the last ball, which is used to aid in determination of the scoring of the next ball.

The player sequencer 11 determines the number of the player bowling on a particular lane as long as all players bowl in proper order. In order to provide for the identification of a player who is bowling out-of-turn and to correct the score of any player whose scores might have been incorrectly computed, a correction and out-of-turn unit 16 is utilized to override the player sequencer 11 and send a signal to the comparator 13 containing the identification of a player who is bowling out-of-turn, or it may send the identification of a player whose score is to be corrected on the score sheet.

Whenever a word is held in the register SR as commanded by either the player sequencer 11 or the correction and out-of-turn unit 16, the state and output control unit 17 receives the coded state from the code word. In turn, it actuates circuits in the arithmetic unit 10 which properly credit the pinfall resulting from the rolling of a player's latest ball. The score portion of the word is then modified to indicate the proper new score, and the ball and frame portion is modified to indicate the correct new ball and frame number. The state and output control unit 17 also directs that the correct pinfall ball information be provided to an output unit 18. Thus, as each ball is rolled by a player, which results in the necessity to add a multiple of that ball pinfall to the player's score, the state and output control unit directs the circuits in the arithmetic unit to properly credit the pinfall, plus any bonus to the score. In the case of a first ball, it is not always appropriate to add the pinfall to the last frame score. In such a case the state and output control unit will command the arithmetic unit to wait until the second ball of the frame has been rolled and then to add the appropriate multiple pinfall resulting from both balls to the previous frame score which is recorded in the word in the register. The computer is free to score other player's pinfall until the second ball is rolled. Appropriate ball and frame and total score data are provided by the operating register SR to the output unit 18. Ball-by-ball pinfall count information (box scores) is provided by the pinfall sequencer 12. At appropriate times, as commanded by the state and output control unit, frame position (horizontal position) information as well as player and score information is provided to the output indicator unit 90. As aforementioned, the output indicator unit 90 may be replaced by a printer, which prints the scores directly on a score sheet, or by other display systems. The arithmetic unit computes scores in accordance with the computation instructions of the state and output control unit 17. The output unit 18 receives scoring data from the register SR and pinfall sequencer 12 and passes it on to the output indicator unit or other display system in accordance with the commands of the state and output control unit 17. Thus, the output unit 18 issues either a box score, a frame score, a mark total, or a team total score at the commands of the state and output control unit 17, and the position data indicates the respective score sheet positions of each box, frame, mark total, or team total score. Player identification (vertical score position) and a "Print" (or display) signal is received by the output indicator unit 90 directly from the state and output control unit 17. When the output indicator unit 90 receives the "Print" signal, it displays the score information available from the output unit 18 at the position indicated by the output unit 18 and the operating register SR.

In addition to the major units previously mentioned, the scorer has three supporting major units. These are a memory reset unit 15*c*, a timing unit 20*a*, and a power unit 19. The memory reset unit 15*c* sequentially calls the player and key words for each team into the operating register SR and resets these words prior to beginning each game. The timing unit 20*a* provides the master timing pulses utilized by the other major components and also produces a number of "End Computation" signals. The "End Computation" signals are provided to a number of the other major units to indicate the completion of each computation cycle of the scorer. The power unit 19 contains both the normal power supply circuits for all of the units in the scorer and also contains an emergency battery power supply source which it utilizes to complete a computation cycle of the scorer whenever a power line interruption occurs. Unless a computation cycle is completed without power interruption, a portion of the scoring information may be lost. However, the power unit 19, by providing uninterrupted power to the other units of the scorer, assures that all scoring words are returned to the memory 15 where they are magnetically stored without loss even if the electrical power remains off for a considerable period of time.

To broadly summarize the major units of the scorer, a means of supplying pinfall information is provided by the input panel 70, a means for receiving pinfall information is provided by the pinfall sequencer 12, a computation means is provided by the arithmetic unit 10, a score storage means is provided by the combination of the memory 15, the operating register SR, the memory output waveshaper 15*a* and the memory input driver 15*b* a central means is provided by the state and output control unit 17 and the output unit 18, and an indicating means is provided by the output indicator unit 90. In addition, a means for identifying players and lanes is provided by the player sequencer 11 and the correction and out-of-turn unit 16.

*Logic circuits*

A dozen binary logic circuits are utilized repeatedly throughout the embodiment of the invention shown in the drawings, FIGURES 29–46. Since most of these twelve logic circuits are utilized repeatedly, each of these circuits will now be described together with the symbol representing it. The terminals on each symbol bear the same numbers as the terminals in the respective logic circuit. The logic circuits are shown in the odd-numbered figures from FIGURES 5–27, and their respective symbolic representations are shown in the even-numbered figures between 6 and 28. Following the description of the logic circuits and the symbols representing them, the units shown in block form in FIGURE 4 will each be described in detail utilizing these twelve logic circuit symbols.

NAND GATE

Figure 5:
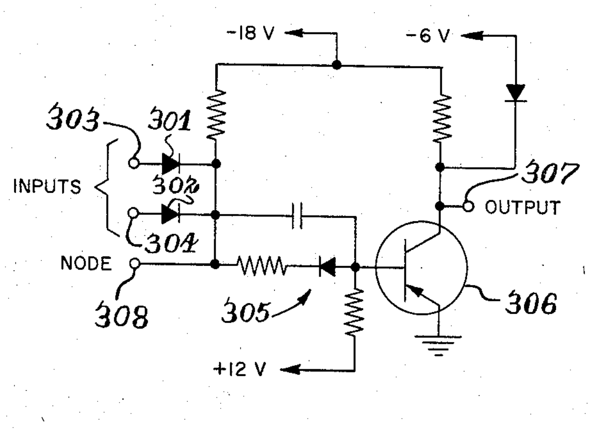
FIGURE 5 is a schematic diagram of a NAND gate utilized in the embodiment of the invention illustrated in FIGURES 1–4.

FIGURE 5 shows a NAND gate circuit which consists of two input diodes 301 and 302 having input terminals 303 and 304, respectively, which are connected to form an AND gate, the output of which is connected into a conventional transistor inverter amplifier generally indicated at 305. The transistor amplifier 305 includes a transistor 306 and an output terminal 307 connected to the collector of the transistor. Throughout the scorer, a binary one will be a minus six volts and a binary zero will be zero voltage which is circuit ground. It will be recognized by those skilled in the art that whenever a minus six volts appears on terminals 303 and 304, the output appearing on terminal 307 is clamped through the transistor 306 to zero volt or binary zero. However, when any of the input terminals 303 and 304 goes to zero volt or binary zero, the transistor 306 is turned "OFF" and the output voltage falls to the clamp voltage of minus six volts or binary one. Thus, the NAND gate performs the function of an AND gate followed by the inversion of the AND gate output. Since many of the elements constituting the various logic circuits such as the presently described NAND gate constitute basic circuit design well known to those skilled in the art, only the special features of these circuits will be described in complete detail.

Figure 6:
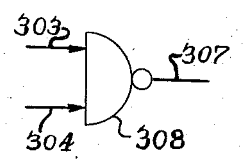
FIGURE 6 is a logic circuit symbol representing the NAND gate circuit illustrated in FIGURE 5.

FIGURE 6 shows the symbol which represents the NAND gate whose circuit is shown in FIGURE 5. The input terminals 303 and 304, the output terminal 307, and a node terminal 308 bear the same terminal numerals as the terminals they represent in the circuit of FIGURE 5. Whenever a NAND gate or other logic circuit is represented by a symbol in the general circuit drawings of the scorer, the symbol will carry the same terminal as those shown in FIGURE 6 so that the function of each terminal may be quickly identified by referring back to the appropriate logic circuit schematic drawing such as FIGURE 5 for the NAND gate. The entire symbol for a logic circuit such as that of the NAND gate of FIGURE 6 will bear a different numeral for each such circuit utilized in the scorer. Thus, the terminal 304, as identified by its position on the symbol of NAND gate 1211, refers to the second of the input terminals for a NAND gate which is distinctly identified by the numeral 1211. The terminal numeral will appear only on those symbols where it may be required to avoid confusion.

AND GATE

Figure 7:
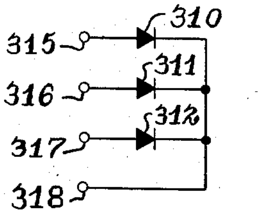
FIGURE 7 is a schematic drawing of an AND gate utilized in the embodiment of the invention illustrated in FIGURES 1–4.

The AND gates utilized in the present scorer consist of diode clusters as are shown in FIGURE 7. A series of diodes 310, 311, and 312 have their inputs connected to a series of terminals 315, 316, and 317 and their output connected to a comon terminal 318. The AND gates shown in FIGURE 7 will be recognized by those skilled in the art as being of conventional design except for the fact that they do not have the appropriate voltages applied thereto. In the present bowling scorer, AND gates are utilized principally in conjunction with a NAND gate of the type shown in FIGURE 5 to increase the number of inputs to the AND gate portion of the NAND gate. This is accomplished by connecting the node output terminal 318 to the node terminal 308 of the NAND gate. Although three input terminals with their respective three diodes are shown in FIGURE 7, any number of inputs and diodes up to and including eight may be formed into a diode cluster to increase the number of inputs to the NAND gate shown in FIGURE 5.

Figure 8:
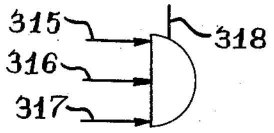
FIGURE 8 is a logic circuit symbol representing the AND gate illustrated in FIGURE 7.

The symbol for this AND gate is shown in FIGURE 8 with the output node terminal shown as emerging from one side of the semicircular symbol. Thus, at frequent points throughout the electronic scorer, the symbol shown in FIGURE 8 will have terminal 318 connected to the terminal 308 of the symbol shown in FIGURE 6 merely to increase the number of inputs which then would include 303, 304, 315, 316, and 317. Whenever the symbol shown in FIGURE 8 is so used as an adjunct to the symbol of FIGURE 6, both symbols will be often referred to as a single NAND gate having a single identification numeral.

BINARY COUNTER

A bistable multivibrator is frequently utilized as a binary counter for a single bit of standard binary code. A pair of transistors 320 and 321 are connected to form a conventional bistable multivibrator.

Figure 9:
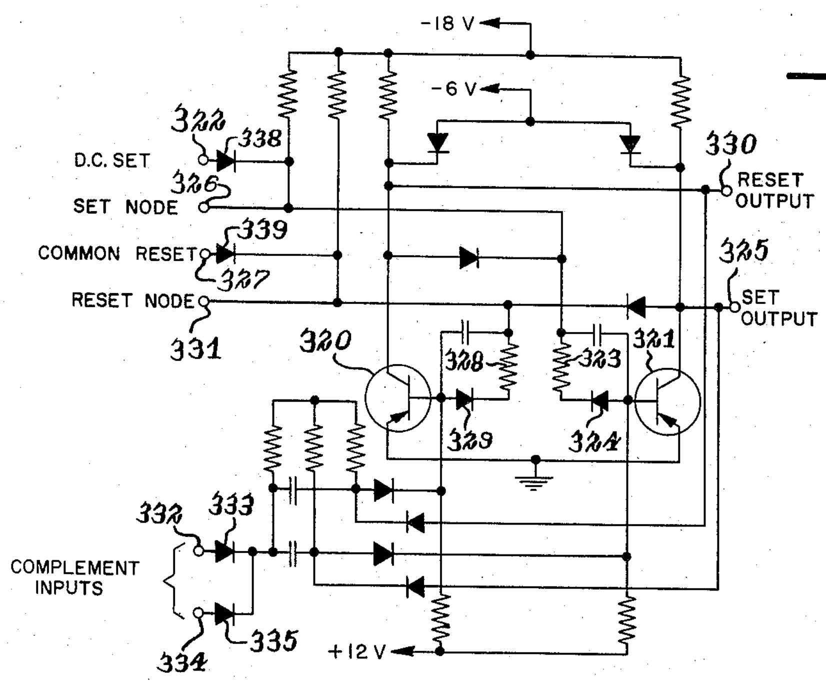
FIGURE 9 is a schematic drawing of a binary counter circuit utilized in the embodiment of the invention illustrated in FIGURES 1–4.

The bistable multivibrator circuit shown in FIGURE 9 is essentially two NAND circuits interconnected to act as a multivibrator and provided with a complement input circuit so that they may be operated as a binary counter. A DC set terminal 322 is connected through a diode to a resistor 323 and a diode 324 to the base of transistor 321 in order to turn "ON" that transistor. Transistor 321 has its collector connected to a set output terminal 325. In order to expand the number of input terminals, a DC set node terminal 326 is also connected to the base of transistor 321 through resistor 323 and rectifier 324. Diode clusters such as illustrated in FIGURE 7 may be connected to terminal 326 to expand the inputs to a desired number. A DC reset terminal 327 is connected through a resistor 328 and a diode 329 to the base of the transistor 320 to turn this transistor "ON." A collector of transistor 320 is connected to a reset output terminal 330. A DC reset node 331 is also connected to the base of transistor 320 through the resistor 328 and the diode 329 to provide additional reset input terminals when a diode cluster such as shown in FIGURE 7 is connected to the reset node 331. In addition to these terminals, a complement input terminal 332 is provided which is connected to a diode 333. Each pulse of a train of pulses received on terminal 322 will cause whichever transistor is conducting to be cut off and the other transistor to conduct, thereby causing the multivibrator to operate as a binary counter. The connecting complement network is of standard construction well known in the art. An additional complementary input terminal 334 is connected through a rectifier 335 to a common junction point 336. Thus, the elements of terminal 332, rectifier 333, terminal 334, rectifier 335, and common junction 336 form an AND gate or diode cluster equivalent to the circuit shown in FIGURE 7.

Figure 10:
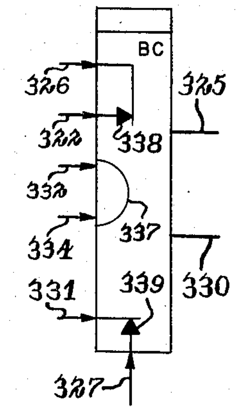
FIGURE 10 is a logic circuit symbol representing the binary counter illustrated in FIGURE 9.

FIGURE 10 shows the symbol representing the bistable multivibrator circuit illustrated in FIGURE 9. Corresponding terminals bear the same numerals. The complement input terminals 332 and 334 that are connected to form an AND gate are connected in the symbol to a portion of a rectangle which has a semicircle 337 therein to indicate that the terminals 332 and 334 are joined together in an AND gate or diode cluster. In some of the bistable multivibrators constructed in accordance with the circuit of FIGURE 9, terminal 334 and rectifier 335 are not included, leaving only a single complement input terminal 332 and its connected rectifier 333. In such instances the semicircle 337 is not found in the symbol for the circuit as illustrated in FIGURE 10. Only the single complement input terminal 332 is shown. A rectifier symbol 338 is shown in FIGURE 10 as being connected to terminal 322 to indicate that that terminal may be directly connected to an input wire from another logic circuit. Terminal 326 has no such rectifier shown for it requires that it be connected to an external diode or diode cluster. In like manner, a rectifier 339 is shown connected to DC reset terminal 327 while no rectifier is shown connected to the DC reset node terminal 331.

Figures 11, 12:
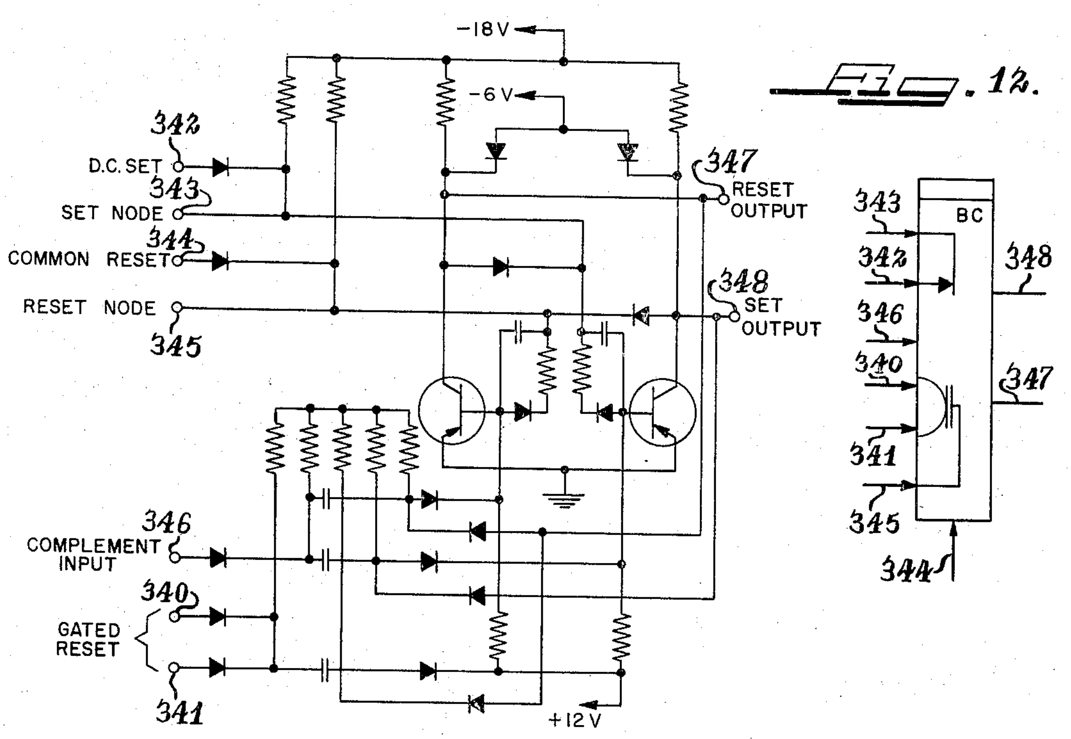
FIGURE 11 is a schematic drawing of another binary counter utilized in the embodiment of the invention illustrated in FIGURES 1–4.
FIGURE 12 is a logic circuit symbol representing the binary counter illustrated in FIGURE 11.

Referring now to FIGURE 11, another bistable multivibrator circuit is illustrated which is identical to the bistable multivibrator circuit of FIGURE 9, except that the complement input circuitry to a pair of transistors has been modified in a conventional manner to accept a gated AC reset input circuit provided from gated input terminals 340 and 341.

The circuit illustrated in FIGURE 11 has a set of terminals similar to those of FIGURE 9 consisting of a DC set terminal 342, a DC set node terminal 343, a DC reset terminal 344, a DC reset node terminal 345, a complement input terminal 346, a reset output terminal 347, and a set output terminal 348. When either the terminal 332 or 334 in the circuit of FIGURE 9 is at minus six volts (binary one) or open, a positive transition at the other input produces the same effect as a simple complement input. In this way, either terminal 332 or 324 may be utilized as a simple complement input. When one of these inputs is at circuit ground (binary zero) a positive transition on the other input will have no effect. Thus, one terminal may be utilized to inhibit the input received on the other terminal. The operation of terminals 340 and 341 and their associated circuitry illustrated in FIGURE 11 differs from the circuitry shown in FIGURE 9 in that a positive transition applied to either terminal 340 or 341 when the multivibrator is in the set condition will reset it. Inputs applied to terminal 346 are received by the multivibrator as simple complement inputs and the multivibrator will count up such pulses received on terminal 346 in the ordinary binary method.

The symbol for the circuit illustrated in FIGURE 11 is shown in FIGURE 12. It is similar to the symbol shown in FIGURE 10 except that the semicircle representing the gated complement inputs is not present since they are not utilized in the bistable multivibrator of FIGURE 11 and a semicircle 349 with a condenser symbol 350 has been added to indicate that terminals 340 and 341 are gated AC reset terminals.

The binary counters shown in FIGURES 9–12 are always arranged in either a three or four bit binary counter register. In the four bit register, three multivibrators are the type shown in FIGURES 9 and 10, and the fourth multivibrator is the "gated reset type" shown in FIGURES 11 and 12.

DELAY MULTIVIBRATOR

Figures 13, 14:
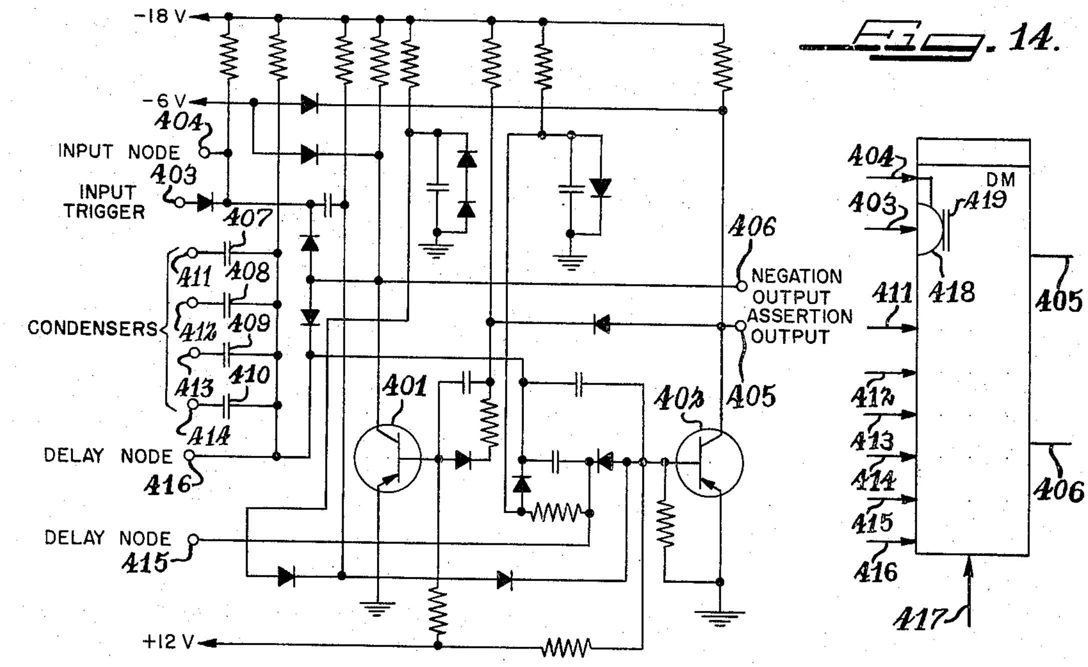
FIGURE 13 is a schematic drawing of a delay multivibrator utilized in the embodiment of the invention illustrated in FIGURES 1–4.
FIGURE 14 is a logic circuit symbol representing the delay multivibrator illustrated in FIGURE 13.

FIGURE 13 illustrates a one-shot multivibrator capable of generating pulses in a variety of widths which utilizes a pair of transistors 401 and 402 connected in a conventional one-shot multivibrator circuit. The circuit has an input trigger terminal 403 and an input node terminal 404 which may be utilized to expand the input to an input gate having up to ten inputs. An assertion output terminal 405 and a negation output terminal 406 are provided to provide either a binary one or a binary zero during a delay period. A number of capacitors 407–410 are provided in the circuit and connected to a set of terminals 411–414. Pulse widths are controlled by connecting one or more of these capacitors by use of their respective terminals to a delay node terminal 415. Two or more of these capacitors may be connected simultaneously and the resulting pulse will have a width equal to the sum of those associated with the individual node capacitors. A delay terminal 416 is provided for the purpose of connecting external capacitors in the circuit which will give delay periods which cannot be provided by combinations of capacitors 407–410. These external capacitors are connected between the terminals 415 and 416.

FIGURE 14 illustrates the symbol representing FIGURE 13. The terminals 411–414 are shown within a rectangle 417 to indicate that internal circuit connections are to be made to these terminals if it is desired to use any one or more of them. Terminals 415 and 416 are located outside the rectangle 417 to indicate that they may be connected to external circuitry which, of course, will be in the form of external capacitors. Terminal 403 is connected to a semicircle to indicate that it is in the form of an AND gate input and terminal 404 is connected to the edge of a semicircle symbol 418 to indicate that it is a node connection to the input AND gate. A condenser symbol 419 is connected to the AND gate symbol 418 to illustrate that the output of the AND gate is AC coupled to a base of one of the transistors forming the one-shot multivibrator.

AC BISTABLE MULTIVIBRATOR

Figure 15:
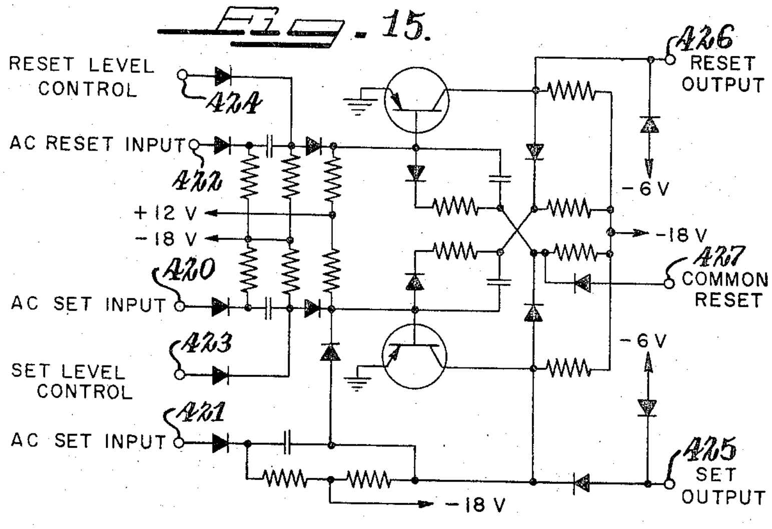
FIGURE 15 is a schematic drawing of an AC bistable multivibrator utilized in the embodiment of the invention allustrated in FIGURES 1–4.

FIGURE 15 illustrates a bistable multivibrator whose input may be wired to perform any logical function required of a bistable multivibrator often referred to as a "FLIP-FLOP" such as counting, shifting, accumulating, etc. The circuit is provided with a pair of AC coupled set input terminals 420 and 421, and an AC coupled reset input terminal 422. The circuit is also provided with a set level control terminal 423 and a reset level control terminal 424 to allow gating of set and reset information. The output terminals consist of a set output terminal 425 and a reset output terminal 426. A DC reset input terminal 427 is also provided.

Figure 16:
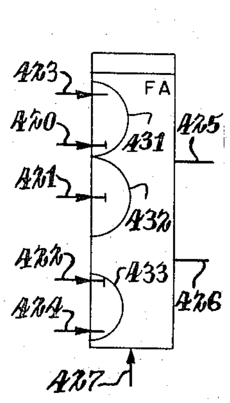
FIGURE 16 is a logic circuit symbol representing the AC bistable multivibrator illustrated in FIGURE 15.

The symbol representing the bistable multivibrator shown in FIGURE 15 is illustrated in FIGURE 16. The AC set and reset inputs are illustrated by key symbols 420 and 421, and 422 in semicircular gate symbols 431, 432, and 433, respectively, to indicate that they are AC inputs. Those with multiple inputs 431, 433 may be gated with level control signals. A logical one or open circuit on a level set or level control input inhibits the associated set or reset input. A logical zero or a grounded level set input enables the associated set or reset input to be effective.

SIMPLE BISTABLE MULTIVIBRATOR

Figure 17:
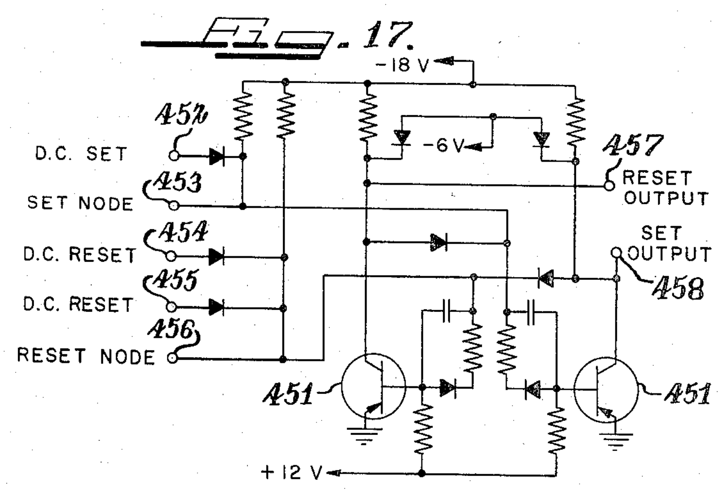
FIGURE 17 is a schematic drawing of a simple bistable multivibrator utilized in the embodiment of the invention illustrated in FIGURES 1–4.

A simple bistable multivibrator is shown in FIGURE 17 which is similar to the bistable multivibrator shown in FIGURES 9 and 11 with the exceptions that it does not contain complement input circuitry to a pair of transistors 450 and 451. It is, however, provided with a DC input set terminal 452, a DC input set node terminal 453 for the purpose of expanding the number of DC set inputs by use of a circuit such as shown in FIGURE 7, a pair of DC reset input terminals 454 and 455, a DC reset node terminal 456 to expand the number of DC reset input terminals when it is connected to an AND gate or diode cluster as shown in FIGURE 7, a reset output terminal 457, and a set output terminal 458.

Figure 18:
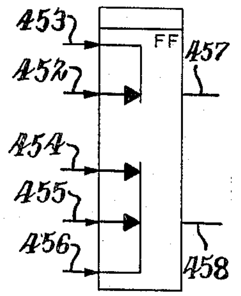
FIGURE 18 is a logic circuit symbol representing the simple bistable multivibrator illustrated in FIGURE 17.

The symbol representing the simple bistable multivibrator shown in FIGURE 17 is illustrated in FIGURE 18 with the DC input terminals and their respective node terminals shown in the previously described manner of having a rectifier symbol connected to each of the input terminals and no rectifier symbol connected to the node terminals.

POWER AMPLIFIER

Figure 19:
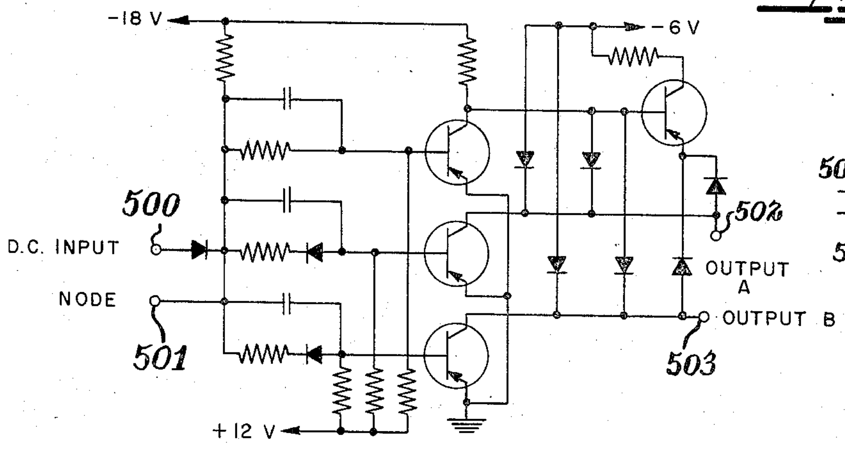
FIGURE 19 is a schematic drawing of a power amplifier utilized in the embodiment of the invention illustrated in FIGURES 1–4.

The power amplifier schematically shown in FIGURE 19 is of conventional transistor design having a DC input terminal 500, a DC input node terminal 501 capable of expanding the inputs to ten, and a pair of dual output terminals 502 and 503. Thus, the power amplifier is logically equivalent to the NAND gate illustrated in FIGURE 5, but is capable of driving a larger load than the NAND gate shown in FIGURE 5.

Figure 20:
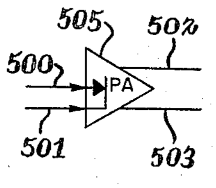
FIGURE 20 is a logic circuit symbol representing the power amplifier illustrated in FIGURE 19.

The symbol for the power amplifier illustrated in FIGURE 19 is shown in FIGURE 20. It consists of a triangle 505.

UNIVERSAL BISTABLE MULTIVIBRATOR

Figure 21:
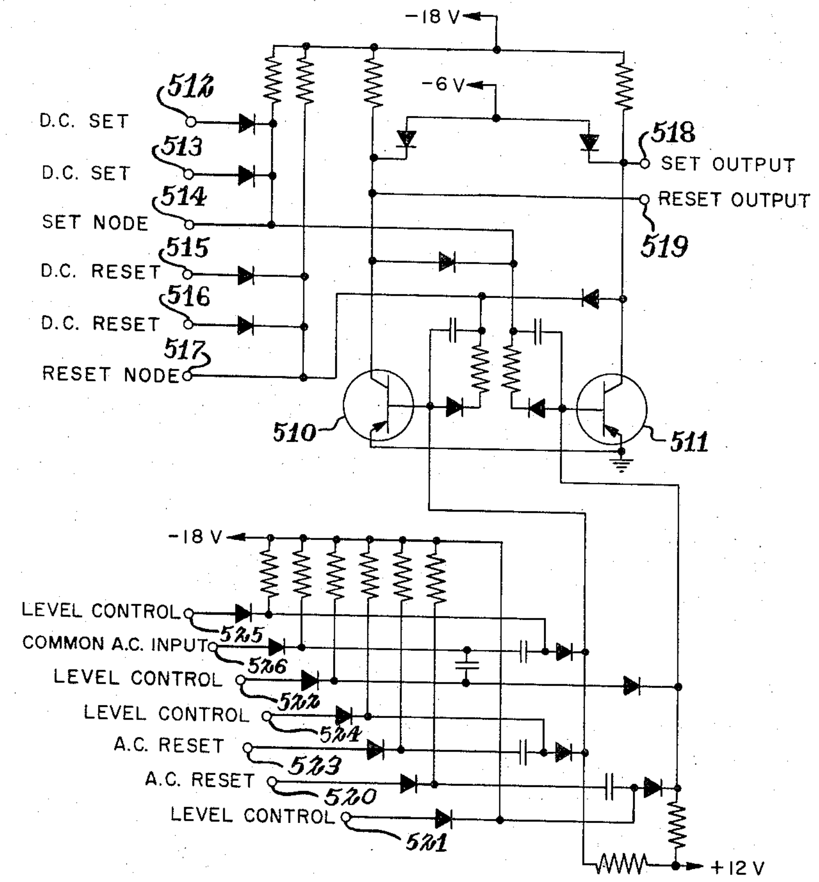
FIGURE 21 is a schematic drawing of a universal bistable multivibrator utilized in the embodiment of the invention illustrated in FIGURES 1–4.

A schematic drawing of a universal bistable multivibrator is shown in FIGURE 21. The universal multivibrator contains two transistors 510 and 511 wired into a conventional bistable multivibrator circuit similar to the bistable multivibrators illustrated in FIGURES 9 and 15 which, in addition to the basic bistable multivibrator construction, have circuitry to provide a series of level controls and AC set and reset controls. In a manner similar to the aforementioned bistable multivibrator logic circuits, a pair of DC set input terminals 512 and 513, a DC set node input terminal 514, a pair of DC reset input terminals 515 and 516, a DC reset node input terminal 517, a set output terminal 518 and a reset output terminal 519 are provided. An AC set input terminal 520 has gated with it a level control input terminal 521. An AC reset input terminal 523 is gated with a level control input terminal 524. A common AC input terminal 526 has associated with it two level controls 522 and 525 essentially similar in function to those associated with the AC set and reset input terminals. These serve to steer signals applied to the common AC input terminal 526 to either the set or reset side of the bistable multivibrator. Thus, when the associated level control inputs are connected to another bistable multibrator to form a shift register, the common AC input terminal 526 serves as a shift input. When the level control inputs are tied back to their own outputs, the circuit functions as a binary counter for pulses applied at its AC input. If the AC set and AC reset input terminals 520 and 523 are connected together, their function becomes identical to that of a common AC input terminal 526 except that AC loading is doubled.

Figure 22:
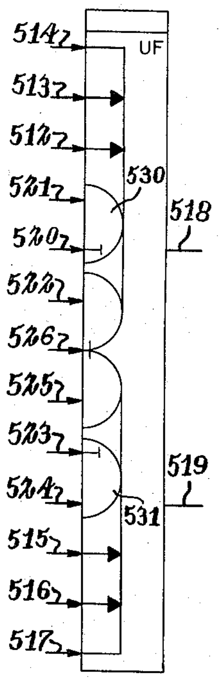
FIGURE 22 is a logic circuit symbol representing the universal bistable multivibrator illustrated in FIGURE 21.

The symbol representing the universal bistable multivibrator illustrated in FIGURE 21 is shown in FIGURE 22. The terminals 522 and 525, respectively, are shown connected to input gates which are in turn connected in parallel with AND gates 530 and 531, respectively. These inputs are also shown connected in parallel with the DC inputs 512, 513, 514, and 515, 516, and 517, respectively.

SHIFT REGISTER

Figure 23:
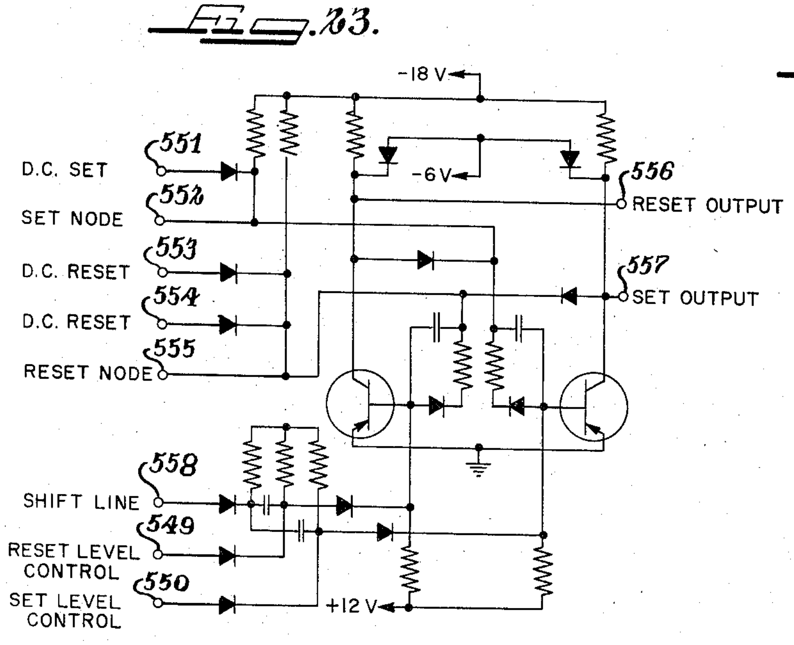
FIGURE 23 is a schematic drawing of a shift register utilized in the embodiment of the invention illustrated in FIGURES 1–4.

The shift register circuit shown in FIGURE 23 is a bistable multivibrator circuit similar to those shown in FIGURE 11 and FIGURE 17. It has the same number and type of DC input and output terminals as the bistable multivibrator illustrated in FIGURE 17. It has a DC set input terminal 551, a DC set input node 552, a pair of DC reset input terminals 553 and 554, a reset node terminal 555, a reset output terminal 556, and a set output terminal 557. A shift line terminal 558 is provided to cause shifting of information from one bistable multivibrator to a subsequent bistable multivibrator. This bistable multivibrator is used only in groups of four to form four-bit shift registers. A set level control terminal 550 and a reset level control terminal 549 are provided to connect to the respective output terminals of a previous mulivibrator in the shift registers. These terminals on the first multivibrator in the shift registers are connected to a source of binary bit information.

Figure 24:
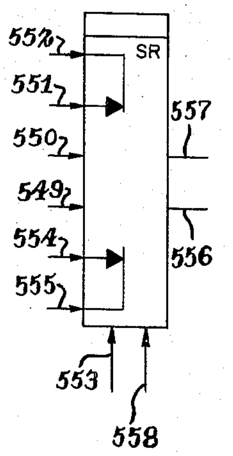
FIGURE 24 is a logic circuit symbol representing the shift register illustrated in FIGURE 23.

The symbol representing the shift register bistable multivibrator illustrated in FIGURE 23 is shown in FIGURE 24.

MULTIVIBRATOR CLOCK

Figure 25:
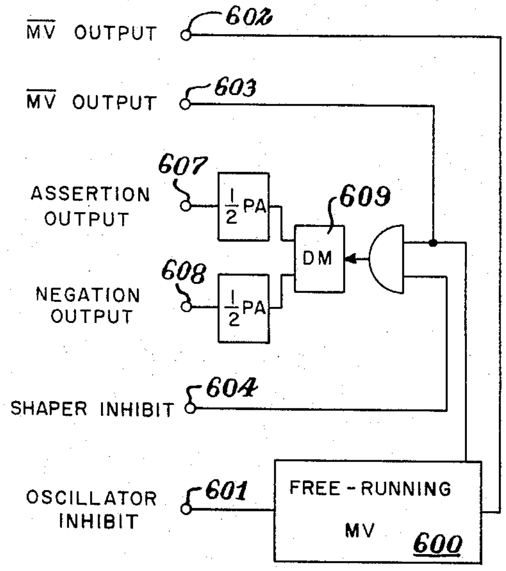
FIGURE 25 is a functional diagram of a multivibrator clock utilized in the embodiment of the invention illustrated in FIGURES 1–4.

The multivibrator clock shown functionally in FIGURE 25 is utilized as a clock source of conventional design. A free running multivibrator 600 is an astable circuit. Its operational frequency range is dependent upon the parallel capacitance combination selected by interconnecting specific timing terminals. The basic frequency of the multivibrator is one megacycle adjustable to 150 kilocycles without making any jumper connections. This frequency may be progressively reduced by making the connections to a terminal 606 and a terminal 605. A potentiometer (not shown) allows variation of the frequency within the selected range.

A start control input terminal 601 controls operation of the free running multivibrator 600. Logical zero (zero volt) applied to terminal 601 stops oscillation of the circuit. No connection to terminal 601 is equivalent to the application of a logical one and oscillation results.

A gate control input terminal 604 in coincidence with the output from astable multivibrator terminal 603 gates a pulse shaper 609, which is in the form of a delay multivibrator, forming an AND gate for negative logic. A logical zero input to the gate control terminal inhibits the pulse shaper; a logical one or no connection to pin 604 permits the pulse shaper to function. If the pulse shaper is inhibited to the gate control input terminal 604, the astable multivibrator 600 continues to run free. The multivibrator has a width node terminal 605, an external width node terminal 606, an assertion terminal 607, and a negation terminal 608.

Figure 26:
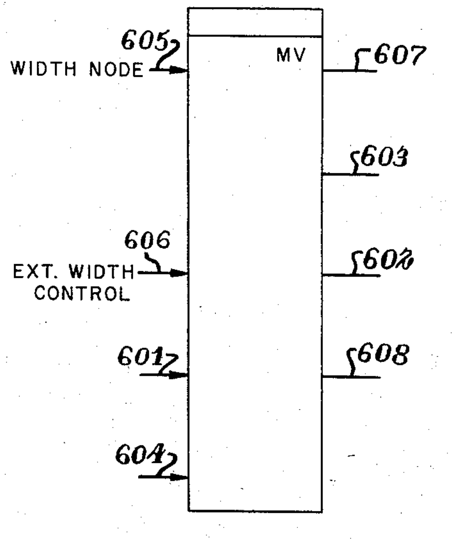
FIGURE 26 is a logic circuit symbol representing the multivibrator clock illustrated in FIGURE 25.

FIGURE 26 shows the symbol representing the multivibrator clock circuit illustrated in FIGURE 25.

SOLENOID DRIVER

Figure 27:
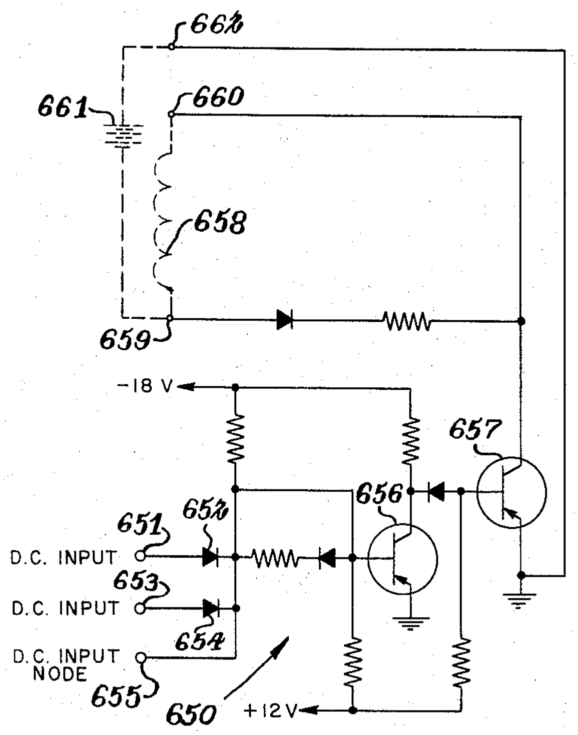
FIGURE 27 is a schematic drawing of a solenoid driver utilized in the embodiment of the invention illustrated in FIGURES 1–4.

A solenoid driver circuit is illustrated in FIGURE 27. It consists of a two-input gate followed by a two-stage non-inverting transistor amplifier of conventional design generally indicated at 650. The two-input gate consists of commonly connected DC input terminal 651 through a rectifier 652, a DC input terminal 653 connected through a rectifier 654, and a DC node terminal 655. The two-stage noninverting transistor amplifier includes a pair of transistors 656 and 657. When all terminals 651, 653, and any additional terminals created by connecting a diode cluster to node 655 are at logical one (minus six volts), the gate turns "ON," the first transistor 656 and the output transistor 657 turns "OFF," and a solenoid 658 connected across output terminals 659 and 660 is not energized. When any of the inputs to the terminals 651, 653, and any additional terminals connected through a diode cluster to terminal 655 goes to logical zero (zero volt), transistor 656 is turned "OFF," the output transistor 557 is turned "ON," and a circuit path is provided through the solenoid to an external power supply 661 connected between terminal 659 and a circuit ground terminal 662. The solenoid and its external power supply are not a portion of the solenoid driver itself and, therefore, must be provided in addition to the driver circuit.

Figure 28:
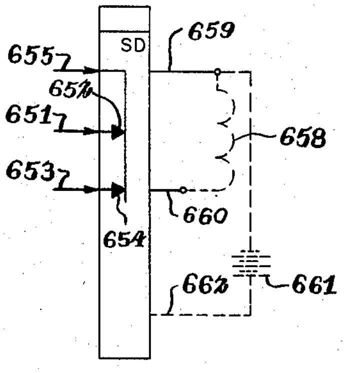
FIGURE 28 is a logic circuit symbol representing the solenoid driver illustrated in FIGURE 27.

FIGURE 28 shows the symbol representing the solenoid driver illustrated in FIGURE 27.

*Player sequencer unit*

Figure 29:
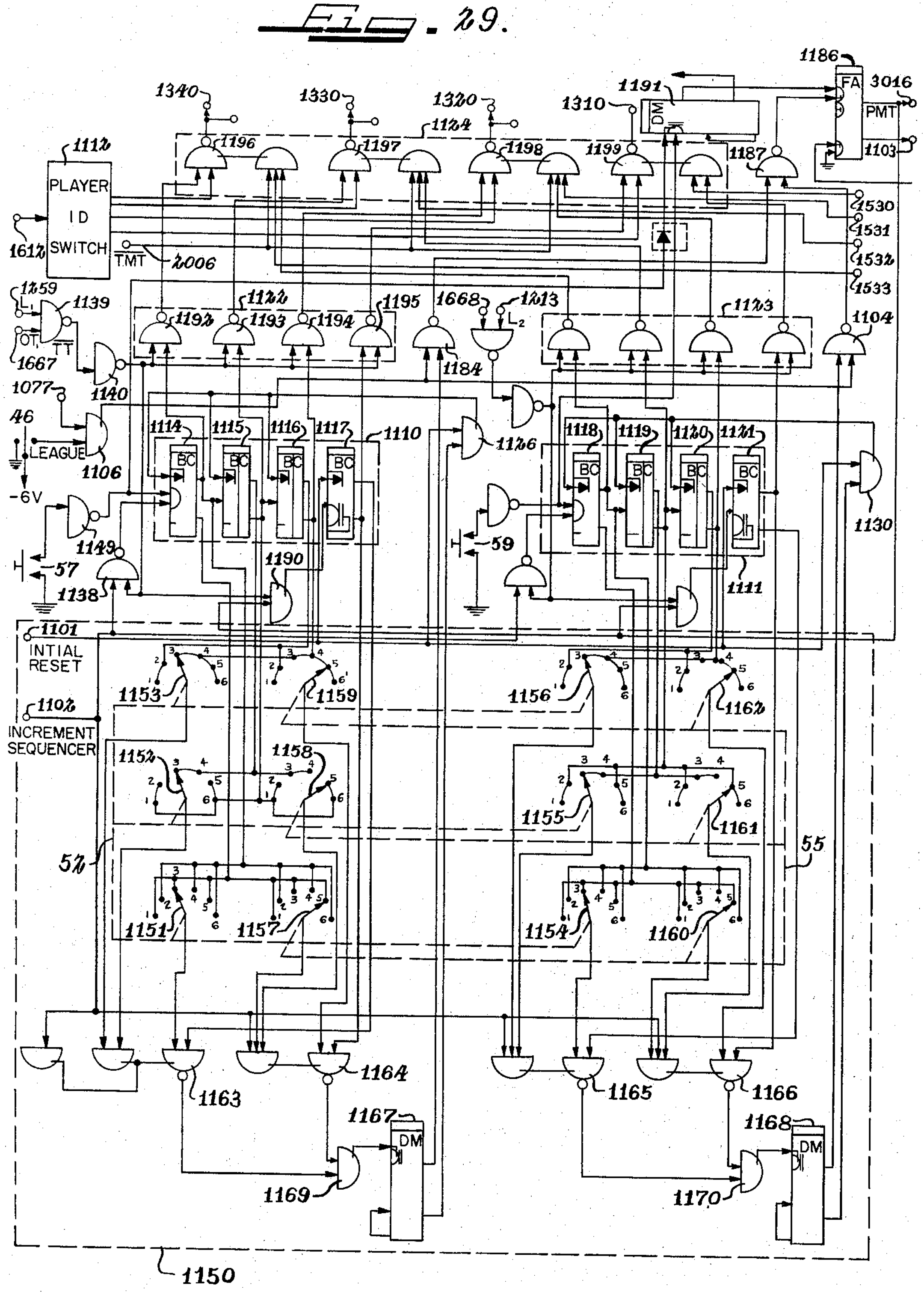
FIGURE 29 is a schematic diagram of a player's sequencer shown in FIGURE 4.

The player sequencer serves as a selector to indicate the proper player to be credited with pinfall. FIGURE 29 is a schematic drawing of the player sequencer unit.

For the purpose of simplicity, the embodiment of the invention illustrated in the drawings is an embodiment designed to compute scores for only two bowling lanes which is the number normally used in league competition play with two teams competing against each other and alternating lanes for each frame of a bowling game. It will be understood by those skilled in the art that the principles illustrated by this embodiment can be applied to a large plurality of bowling lanes.

The player sequencer unit 11 shown in FIGURE 29 produces outputs to the comparator 13 which designates the player to whom pinfall is to be credited at any particular time during a bowling game. Normally, this would be the player who is bowling in his proper turn and has just rolled a ball. However, there are three other sources of player identification which the player sequencer unit 11 may indicate to the comparator 13. They are a designation of an out-of-turn bowler, the identification of a player whose score is to be corrected, and the identification of each player from the memory reset unit in order to reset the code words for a new game. Besides the identification of the players, the player sequencer also designates to the comparator the identification of two mark and team total code words which are carried in the memory 15 and circulated to the operating register SR in the same manner that the words for the individual players are transported between the memory and the operating register. Thus, the player sequencer unit will indicate a player's identification from one of four possible sources or the identification of one of the two mark and team total words to the comparator so that the comparator will initiate action to have the code words sequentially pass through the operating register until the word commanded by the player sequencer arrives in the operating register. The player sequencer section has two electronic registers 1110 and 1111. These registers calculate the proper player of each team who should be bowling on each lane if the players are bowling in their proper sequence. Thus, when pinfall arrives in the pinfall sequencer unit 12 from one lane or the other, the pinfall sequencer 12 indicates that the identification of the bowler on that lane is to be sent by the player sequencer unit 11 to the comparator 13. As will be presently described, the player sequencer unit 11 will also send the player's identification to the comparator if an out-of-turn bowler is bowling, if a player's score is being corrected, or if the memory 15 is being sequenced for resetting prior to the start of a new game. A player's identification switch 1112 stores the identification of a player who is bowling out-of-turn or whose score is being corrected so that it is available for transmitting to the comparator.

Each register is composed of four bistable multivibrators 1114–1117 and 1118–1121, respectively. Three of the bistable multivibrators in each register 1114–1116 and 1118–1120, respectively, are connected to form a binary counter containing three bits and counting up from zero to decimal seven. The outputs of the two registers are connected to two series of NAND circuits. The first series of circuits consists of two switching devices 1122 and 1123 to activate the transfer of identification information from register 1110 to the aforementioned second series of NAND circuits and to activate the transfer of identification information in register 1111 to the aforementioned second series of NAND circuits. The second series of NAND circuits is an output device 1124 which places identification information received from either one of the register through the switching devices 1122 or 1123, the player identification switch 1112 from the memory reset unit or from a "Team and Mark Total" signal. As will be described at the proper time, the identification of a player is released from one of these sources to the output circuit 1124 for transmission to the comparator. The circuits which provide the identification of the player who is bowling on one lane or the other in his proper sequence will be described first. The provision of this information is one of the principal functions of the player sequencer 11.

NAND gates are used extensively throughout the illustrated embodiment of the invention. The NAND circuits shown in the drawings have only two normal input terminals and an input node for the connection of additional diode cluster which can extend the number of inputs to the NAND circuits to any number desired less than eleven. Therefore, throughout the description of the various circuits, the drawings will show an input entering a NAND gate through a diode cluster connected to the node terminal of the NAND gate. Therefore, in describing the various circuits, a NAND gate will be referred to without specifically mentioning a diode cluster which extends the number of input terminals to that NAND gate.

Bistable multivibrators 1114, 1115, and 1116 are connected as an additive counter capable of storing player identification from zero to decimal seven. Binary multivibrator 1117 serves to indicate which team is on lane 1. In like manner, the register 1111 has for the purpose of indicating the player and team bowling on lane 2, the three binary counters 1118, 1119, and 1120 connected as an additive counter capable of storing player identification of zero to decimal seven and multivibrator 1121 connected to indicate the team. Two sections of each binary counter 1115, 1116, 1119, and 1120, respectively, are connected in inverse fashion so that a binary one on the upper output terminal signifies a reset of the unit rather than a set condition. The vertical line running down through the schematic designation for all such units signifies this condition. This is normally done in order to achieve a proper resetting action on certain subunits.

The binary codes used to identify each player are shown in Table I.

TABLE I.—PLAYER IDENTIFICATION

| Weighted value: 8421 | Use |
|---|---|
| 0000 | Unused. |
| 0001 | Player 1, Team A. |
| 0010 | Player 2, Team A. |
| 0011 | Player 3, Team A. |
| 0100 | Player 4, Team A. |
| 0101 | Player 5, Team A. |
| 0110 | Player 6, Team A. |
| 0111 | Team A mark and team total register. |
| 1000 | Memory resetting code word. |
| 1001 | Player 1, Team B. |
| 1010 | Player 2, Team B. |
| 1011 | Player 3, Team B. |
| 1100 | Player 4, Team B. |
| 1101 | Player 5, Team B. |
| 1110 | Player 6, Team B. |
| 1111 | Team B mark and team total register. |

It will be noted from the table that when the term "Player Identification" is used, it also includes the identification of the words which are utilized to store and compute the team marks and team totals and the identification of the memory resetting code word. Table I also shows that the code 0000 is unused. During deenergization of a computer (whether intentional or through a power failure) transients occur which could jeopardize the contents of the operating register. By having one unused word, with identification 0000, and insuring that this word is in the operating register whenever shutdown occurs, it is impossible to harm any needed information. Thus, the unused location does assume some importance. When the initial reset signal is activated (either by operation of the panel switch 45 or the test panel switch 230), a terminal 1101 is grounded, causing grounding of an input terminal of an AND gate 1126 causing the grounding of DC set terminals of bistable multivibrators 1114, 1115, and 1116, respectively. In like manner, an AND gate 1130 brings about the grounding of DC set terminals of multivibrators 1118, 1119, and 1120, respectively. This action resets multivibrators 1115, 1116, 1119, and 1120 and sets multivibrators 1114 and 1118, thus aligning each register for player 1 on each respective team. The weighted value "8421" indicated in Table I will be found in bistable multivibrators 1117, 1116, 1115, and 1114, respectively, and in bistable multivibrators 1121, 1120, 1119, and 1118, respectively. Since it may be seen that the circuitry associated with lane 1 and that associated with lane 2 are identical in operation, only the circuitry for lane 1 will be described in complete detail. The action of grounding terminal 1101 places a binary one in multivibrator 1114 and zeros in multivibrators 1115 and 1116, respectively. Thus, the binary counter contains the identification code of 0001 or player 1. Grounding terminal 1101 also grounds the DC set terminal of bistable multivibrator 1117, thus placing a binary zero in that multivibrator. A binary zero, as may be seen from Table I, indicates Team A. Grounding of the terminal 1101 places a binary zero on the set input terminal of multivibrator 1121 to place a binary one in that multivibrator which indicates Team B is bowling on lane 2. In the described manner, energizing the computer by use of switch 45 places the first player of Team A on lane 1 and the first player of Team B on lane 2. After each player bowls on lane 1 and the computer has finished with its scoring sequence for the bowler, an increment sequencer pulse is applied to terminal 1102 to produce a pulse at an input terminal of a NAND gate 1138. If bowling is being scored for lane 1 and no out-of-turn situation exists, a binary one will appear at another terminal of gate 1138 causing a pulse to be applied to a complement input terminal of bistable multivibrator 1114, causing the counter to count by one and thus designate the next player to bowl on that lane. Gate 1138 produces a binary zero to cause such upcounting by receiving a binary one on its input terminal which is produced by a binary one appearing on an input terminal 1259 to NAND gate 1139 to indicate that lane 1 is being scored and a binary one appearing on terminal 1667 to NAND gate 1139 to indicate that there is no out-of-turn bowling situation present. A binary zero appears on an output terminal of NAND gate 1139 which is inverted to produce a binary one at an output terminal of a NAND gate 1140. Thus, as each player completes a frame, the counter will count up one to indicate the code designation for the subsequent player.

Another complement input terminal of multivibrator 1114 is connected to electrical ground through the normally open skip switch 57, mounted in the panel portion 56, FIGURE 2, and a NAND gate 1149. Thus, closure of switch 57 puts a "Skip" signal on the complement input terminal to cause the binary counter to count upward once for each press of the switch. Thus, through operation of the counter to count up one for each completion of a frame by a bowler or a manually initiated "Skip" signal, the counter will faithfully store the identity of the player bowling on lane 1.

The above-described functions will continue until all players on a team have completed a frame. The number of players bowling on a team may be varied from one to six, and therefore, some means must be provided for indicating to the register 1110 that the last player of a team has bowled so that it can be reset for the first player of Team B. This function is performed by a team size circuit 1150 which contains two ganged rotary switches 52 and 55 having six switching sectors each 1151–1156 for lane A and 1157–1162 for lane B, NAND gates 1163–1166 and a pair of delay multivibrators 1167 and 1168 having a set input terminal connected to AND gates 1169 and 1170. Before the start of the game, the two ganged switches have been set for the team size of Team A and Team B, respectively. Switching sectors 1151–1153 are connected to the multivibrators 1114–1116 of the counter of register 1110 to receive information on each digit of player identification or its complement so that a binary one will be placed on three input terminals of NAND gate 1163. Terminal 1102 is connected to a fourth terminal of NAND gate 1163 in order that a binary one will appear on this input terminal each time an increment sequencer pulse is applied to terminal 1102. Thus, the output terminal of NAND gate 1163 will have a binary zero appearing thereon only when an increment sequencer pulse is being received, indicating that the scoring of a frame has been completed for a player and that a sequencer pulse has been received by the binary counter to cause it to count up to a player identification one greater than the team size. The team size determination is made by the appearance of binary one on the three aforementioned terminals through closed circuits of switch sectors 1151, 1152, and 1153. These three switch sectors are all closed with portions of the multivibrators of the counter only when the particular combination of a player's identification code on his team appears in the counter. A tracing of each one of the circuits from the counter through the sector switches will confirm that three binary ones can appear only when a player's identification appears that is one greater than that which is set on the ganged switch 52. In order for a binary zero to appear on the output terminal of NAND gate 1163 to indicate the completion of all the players of Team A on lane 1, a binary one must also appear on a fifth input terminal of NAND gate 1163. Since this terminal is connected to a set output terminal of the team indicating multivibrator 1117, a binary one indicating Team A is provided to terminal 303 of NAND gate 1163. Switch sectors 1157, 1158, and 1159 and NAND gate 1164 perform a similar function for Team B when it is bowling on lane 1 and when an increment sequencer pulse is being applied to register 1110, causing it to count to a player's number one higher than that selected on switch sectors 1157–1159. A binary one then appears on an output terminal of NAND gate 1164. Since AND gate 1169 will place a binary one on an input trigger terminal of the delay multivibrator 1167, a binary zero will not appear on this terminal until the team using lane 1 (either Team A or Team B) has completed bowling in any frame. Multivibrator 1167 has a five microsecond delay from the time it is triggered by a binary zero appearing at its input trigger terminal. During this period of time, a negation output terminal which is normally a binary one becomes a binary zero. The negation output terminal is connected to an input terminal of AND gate 1126 to cause AND gate 1126 to produce a binary zero at its output terminal since its other input terminal is binary one except when terminal 1101 is grounded by an initial reset circuit. The output terminal of AND gate 1126 is connected to the set input terminals of binary counters 1114, 1115, and 1116 so that the identification code of 001 is reset in the counter register again.

The delay multivibrator 1167 is connected to set in motion a number of operations which result in the bistable multivibrator 1117 being reset to indicate that Team B will bowl next on lane 1, and in like manner, the lane multivibrator 1168 sets in motion a series of operations which indicate that Team A will bowl next on lane 2. During the five microsecond delay of delay multivibrator 1167, an assertion output terminal of delay multivibrator 1167 goes to a binary one, and if league play has been indicated on the control panel, a binary zero appears at the output terminal of a NAND gate 1184. This action causes a binary one to appear at an AC set input terminal of a bistable multivibrator 1186 which is connected to the NAND gate 1184 through a second NAND gate 1187. At the end of the five microsecond period, a set output terminal of multivibrator 1186 returns to binary zero setting the binary counter multivibrator 1117. Thus, at the end of a frame in league play, a "Print Mark Total" (PMT) signal is issued to a terminal 3016. When printing (or other display) is accomplished, a "Score Print Complete" signal is received on a terminal 1103 which turns off the "Print Mark Total" signal. The use of the term "print" is utilized throughout the scorer to indicate the functioning of the scorer for operating a printer. The term "print" is synonymous with the term "display" when any other display system is connected to the scorer. The set output terminal of multivibrator 1186 is connected to a complement input terminal of the bistable multivibrator 1117 through an AND gate 1190. Multivibrator 1117 stores information pertaining to the team bowling on lane 1 so that when the set output terminal of multivibrator 1186 returns to a binary zero, multivibrator 1117 is complemented, changing to its reset condition, thus indicating that Team B is now bowling on lane 1. In like manner, the multivibrator 1121 is reset to Team A through the action initiated by the delay multivibrator 1186 and similar circuitry to that just described. Complementing of the multivibrator 1117 and the multivibrator 1121 simultaneously by the action initiated by delay multivibrator 1167 or 1168 is prevented by the fact that in the case of lane 1, the signal from the set output terminal of multivibrator 1186, which would ordinarily complement bistable multivibrator 1117, is prevented from doing so by the fact that the AND gate 1190 does not receive a binary one unless the score from lane 1 is being computed as indicated by a binary one appearing at the output terminal of NAND gate 1140. Since computations on lane 1 and lane 2 cannot occur simultaneously, the lane 1 and lane 2 signals cannot occur simultaneously. Thus, bistable multivibrators 1117 and 1121 can be complemented to indicate that the opposing team is about to bowl on that lane only when the pinfall from that lane is being computed in the arithmetic unit, as will be more fully described presently. In addition, only register 1110, or only register 1111, can count up one player including counting from the last player of one team to the first player of the other team when it is receiving information that the arithmetic unit is computing the scoring for lane 1 or lane 2, respectively. Thus, when the player with a number equal to the setting of the team size switch completes his turn, resetting occurs, allowing the first bowler of the opposing team to bowl next in league bowling situations.

As previously described, whenever it is necessary to skip a bowler, the manual push button switch 57 is closed to produce a binary one from NAND gate 1149 to the complement input terminal of the bistable multivibrator 1114. This causes the binary counter composed of multivibrators 1114–1116 to count up one in the same manner as they would if they had received a binary one signal from NAND gate 1138. In addition, a delay multivibrator 1191 is activated to prevent printing of mark totals during a skip cycle. An output assertion terminal of delay multivibrator 1191 is connected to a set level control terminal of the multivibrator 1186 to inhibit it from operating for a 200 microsecond delay period produced by delay multivibrator 1191.

Four NAND gates 1192–1195 comprise the lane 1 switching device 1122. Each of the NAND gates 1192–1195 has one input terminal connected to an output terminal of the bistable multivibrators 1114–1117, respectively, to receive the binary code character being stored in each respective multivibrator. These four NAND gates have a second input connected to the output of NAND gate 1140 to receive a binary one whenever the pinfall sequencer 12 indicates to the input terminal of NAND gate 1139 that the arithmetic unit is computing pinfall from lane 1. Thus, the four NAND gates can forward information on the contents of register 1110 only when so commanded by the "Lane 1" signal being applied to terminal 1259. When so commanded, the complementary code characters of the binary ones appearing in each respective multivibrator of the register 1110 appears at the output of the four NAND gates 1192–1195, respectively. Thus, if Player 5, Team A, is stored in the register 1110, reading the outputs of NAND gates 1195 down to 1192 will indicate the complement of this player's identification. Player 5, Team A, identification of 0101 will appear as 1010. The output circuit 1124 is composed of four multi-input NAND gates which perform the function of OR gates for player identification supplied by either reigster 1110 for lane 1, register 1111 for lane 2, the player identification switch 1112, inputs from the memory reset unit on a set of terminals 1530–1533, or the "Team or Mark Total" signal input. To provide an output from the player sequencer unit to the comparator of the identification of the binary code word which is desired to be positioned in the register of the arithmetic unit at any given time, the player sequencer output circuit 1124 is provided. Whenever the output from any one of the five sources is switched "ON" to pass the identification contained therein to the output circuit 1124 and thereby on the comparator, a NAND circuit performs the OR function if its inputs are the negation of the signals that are to be ORed together. Thus, for a set of NAND gates 1196–1199, which form output circuit 1124, to act as OR gates, they must receive only the complement of the player identification desired to be designated to the comparator. As previously described, the switching device 1122 offers such a complement to each respective NAND gate of output circuit 1124. In like manner, when the NAND gates of switching device 1123 are switched "ON" by a binary one on a "Lane 2" signal, terminal 1213, which is connected to an input terminal of a NAND gate 1108, the complement of the player identification appearing in register 1111 is offered to output circuit 1124. The player identification switch is so wired that its output is also the complement of a player's identification indicated by the manual positioning of the manual player selector switch 49. This complemented signal is transmitted to the output circuit 1124 whenever a binary zero signal appears on a terminal 1612, indicating that the arithmetic unit 10 is scoring a special procedure which may be either an out-of-turn player or a correction of a player's score. In like manner, the terminals 1530–1533 from the memory reset unit 15 will contain the complement of a bowler's identification whenever they are activated as will be described in greater detail presently. It will be noted that the complement of the "Team or Mark Total" signal (TMT) is issued to NAND gates 1198, 1197, and 1196 through a terminal 2006, but not to the NAND gate 1199 which indicates a player's team. Thus, whenever this signal is removed by changing the input from a binary one to a binary zero, the "Team or Mark Total" identification of 111 will appear at the player's numeral outputs 1198–1192, while a signal for Team A or B is placed at the output of NAND gate 1199. Thus, the "Team or Mark Total" identification is produced along with a proper team indication from either counter multivibrator 1117 for lane 1, or 1121 for lane 2. At any time all the five sources of inputs to the output circuit 1124 are turned "OFF" by each producing a binary one to the NAND gates of circuit 1124, the signal appearing at the output of circuit 1124 for transference to the comparator would be 0000, thus causing the unused word to appear in the operating register.

Suppose, for example, that Player 5, Team A, is bowling and consequently his identification is contained in register 1110 which would be a player identification of 0101, the output of NAND gates 1195, 1194, 1193, and 1192 would show 1010, the complement of the player identification. NAND gates 1196–1199 are connected to comparator terminals 1310, 1320, 1330, and 1340, respectively, and would report 0101. Thus, reading the output terminals of circuit 1124, the designation of Player 5, Team A, of 0101 appears.

The discussion of the player sequencer unit has assumed thus far that only league play will be in operation on two lanes. League play differs from open play in that it is desirable to print out (or display) a team mark total at the conclusion of each frame, and to cause the teams to alternate lanes at the end of each frame. These two functions should be performed whenever a team completes bowling on one lane. However, they should occur only if league play is progressing rather than open bowling and if the arithmetic unit is not computing a team total. Whenever league play is being employed, a binary one is sent from switch 46 to an input terminal of an AND circuit 1106. When a binary one also appears on a terminal 1077 to indicate that a team total is not in progress, a binary one will appear at the input terminals of NAND gate 1184 and a NAND gate 1104 to cause these NAND gates to continually produce a binary one whenever they are receiving a binary zero from delay multivibrators 1167 and 1168, respectively. Then, when these multivibrators produce a binary one for five microseconds, NAND gates 1184 and 1104 will produce a binary zero for that length of time to bring about the producing of a "Print Mark Total" signal and the complementing of bistable multivibrators 1117 and 1121, respectively, as is required in league play. However, if switch 46 issues a binary zero, indicating open play or a team total is in progress, a binary zero will be applied to AND gates 1184 and 1104 which will cause them to produce a binary one regardless of the signals received from the delay multivibrators. Thus, mark totals are not printed and multivibrators 1117 and 1121 will not be complemented so that they continue to indicate that the same team (or group of players) is remaining on one lane for a full game. Complementing is not performed during team totaling in league play to insure that the correct team will start the next game on the proper lane. Thus, sequencing of lanes between games is stayed to insure proper placement for continued scoring.

*Pinfall sequencer*

Figure 30:
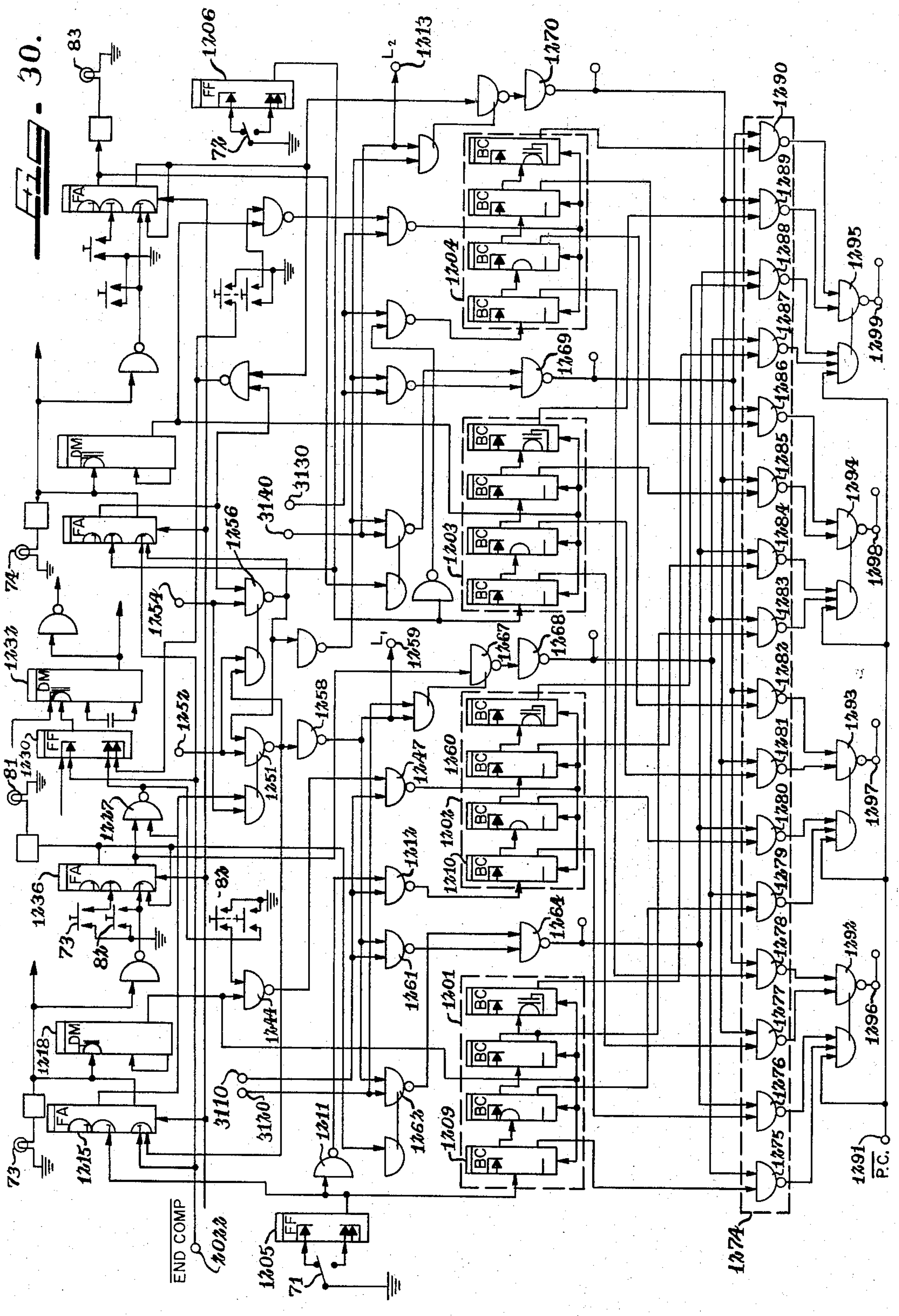
FIGURE 30 is a schematic diagram of a pinfall sequencer shown in FIGURE 4.

Referring now to FIGURE 30, the circuits for counting, storing, and transmitting pinfall data for both the first and second balls of a frame are shown. Since the binary counter registers and the associated circuits for each lane are similar, only the detail circuit pertaining to lane 1 will be described. The function of corresponding components pertaining to lane 2 is identical with the function of the components pertaining to lane 1. The pinfall section contains four binary counter registers 1201, 1202, 1203, and 1204, each composed of four bistable multivibrators connected as a binary counter register to provide for binary counting from zero to ten. Pinfall enters the scorer as a series of pulses from the telephone dial switch 71 for lane 1 or from telephone dial switch 72 for lane 2 into bistable multivibrators 1205 and 1206, respectively. These dial switches are mounted on input panel 70 shown in FIGURES 2 and 4. The pinfall will be indicated by a series of one to eleven pulses. The first pulse indicates that there has been a pinfall sampling following the rolling of a ball and if it is the only pulse received, it indicates that the pinfall resulting from the rolling of that ball is zero. Therefore, as will be presently shown, a first pulse must be eliminated from the pinfall count. Counter register 1202 is the first ball counter for lane 1 because it will only count and retain the pinfall resulting from the first ball rolled in a bowler's frame. Counter 1201 is the counter for both balls for lane 1 in that it will count the pinfall for both the first and second balls rolled by a player in a frame. In like manner, counter register 1204 is the first ball counter for lane 2 while counter register 1204 is the second ball counter for lane 2.

Referring specifically now to the counter registers and their associated circuitry relating to lane 1, the first pulse received at a DC set input terminal of bistable multivibrator 1205 sets the multivibrator. A reset output terminal of multivibrator 1205 is connected to an input terminal of a first bistable multivibrator 1209 of counter register 1201, to a first bistable multivibrator 1210 of counter register 1202 through a NAND gate 1211 and a second NAND gate 1212 and to an AC set input terminal of a multivibrator 1215. A terminal 3110 is connected, as will be presently explained, to indicate that a first ball has been rolled when a binary one appears thereon. A binary one on pin 3110 places a binary one on an input terminal of NAND gate 1212 and allows the pinfall pulses to be transferred from multivibrator 1205 to a complement input terminal of counter register 1202. NAND gate 1211 merely inverts the output pulses from multivibrator 1205 so that they can be reinverted by NAND gate 1212 to provide the input of the same character to counter 1202 as is introduced into counter 1201. Thus, if a first ball is indicated, pinfall is transferred to both counter registers 1201 and 1202 wherein the pulses representing the downed pins are counted and the total pinfall count remains stored for further possible transmission to the arithmetic unit. When the second ball is rolled, a binary zero appearing on the input terminal of NAND gate 1212 prevents the pinfall count from entering register counter 1202. Therefore, the second ball pinfall will be stored only in counter 1201, since it will count upward by being connected directly to the reset output terminal of multivibrator 1205 whenever any pinfall is received by multivibrator 1205. As mentioned, the pulses exceed the exact pinfall by one pulse so it is necessary to subtract this first pulse. This is done by resetting the counter registers after the first pulse as follows. The first pulse causes multivibrator 1215 to assume its set position, allowing a reset output terminal of multivibrator 1215 to go to binary zero. This action starts the delay period of a multivibrator 1218 which has an input trigger terminal connected to the reset output terminal of multivibrator 1218. A negation output terminal of multivibrator 1218 goes to binary zero for ten microseconds. This binary zero is applied to the common reset terminals of the binary counter 1201 resetting the counter to zero. Also, if the ball rolled was the first ball, the binary zero is applied to the common reset terminals of binary counter 1202. Thus, both counter registers 1201 and 1202 are reset if the first ball is rolled and if a second ball is rolled only counter register 1201 is reset to subtract the extra pulse. Therefore, first ball pinfall is stored in both counters until the second ball is rolled. Second ball pinfall is stored in counter register 1201, but counter 1202 continues to retain the first ball pinfall count in the event that it is required for a foul computation.

Upon the first pinfall pulse, multivibrator 1215 is set, causing a binary one to be applied to an input terminal of a NAND gate 1227. NAND gate 1227 has an output terminal connected to a DC reset input terminal of a bistable multivibrator 1230 so that when binary ones appear at the input terminals of NAND gate 1227, a binary zero appears at the DC reset input terminal of multivibrator 1230. This action causes resetting of multivibrator 1230 and the resetting is transmitted to a delay multivibrator 1232 connected to bistable multivibrator 1230 to initiate a delay period of about 1.5 seconds. At the conclusion of this time, a binary one is issued at a negation output terminal of the multivibrator 1232 which is referred to as the "Pinfall Ready" signal. It is utilized as will be presently described to indicate to the arithmetic unit 10 that pinfall has been counted and the count is ready for computational use. Therefore, the period must be of sufficient lentgh to allow for entrance of all pinfall into the counter registers since computation begins immediately upon termination of the delay period. In order to initiate action in the delay multivibrator, it is necessary that the input terminal change from a binary one to a binary zero and therefore, bistable multivibrator 1230 must be set by an "End-of-Computation" signal from the arithmetic unit 10 which is applied to a terminal 2022 which is connected to a DC set input node terminal of multivibrator 1230 to set it before it can be reset by a signal from multivibrator 1215. Thus, if pinfall arises simultaneously on two lanes, computation will begin on one of them, but not both.

A foul signal is applied to an AC set input terminal of bistable multivibrator 1236 by switch 73 on input panel 70. When this occurs, a binary zero is applied to one of the input terminals of NAND gate 1227 which is connected to a negation output terminal of multivibrator 1236. As long as the binary zero appears on the input terminal, no "Pinfall Ready" signal can be issued from delay multivibrator 1232 until some acknowledgement of a true or false foul indication is produced. A side of true and false foul switch 82 is connected to an input terminal of gate 1244 and to a DC reset input terminal of bistable multivibrator 1230. If the true foul side of switch 82 is pressed, the binary one appearing at the output terminal 1227 of gate 1127 is grounded momentarily, causing resetting of multivibrator 1230 which initiates the action of the delay multivibrator 1232 toward the issuance of a "Pinfall Ready" signal at a terminal 1296. If the false foul side of switch 82 is closed, bistable multivibrator 1236 is reset immediately, thus removing the binary zero at the input to NAND gate 1227. This allows issuance of the "Pinfall Ready" signal.

In the event of a true foul acknowledgment, an input terminal of the NAND gate 1244 is grounded, causing the NAND gate 1244 to apply a binary one to an input terminal of a NAND gate 1247. Another input terminal is connected to terminal 3110 so that if a first ball was rolled, a binary zero is applied to the common reset terminals of binary counter register 1202, causing it to reset to give a zero pinfall indication in the counter register 1202. If a second ball is rolled, a gate 1264 is activated and pinfall is read from register 1202. Since this is first ball pinfall, this action will permit correct computation of score in all foul situations.

The output terminal of bistable multivibrator 1215 is connected to an input terminal of a NAND gate 1251 in order to place a binary one into this NAND gate whenever the multivibrator 1215 is set by the first pinfall pulse leaving multivibrator 1205. Other inputs into NAND gate 1251 are a "No Corrections Being Performed" signal $(\bar{F}_c)$ which is introduced from a terminal 1252, a "No Power Failure" signal introduced from a terminal 1254, and a "No Computation on Lane 2" signal which is received from a NAND gate 1256 which performs the same functions in reference to lane 2 as does NAND gate 1251 in reference to lane 1. An output terminal of NAND gate 1256 is connected to an input terminal of NAND gate 1251. Thus, when a binary one is received from multivibrator 1215, no corrections are being performed, no power failure has taken place, and no computation is taking place for lane 2, all inputs to NAND gate 1251 will be binary ones causing it to issue a binary zero to a NAND gate 1258. This gate inverts the binary zero to a binary one forming the "Lane 1 Computation" signal ($L_1$) which is issued to a terminal 1259, and an AND gate 1260, NAND gate 1212, a NAND gate 1261, and a NAND gate 1262 by having its output terminal connected to terminal 1259 and the input terminals of the aforementioned gates. Since a binary one must be received by NAND gate 1251 from NAND gate 1256 indicating that computation is not taking place on lane 2, computation cannot occur for lane 1 when it is occurring for lane 2 and vice versa. This is because the output of NAND gate 1251 is connected to an input terminal of NAND gate 1256.

The NAND gate 1264 has one input terminal connected to NAND gate 1261 and the other input terminal connected to NAND gate 1262. Normally, NAND gate 1264 will issue a binary zero unless one of its inputs goes to a binary zero by having all of the inputs to either NAND gate 1261 or 1262 at binary one. This action can occur under the following conditions: first, whenever NAND gate 1261 receives a binary one from NAND gate 1258, indicating lane 1 computing and also receives a binary one from terminal 3110 indicating a first ball; and second, whenever the lane 1 signal from NAND gate 1258, the second ball signal from terminal 3120 and a foul indication from multivibrator 1236 are received simultaneously by gate 1262.

Thus, NAND gate 1264 will issue a binary one indicating that counter register 1202 should be read into the arithmetic unit whenever computing occurs on lane 1 and a first ball has been rolled or a second ball has been rolled and a foul has been committed.

A pair of NAND gates 1267 and 1268 are connected in series to produce a "Read Counter Register 1201" (into the arithmetic unit) signal. A binary one appearing at the output terminal of gate 1268 indicates that a binary zero must exist at the output terminal of NAND gate 1267. Thus, NAND gate 1268 isues a "Read Counter Register 1201" whenever NAND gate 1267 receives signals that a second ball has been rolled, computation is taking place on lane 1, and a foul has not been committed. In order to obtain these signals, terminal 3120 is connected to an input terminal of AND gate 1260. NAND gate 1258 is connected to another input terminal, and the reset output terminal of bistable multivibrator 1236 is connected to a third input terminal. Thus, NAND gate 1268 is normally a binary zero and will issue a binary one whenever the computation is for lane 1, a second ball has ben rolled and no foul signal has been inserted. In a similar manner, read-out signals are produced for counter registers 1203 and 1204 by NAND gates 1269 and 1270. The four "Read-Out" signals are utilized to trigger portions of an output switching device 1274 which consists of sixteen NAND gates 1275–1290 having two input terminals each, of which one is connected to a different one of the sixteen bistable multivibrators which make up the four counter registers. These inputs for each of the sixteen NAND gates are connected to a respective reset output terminal of each multivibrator in order to transfer the complement of pinfall to the arithmetic unit 10. The sixteen NAND gates are divided into four groups of four 1275–1278, 1279–1282, 1283–1286, and 1287–1290. The other terminal of each NAND gate in each group of four is connected to a different one of the outputs of four NAND gates 1264, 1268, 1269, and 1270 which produce "Read-Out" signals in order that whenever one of these NAND gates issues a "Read-Out" signal for a particular register counter, one NAND gate in each group of four will pass the information contained in each different one of the multivibrators of that counter register onto each one of four NAND gates 1292, 1293, 1294, and 1295 which function as OR gates. Thus, whenever a "Read-Out" number for any particular register is transmitted onto one NAND gate in each group of the four groups of NAND gates of the output switching device 1274, it is inverted back into the binary code of the actual pinfall count. Each bit of the actual pinfall count is then inverted once more when it passes through the respective NAND gates 1292, 1293, 1294, and 1295 to respective output terminals 1296–1299 and produces an output which is transferred to the arithmetic unit as the complement of the pinfall count for whichever register a "Read-Out" signal has been ordered. Each of these last four NAND gates, besides having an input terminal for each of the outputs of the NAND gates in a respective group of four from the switching device 1274, also has a fifth input terminal which is connected to a terminal 1291 which is normally a binary one except when a binary zero is placed thereupon to indicate that a player's score is being corrected. When a binary zero appears on the input of each one of these NAND gates, they issue a binary one so that a series of four ones is transmitted to the arithmetic unit. During a correction phase, the pinfall section transmits the code for no pins down, to enable the arithmetic unit to obtain pinfall information from the front panel pinfall switch 65. The pinfall count code is a standard binary code complement when it is issued from the pinfall sequencer on terminals 1296–1299, as indicated in Table II.

TABLE II.—PINFALL CODE COMPLEMENT

| Weight: 8421 | Pinfall |
|---|---|
| 1111 | 0 |
| 1110 | 1 |
| 1101 | 2 |
| 1100 | 3 |
| 1011 | 4 |
| 1010 | 5 |
| 1001 | 6 |
| 1000 | 7 |
| 0111 | 8 |
| 0110 | 9 |
| 0101 | 10 |

*Comparator*

Figure 31:
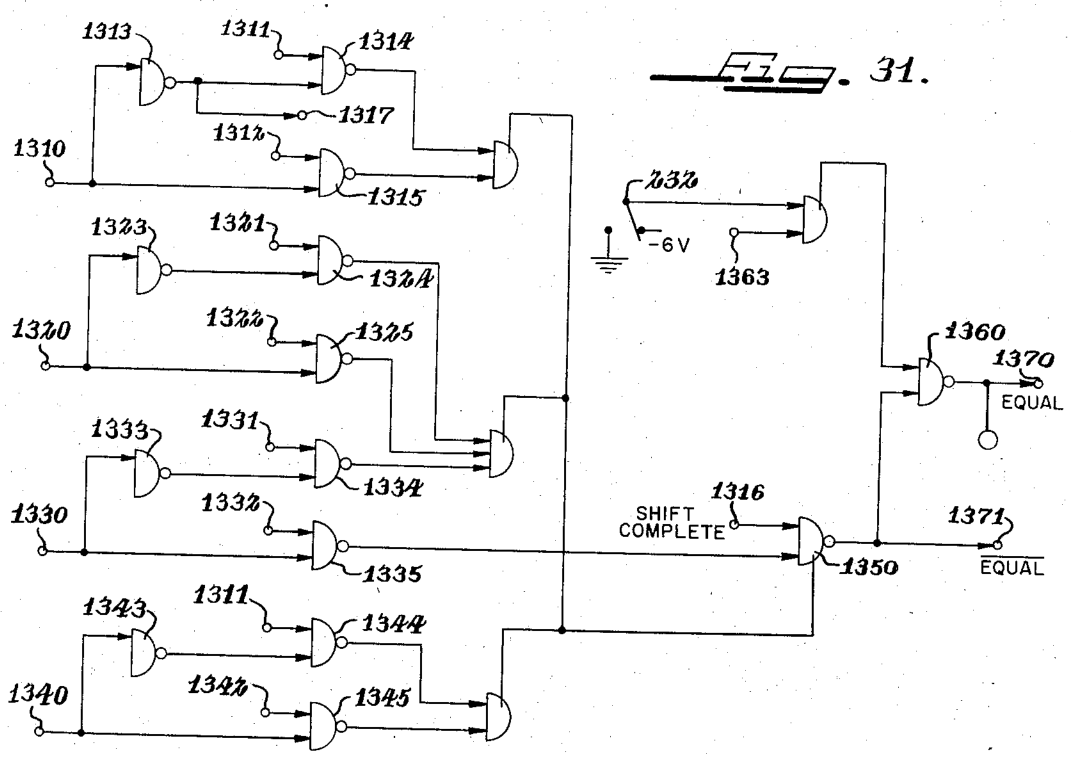
FIGURE 31 is a schematic diagram of a comparator shown in FIGURE 4.

Referring now to FIGURE 31, the comparator is composed of a series of four equalizer circuits constructed of NAND gates. There are four bits of information in the identification of each player received from the player sequencer 11 and there are four bits of information in the identification received from the operating register SR. The comparator determines whether the two identifications are the same by taking one set of four bits of information and their four complements, adding them to the inversion of the corresponding bits and their complements in the other identification, and multiplying the four additions (each bit and the complement of the corresponding bit in the other identification) together in accordance with the following Boolean equation.

$$\text{Equal}=[(\overline{1310}+1311)(1310+\overline{1311})(\overline{1320}+1321)(1320+\overline{1321})(\overline{1330}+1331)(1330+\overline{1331})(\overline{1340}+1341)(1340+\overline{1341})(\text{Shift Complete})]+\text{Equal Switch}+1363$$

Thus, if any two corresponding bits are not identical, one of the multiplied terms must go to a binary zero, making the equal signal a binary zero. The identification from the player sequencer 11 is composed of four bits which have the weighted values 8, 4, 2, and 1 which are placed upon terminals 1310, 1320, 1330, and 1340, respectively. Each of these terminals is connected to one of four NAND gates 1313, 1323, 1333, or 1343 which inverts the code character appearing at the input terminal. Thus, both the identification and its complement for each player is available to the eight NAND gates 1314, 1315, 1324, 1325, 1334, 1335, 1344, and 1345. To perform the Boolean function indication, each one of these NAND gates must be furnished with an indicative bit of a given weight or its inversion from the two identifications. The four input terminals 1310, 1320, 1330, and 1340 are also connected to the other NAND gates 1315, 1325, 1335, and 1345 as well as to the respective NAND gates 1313, 1323, 1333, and 1343 which provide the inversion of the bits to NAND gates 1314, 1324, 1334, and 1344. The complements of the bits contained in the operating register SR are received directly from that unit and do not have to be produced in the comparator unit itself. The respective bits of the identification in the operating register are applied to terminals 1311, 1321, 1331, and 1341, respectively, so that they are received on an input terminal of NAND gates 1314, 1324, 1334, and 1344. The respective complements of these bits are applied to terminals 1312, 1322, 1332, and 1342 so that they are applied to input terminals of the NAND gates 1315, 1325, 1335, and 1345, respectively. Whenever the corresponding bits of the two identifications are equal, a binary one appears at the output of each one of the eight NAND gates performing the eight additions. The outputs of these eight NAND gates plus a "Shift Complete" signal of a binary one from a terminal 1316 are applied to a NAND gate 1350 in order to form the "Equal" output signal indicated by the formula. The "Shift Complete" signal is a binary one and appears only when a word has ben completely shifted into the operating register SR. This action is a safety factor, preventing early comparison of information, and possible errors which could result from it. With all nine inputs to NAND gate 1350 at binary one, it will issue a binary zero to a NAND gate 1360 by having its output terminal connected to one of the two input terminals of gate 1360. NAND gate 1360 has two other input terminals which are connected to an equal switch 232 and to a terminal 1363. In normal operation, the binary switch 232 is in a position to connect a binary one (minus six volts) to an input terminal of gate 1360. In like manner, a binary one is normally placed on another input terminal from the terminal 1363. Terminal 1363 goes to binary zero only when a "Team Total" signal is received at arithmetic unit 10, FIGURE 40. This causes an "Equal" signal to be issued when "Team Totaling" is occurring. Thus, when these two input terminals have binary ones on them, the output of NAND gate 1360 will be the complement of the input signal from gate 1360. When the output of NAND gate 1350 is a binary zero, NAND gate 1360 places a binary one on terminal 1370 to issue an "Equal" signal and when the output of NAND gate 1350 is a binary one indicating that the two identifications are not equal, NAND gate 1360 places a binary zero on terminal 1370.

During various operations, it is often desirable to stop a word in the operating register when the identification word is not equal to an identification being provided from the sequencer. The placing of any word in the operating register during such special operations, such as loading a computer memory, is achieved by operating equal switch 232 to its ground or binary zero position. The output of NAND gate 1360 then becomes a binary zero and will remain so regardless of the output of NAND gate 1350 until the equal switch is again changed to produce a binary one. Thus, operation of the equal switch to its grounded or binary zero position provides a continuous equal signal of binary one on the output terminal 1370 of the comparator.

*Shift counter*

Figure 32:
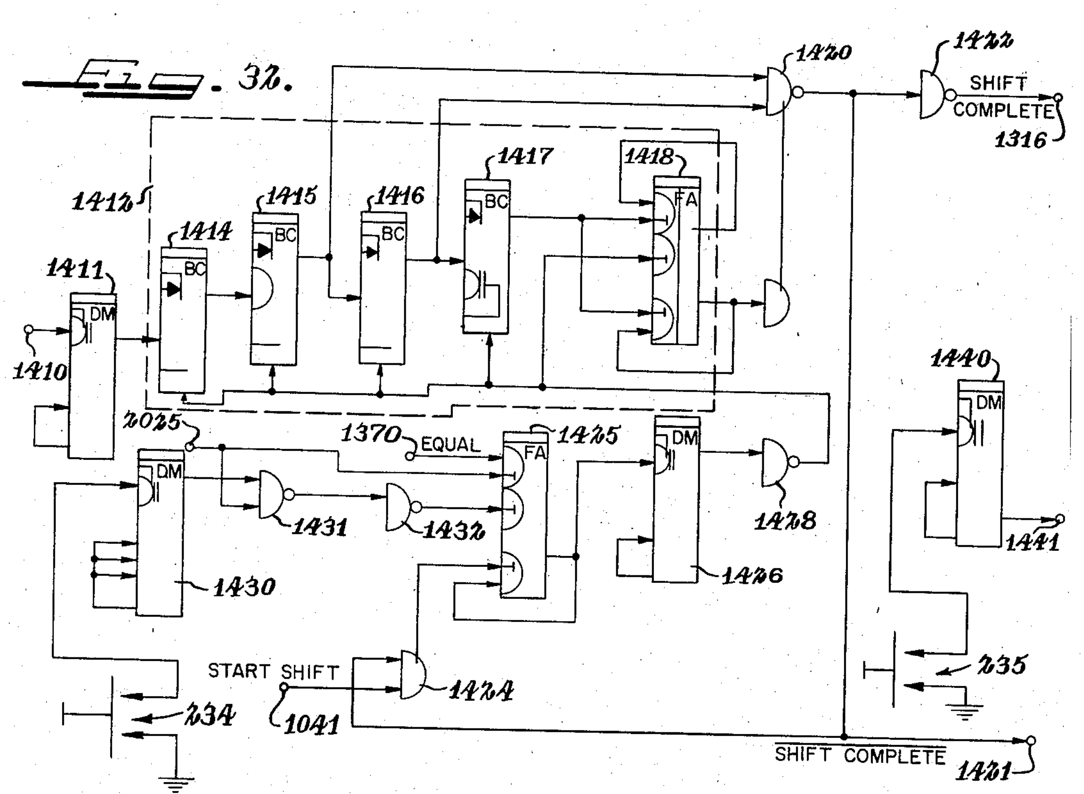
FIGURE 32 is a schematic diagram of a shift counter shown in FIGURE 4.

Contained in the memory 15 and the operating register SR are three hundred fifty-two bits of information. These three hundred fifty-two bits form sixteen words each twenty-two bits in length as previously described. The memory 15, the operating register SR, wave shaper **15*a* and input driver 15*b* may be thought of as one continuous loop constituting a storage means through which all three hundred fifty-two bits of information move around in sequence. At any one given time, twenty-two bits are in the operating register and the remaining three hundred thirty bits are in the memory unit. Since each word is composed of twenty-two bits, it is necessary to count the number of bits as they move around this large loop so that the movement of bits is stopped after each series of twenty-two bits or one word is moved into the operating register. The shift counter 14 performs the function of counting the bits moved into and out of the register from the memory 15 and issues a stop signal each time a new twenty-two bits or one word has arrived into the register. The movement of twenty-two bits into the operating register and the movement of twenty-two bits out of the operating register back into the memory may be thought of as one shift cycle. Referring now to FIGURE 32, shift pulses are received on a terminal 1410 which is connected to an input terminal of a delay multivibrator 1411. An appropriate condenser terminal is connected to a delay node terminal to wire the delay multivibrator 1411 for a ten microsecond delay before it issues an output pulse on an assertion output terminal to a binary counter register 1412. The binary counter register 1412 is composed of five bistable multivibrators 1414–1418. The assertion output terminal of delay multivibrator 1411 is connected to complement input terminal of binary counter multivibrator 1414. The following connections are made so that the five multivibrators composing counter 1412 will count the twenty-two pulses received from delay multivibrator 1411. A set output terminal of multivibrator 1414 is connected to a complement input terminal of multivibrator 1415, a set output terminal of multivibrator 1415 is connected to a complement input terminal of multivibrator 1416, a set output terminal of multivibrator 1416 is connected to a complement input terminal of multivibrator 1417, a set output terminal of multivibrator 1417 is connected to an AC set input terminal and an AC reset input terminal of multivibrator 1418. A reset output terminal of multivibrator 1418 is connected as an input to a NAND gate 1420**.

NAND gate 1420 has two other input terminals which are connected to the set output terminals of multivibrator 1415 and of multivibrator 1416, respectively. The binary number, which must appear in counter 1412 to equal the decimal number 22 is 10110. Thus, a binary one will appear at each of the three inputs of NAND gate 1420 when the count of twenty-two has been reached by the counter 1412 for the set output terminals of multivibrators 1415, 1416, and 1418 which must all then be binary ones. A binary one will not appear on all three of these gates until the decimal number 22 has been reached. At this point, NAND gate 1420 has an output of binary zero at its output terminal which is applied to an input terminal of NAND gate 1422. Gate 1422 inverts the binary zero to a binary one and applies it to an output terminal to indicate that the shift of a word of twenty-two bits is then complete. It is connected to an input terminal of an AND gate 1424. An output terminal of AND gate 1424 is connected to an AC reset input terminal of a multivibrator 1425. A reset output terminal of multivibrator 1425 is connected to a trigger input terminal of a delay multivibrator 1426. Although the reset output terminal of multivibrator 1425 changes from a binary zero to a binary one when the output of NAND gate 1420 goes to binary zero, this action has no effect upon delay multivibrator 1426. When the counter 1412 has counted to twenty-two and provided a "Shift Complete" signal to a terminal 1316, the comparator 13 will issue an equal signal if it finds that the identification of the code word in the operating register is the same as that called for by the sequencer 11. If they are equal, a binary one appears on terminal 1370 which is connected to a set level control terminal of multivibrator 1425. Timing pulses are applied to an AC set input terminal of multivibrator 1425 from a terminal 2025 of the timing unit 20*a*. Whenever the "Equal" signal is present on terminal 1370, multivibrator 1425 is inhibited from being set by any timing pulse appearing on terminal 2025. Thus, when the desired code word is in the operating register SR, there will be no signal issued by the multivibrator 1425 which will allow further shifting of the binary bits between the shift register and the memory 15. For further shifting to occur, a "Shift Complete" signal must be removed from terminal 1316. Thus, if the word in the operating register does not have the identical identification as the word called for by the player sequencer 11, the multivibrator 1425 would not be inhibited by the presence of an "Equal" signal on terminal 1370. It would become set and it would initiate the delay period of five microseconds in delay multivibrator 1426 during which a pulse would be applied to a set of common reset terminals of the multivibrators 1414–1417 and an AC set input terminal of multivibrator 1418 via the connections between these terminals and an inverting NAND gate 1428 connected to an assertion output terminal of delay multivibrator 1426. At times, it is desirable to manually shift either one word or one bit through the operating register. When closed, the "SHIFT ONE WORD" switch 234 on the front of the test panel 24 connects the scorer ground to a trigger input terminal of a delay multivibrator 1430. Three condenser terminals of delay multivibrator 1430 are wired to a delay node terminal, so that it produces a 215 microsecond delay during which it is issuing a pulse from an assertion output terminal to an input terminal of a NAND gate 1431. The NAND gate 1431 has a second input terminal which is connected to terminal 2025 to receive timing pulses. During the 215 microsecond delay, at least one timing pulse must be present at the input to NAND gate 1431 since the timing pulse period is 200 microseconds. The delay multivibrator 1430 issues a binary one to NAND gate 1431 for the entire 215 microsecond delay period, and a binary one is provided at the other input from the terminal 2025 so that the output terminal of NAND gate 1431 will go to a binary zero. The output terminal is connected to an input terminal of a NAND gate 1432 which inverts the binary character before applying it to an AC set input terminal of multivibrator 1425. This action causes delay multivibrator 1426 to issue a five microsecond pulse which results in the resetting of the five multivibrators composing counter register 1412. This again removes the "Shift Complete" signal and counting of another word begins. In order to utilize the "SHIFT ONE WORD" manual switch 234, the "EQUAL" switch 232 must be set to its equal or grounded position. In this manner, an "Equal" signal will appear on terminal 1370 regardless of whether the identification of the word in the register is the same as one being called for by the sequencer.

When closed, the "SHIFT ONE BIT" manual switch 235 connects the scorer ground to an input terminal of a delay multivibrator 1440. To utilize the manual "SHIFT ONE BIT" switch 235, the "EQUAL" switch 232 must be set in its equal position to inhibit setting of multivibrator 1425. When switch 232 is depressed, delay multivibrator 1440 will issue a binary zero signal to a terminal 1441 during the duration of the 200 microsecond period from a negation output terminal.

Some slight possibility exists that a random shift pulse might cause a single shift in the loop composed primarily of the operating register SR and the memory unit 15. Since counting and shifting always occurs in groups of twenty-two, this error would continue indefinitely if some means were not provided to alter the situation as soon as possible after its occurrence. For this reason, a code word has been added with player identification 1000. This word is loaded with binary one in all locations except the player's identification. Thus, the code word is

1111111111111111111000

As will be presently described, circuits are provided in the arithmetic unit 10 to detect the fact that this code word has arrived in the operating register. When such a circumstance occurs, the arietmetic unit issues a "Start Shift" signal and an immediate reset is provided for the counter register 1412 by applying a binary one to a terminal 1041 which is connected to an input terminal of AND gate 1424. This applies a binary one to the AC reset input terminal of multivibrator 1425 in the same manner that one is applied when twenty-two bits have been counted by the counter. However, since there is no "Equal" signal being applied to terminal 1370 at the time of this detection, a reset signal is issued immediately in the previously described method from multivibrator 1425 to counter register 1412 through delay multivibrator 1426 and NAND gate 1428.

*Correction and out-of-turn unit*

Figure 33:
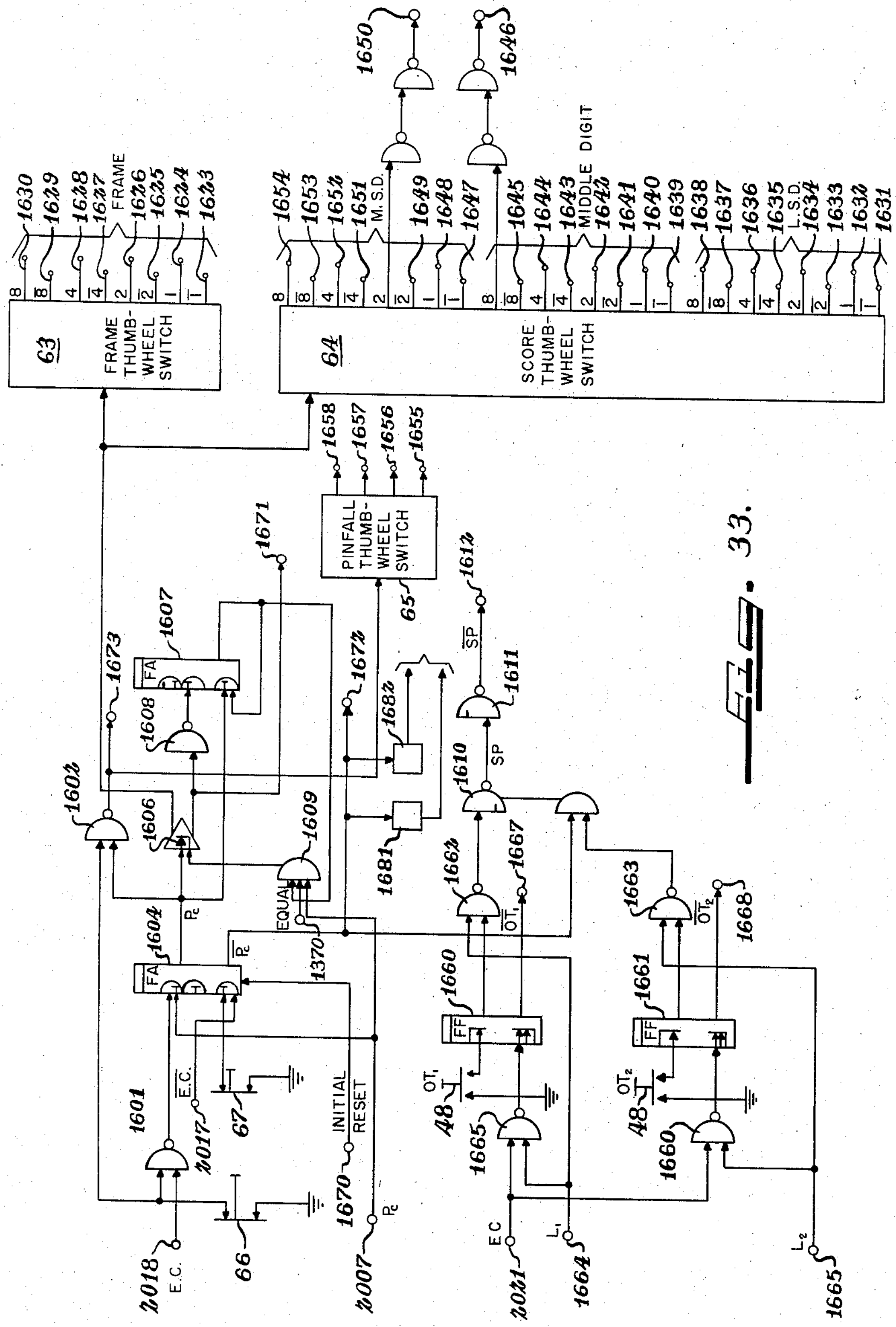
FIGURE 33 is a schematic diagram of an out-of-turn unit shown in FIGURE 4.
Figure 34:
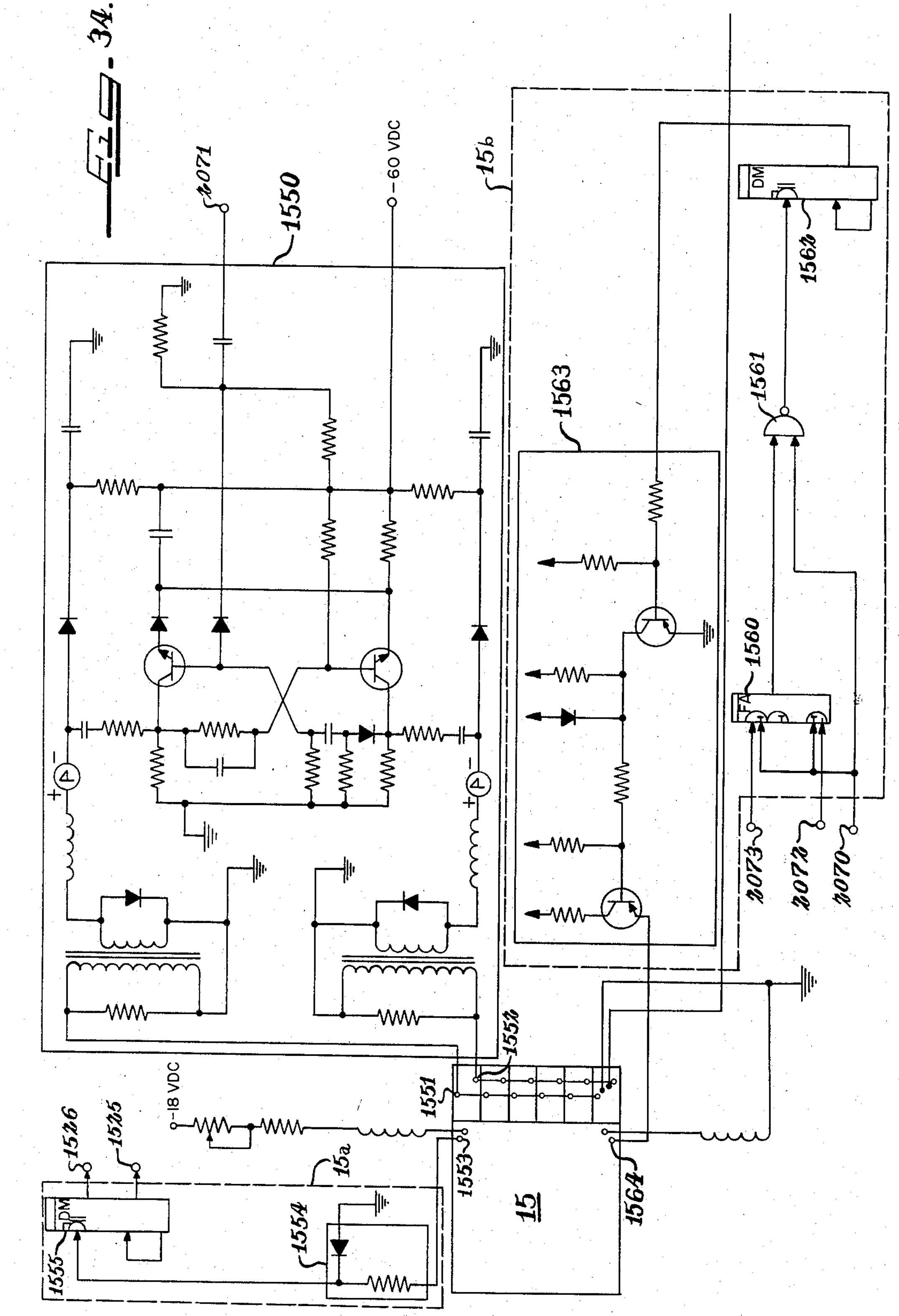
FIGURE 34 is a schematic diagram of a memory shown in FIGURE 4.

The correction and out-of-turn unit 16, FIGURE 4, is schematically illustrated in FIGURE 33. The "MAKE CORRECTION" switch 66, which is mounted on the control panel 28, shown in FIGURE 2, is connected to an input terminal of a NAND gate 1601 and to an input terminal of a NAND gate 1602 to place a binary one on these terminals when pressed. A terminal 2018 is connected to another input terminal of NAND gate 1601 for the purpose of transferring a binary one indicating the end of computation "EC" by the arithmetic unit 10. Therefore, NAND gate 1601 will issue a binary zero from an output terminal only when the "MAKE CORRECTION" press switch 66 has been pressed to disconnect an input terminal of the NAND gate from ground and thereby place a binary one thereon. A binary one indicating the end of computation is applied to the other input terminal of the NAND gate 1601. An output terminal of NAND gate 1601 is connected to a set level control terminal of an AC bistable multivibrator 1604. Timing pulses are received from a terminal 2007 on an AC set input terminal of multivibrator 1604 which set the multivibrator if the "MAKE CORRECTION" switch has been pressed. Thus, multivibrator 1604 is set by the first timing pulse received subsequent to a binary zero appearing on the set level input terminal of multivibrator 1604. When the multivibrator is set, a set output terminal becomes a binary one and a reset output terminal becomes a binary zero. The set output terminal is connected to an input terminal of NAND gate 1602, to a DC input terminal of a power amplifier 1606 and to an AC reset input terminal of an AC bistable multivibrator 1607. Power amplifier 1602 amplifies the "Make Correction" signal which has been produced by bistable multivibrator 1604. An output terminal of the power amplifier is connected to an input terminal of NAND gate 1608, and an output terminal of NAND gate 1608 is connected to an AC set input terminal of the multivibrator 1607. When the set output terminal of multivibrator 1604 issues a binary one, the power amplifier 1606 amplifies the binary one which is inverted by NAND gate 1608 to apply a binary zero on the AC set terminal of multivibrator 1607. An output reset terminal of multivibrator 1607 is connected to another input terminal of power amplifier 1606 through an AND gate 1609 to provide a shaped pulse to the frame thumbwheel switch 63.

A reset output terminal of multivibrator 1604 is connected to an input terminal of a NAND gate 1610 whereupon the NAND gate issues a binary one at an output terminal which is a "Special Procedure" signal "SP." The output terminal of NAND gate 1610 is connected to an input terminal of a NAND gate 1611 in order that gate 1611 may issue a "$\overline{\text{SP}}$" signal of binary zero to the terminal 1612 which is connected to the player's identification switch 1112, FIGURE 29, to be described presently. Simultaneously, the power amplifier 1606 issues a binary zero on an output terminal which is connected to the frame thumbwheel switch 63 and score thumbwheel switches 64. This action occurs only once at the time of setting multivibrator 1604. Another input terminal of AND gate 1609 is connected to a terminal 1622 to receive an "Equal" signal from the comparator. Therefore, the power amplifier must receive a binary one from multivibrator 1604, from multivibrator 1607, from terminal 1622, and a timing pulse from terminal 2007. When the resultant binary zero is issued by power amplifier 1606, the frame wheel thumbwheel switch 63 is energized to issue binary code characters at a set of output terminals 1623–1630 to indicate one greater than the last correct frame when the index on the wheel indicates the last correct frame. Thus, the frame thumbwheel switch 63 has been manually set to the last correct printed frame. At the same time, the score thumbwheel switches 64 issue a last correct score to the arithmetic unit 10 via a set of terminals 1631–1654.

The binary frame number issued on terminals 1623–1630 is the frame which is one higher than that manually set on the frame thumbwheel switch to instruct the state and output control unit 17 as to the frame and score to which a pinfall is to be added. An output terminal of NAND gate 1602 is connected to the pinfall thumbwheel switch 65 so that when the "MAKE CORRECTION" switch 66 is manually operated and a binary one is received from the set output terminal of multivibrator 1604 indicating that the arithmetic unit 10 is ready to receive a pinfall count, NAND gate 1602 will issue a binary zero to pinfall thumbwheel switch 65 to transfer the pinfall indicated therein to the arithmetic unit 10 via terminals 1655–1658.

An AC reset input terminal of bistable multivibrator 1604 is connected to "ALL CORRECTIONS COMPLETE" switch 67 in order to reset multivibrator 1604 after all corrections have been made on the score sheet. A reset level control terminal of multivibrator 1604 is connected to a terminal 2017 to receive an "End of Computation" signal in order that the multivibrator 1604 will not be reset when the reset input terminal is grounded by switch 67 if computation is still in progress in the arithmetic unit 10. A common reset terminal of multivibrator 1604 is connected to a terminal 1670 to receive an initial reset signal which resets the multivibrator when the circuitry is first energized. One of the output terminals of power amplifier 1606 is connected to a terminal 1671 so that an activation signal coinciding with the operation of the frame thumbwheel and thumbscore wheel outputs is provided to other units in the scorer. A terminal 1672 is connected to the reset output terminal of multivibrator 1604 to indicate to external units of the scorer that a correction cycle is not in progress. The output terminal of NAND gate 1602 is connected to a terminal 1673 to indicate to other sections of the scorer that pinfall is being transferred from the pinfall switch into the operating register.

A pair of lamp drivers 1681 and 1682 are connected to the reset output terminal of multivibrator 1604 to illuminate the lamps in switch 67 when the switch is pressed and an "End of Computation" signal is being received.

The "OUT-OF-TURN TEAM-PLAYER" thumbwheel switch for indicating which player's score is to be selected or which player is bowling out-of-turn is located in the sequencer 11. However, the switch 48 on the control panel 28 is a circuit portion of the correction and out-of-turn unit 16. Moving the switch upward on the panel indicates that the out-of-turn player is bowling on lane 1 and pressing the switch downward indicates that the bowler is bowling on lane 2. Switch 48 is connected to ground a set input terminal of a bistable multivibrator 1660 when the switch is moved to the "LANE 1" position and to ground a set input terminal of a multivibrator 1661 when it is moved to its "LANE 2" position. Grounding of these set input terminals will set the respective multivibrator. A set output terminal of multivibrator 1660 is connected to an input terminal of a NAND gate 1662 and a set output terminal of multivibrator 1661 is connected to an input terminal of a NAND gate 1663 to place a binary one thereon when the respective multivibrators are set. Another input terminal of NAND gate 1662 is connected to the terminal 1259 to receive a binary one whenever a ball has been rolled on lane 1 and another input terminal of NAND gate 1663 is connected to the terminal 1213 to receive a binary one whenever a ball is rolled on lane 2. An output terminal of NAND gate 1662 is connected to an input terminal of the NAND gate 1610 and an output of NAND gate 1663 is connected to another input terminal of NAND gate 1610 so that a binary one, which indicates a special procedure is issued from the output terminal of NAND gate 1610 as is done when a correction is being made. This causes, as previously described, the desired player identification to be called into the operating register. A terminal 2021 is connected to an input terminal of a NAND gate 1665 and to an input terminal of a NAND gate 1666 so that an "End of Computation" signal appearing on terminal 2021 places a binary one on these NAND gates. NAND gate 1665 receives a binary one on its other input terminal when the "Lane 1" signal is present. NAND gate 1666 receives a binary one on its other input terminal when a "Lane 2" signal is present. Therefore, at the end of computation for an out-of-turn player, a binary zero will be issued by NAND gate 1665 or by NAND gate 1666 indicating that an out-of-turn player has completed bowling a ball on the appropriate lane. An output terminal of NAND gate 1665 is connected to reset input terminal of bistable multivibrator 1660 and an output terminal of NAND gate 1666 is connected to a reset input terminal of multivibrator 1661 so that either multivibrator 1660 or 1661 is reset when the "End of Computation" signal is received on terminal 2021 to prepare that multivibrator for the next out-of-turn cycle of the scorer. Thus, it is necessary to press the "OUT-OF-TURN PLAYER LANE" switch 48 before each out-of-turn ball is rolled.

A reset output terminal of multivibrator 1660 and a reset output terminal of multivibrator 1661 are connected to terminals 1667 and 1668 to provide an output "Not Out-of-Turn" signal to the player sequencer 11.

*Memory circuits*

The memory unit 15 is an all magnetic shift register composed of a series of multiaperture core elements in which flux passing in different directions can exit simultaneously in a single core. These flux patterns are setup by momentary current pulses and persist until changed. The memory has sufficient elements to store three hundred thirty binary bits of information.

Each bit of storage consists of two cores. When shift pulses are applied to a conventional trigger generator, indicated within box 1550 in FIGURE 34, it converts them to pulses at twice the frequency of the shift pulses. Trigger generator 1550 is connected to a pair of terminals 1551 and 1552 of memory 15 in order to shift alternatively odd and even cores. The trigger generator receives the shift pulses from a terminal 2071. An output terminal 1553 is connected to the memory output wave shaper **15*a* which consists of a pulse shaping network 1554 connected to a trigger input terminal of a delay multivibrator 1555. This delay multivibrator has a ten microsecond delay period during which it issues a binary one at an assertion output terminal. The assertion output terminal is connected to a terminal 1526, and a negation output terminal of multivibrator 1555 is connected to a terminal 1525 of the operating register SR. Thus, a sufficiently long well-shaped pulse is provided to the operating register to insure that all binary ones are properly transferred from the memory 15** to the operating register.

The memory input driver **15*b* comprises an AC multivibrator 1560 having terminals connected to terminals 2072 and 2073 of the operating register, a NAND gate 1561 having an input terminal connected to a set output terminal of multivibrator 1560, a delay multivibrator 1562 having a trigger terminal connected to an output terminal of NAND gate 1561, and a conventional set input driver circuit shown in box 1563 connected between a negative assertion output terminal of delay multivibrator 1562 and a bit input terminal 1564 of memory 15. A set input terminal and a reset input terminal of multivibrator 1560 are connected to a terminal 2070 to receive inverted shift pulses. Another input terminal of NAND gate 1561 is also connected to terminal 2070 to receive inverted shift pulses. When a binary one is stored in the final multivibrator (SR–22) of the operating register, the binary one will appear on the reset input terminal of mutilvibrator 1560, and a binary zero will appear on the set input terminal. Coincident with the leading edge of the shift pulses, multivibrator 1560 will be set and will apply a binary one to NAND gate 1561. After the shift pulse, a binary one will be applied to the other input of this NAND gate and delay multivibrator 1562 will be triggered. It, in turn, will trigger a set input driver amplifier circuit 1563 to set a binary one into the memory via a terminal 1564**.

*Memory reset unit*

Figure 35:
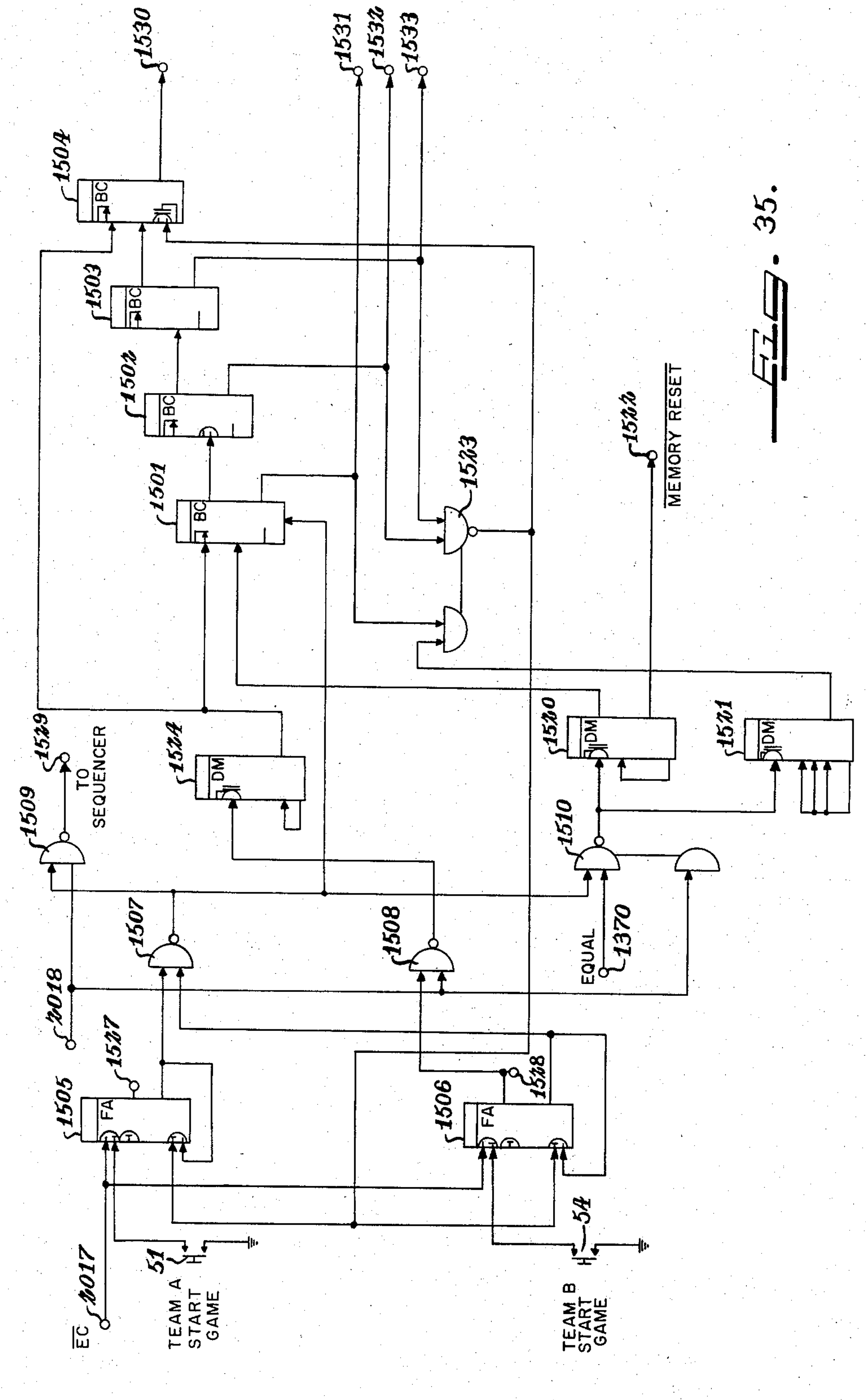
FIGURE 35 is a schematic diagram of a memory reset unit shown in FIGURE 4.

Referring now to FIGURE 35, the memory reset unit serves to call each player's word of a given team into the operating register, one at a time, where the words are then reset and shifted out. The principal circuit of the memory reset unit is a binary counter which sequentially counts up the identification code of the players on a given team. The binary counter consists of four multivibrators 1501–1504. The Team A "START GAME" switch 51 and the Team B "START GAME" switch 54, shown in FIGURE 2, are connected to AC set input terminals of bistable multivibrators 1505 and 1506, respectively. When a player presses the switch 51, multivibrator 1505 is set. Reset output terminal of the bistable multivibrators 1505 and 1506 are connected to input terminals of NAND gate 1507. The output terminal of NAND gate 1507 is connected to a NAND gate 1509, a NAND gate 1510, and to the common reset terminals of the bistable multivibrators 1501–1504.

The operation of switch 51 thus removes the reset signal from the common reset terminals of the four multivibrators. A complement of an "End of Computation" signal ($\overline{EC}$) is received on the terminal 2017 which is connected to the set level control input terminal of NAND gates 1505 and 1506. When the "End of Computation" complement signal is received, NAND gate 1509 locks bistable multivibrator 1230 in the pinfall sequencer 12 in its set position thus preventing issuance of any "Pinfall Ready" signal. Another input terminal of NAND gate 1510 is connected to terminal 1370 to receive the "Equal" signal. An output terminal of the NAND gate 1510 is connected to trigger terminal of a 200 microsecond delay multivibrator 1520 and to the trigger terminal of a 215 microsecond delay multivibrator 1521. When the multivibrator 1505 is set and the NAND gate 1510 receives an "Equal" signal from terminal 1370, both of the delay multivibrators will be triggered by the next timing pulse on terminal 2018. An assertion terminal of delay multivibrator 1520 is connected to a complement input terminal of bistable multivibrator 1501 so that the binary counter 1501–1504 will increment by one at the end of the 200 microsecond delay period. The negation terminal of delay multivibrator 1520 is connected to a terminal 1522 in order to apply a binary zero on a memory reset bus bar. Incrementing of the counter causes the counter output to differ from the identification of the player word in the operating register. The comparator now puts out a binary zero on its "Equal" signal terminal 1370, and the memory shifting procedure begins. In time, the proper player word 0001 is located and the equal signal returns on terminal 1370. This again initiates a reset and count cycle through delay multivibrator 1520. NAND gate 1523 is responsible for stopping the reset cycle at the proper point. This unit detects binary zeros in at least three digits of the identification by having three of its input terminals connected to a reset output terminal of each of the bistable multivibrators 1501–1503. After all words on either team are reset, the counting action will increment the binary counter so its last three digits are binary zeros. During the incrementing, the delay multivibrator 1521 is in the delay cycle. The negation output terminal of this delay multivibrator is connected to an input terminal of NAND gate 1523. Thus, after the delay period of delay multivibrator 1521 all inputs to NAND gate 1523 are binary one and its output terminal, which is connected to an AC reset input terminal of the bistable multivibrator 1505 and an AC reset input terminal of the bistable multivibrator 1506 becomes a binary zero. Since resetting was to occur for Team A, bistable multivibrator 1505 will have been previously set so it is now reset, thus completing the cycle.

When the Team B "READY TO START GAME" button 54 is pressed, a cycle of identical operations occurs when bistable multivibrator 1506 is set and an "End of Computation" signal is received on a level set control terminal of multivibrator 1506. A delay multivibrator 1524 which has an input trigger terminal connected to the output terminal of NAND gate 1508 is energized. Since a negation output terminal is connected to a DC input terminal of bistable multivibrators 1501 and 1504, these multivibrators are set to binary one. This action calls the first player of Team B, which is Player 9, into the register, and action proceeds as it does for Team A.

*State and output control unit*

There are basically seven sets of computation instructions which may be issued to the arithmetic unit for it to perform the proper scoring of a pinfall to the previous accumulated score. One of these seven sets of instructions will apply for each totalizing operation done by the arithmetic unit 10. Each set of instructions is applicable for a given situation which corresponds to one of seven states of a bowling game which are that a first ball has been rolled following an open frame, a first ball has been rolled following a single strike, a first ball has been rolled following two strikes, a first ball has been rolled following a spare, a second ball has been rolled in an open frame (if not preceded by a strike), a second ball has been rolled following a strike, and all bowling has ceased. In order to identify these seven states and to identify the sets of rules for computing by the arithmetic unit, these seven scoring states have been numbered 1 to 6 and "S" for the stop state condition as indicated in Table III.

TABLE III.—STATE AND SCORING STATUS

| State | SR–1 | SR–2 | SR–3 | |
|---|---|---|---|---|
| 1 | 1 | 0 | 0 | First ball following open frame. |
| 2 | 0 | 1 | 0 | First ball following a single strike. |
| 3 | 1 | 1 | 0 | Second ball in an open frame (if not preceded by a strike). |
| 4 | 0 | 1 | 1 | First ball following two strikes. |
| 5 | 1 | 1 | 1 | Second ball following a strike. |
| 6 | 1 | 0 | 1 | First ball following a spare. |
| S | 0 | 0 | 0 | Stop state—all bowling ceased. |

Figure 36:
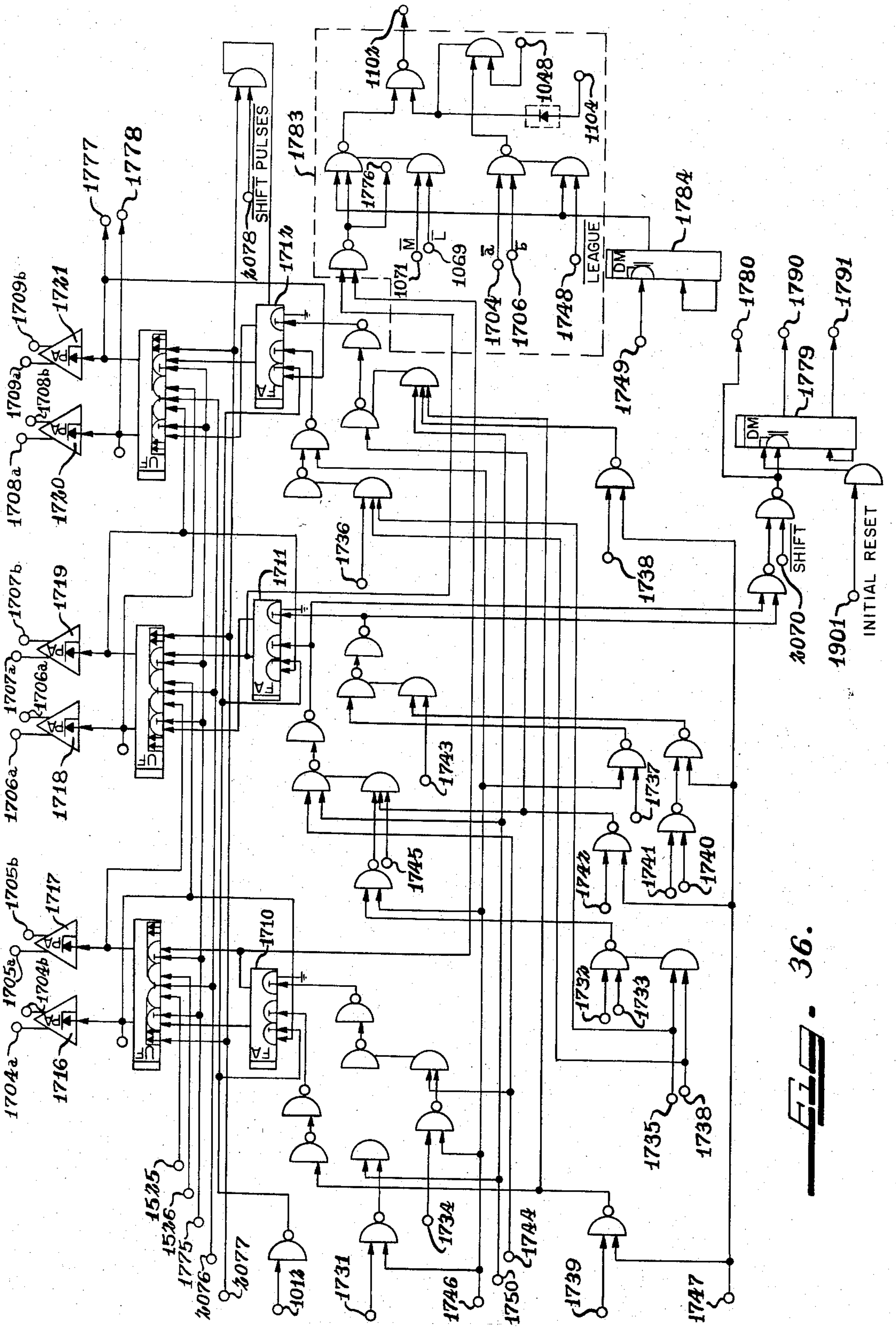
FIGURE 36 is a schematic diagram of a state changing section of a state and output control unit shown in FIGURE 4.

Besides the state numbers and a statement of the states, the above table shows the binary code numbers which indicate the seven states as they appear in portions SR–1, SR–2, and SR–3 of the operating register shown in FIGURE 36. The state and output control unit 17 not only detects the player state for each pinfall received but it also computes a new state for the computation of the subsequent pinfall. When a player word arrives in the operating register, the player's state is contained in the last three bits, SR–1 through SR–3. This state, when combined with other inputs, produces the instructions for the computations to be performed by the arithmetic unit utilizing pinfall it has received.

Figure 37:
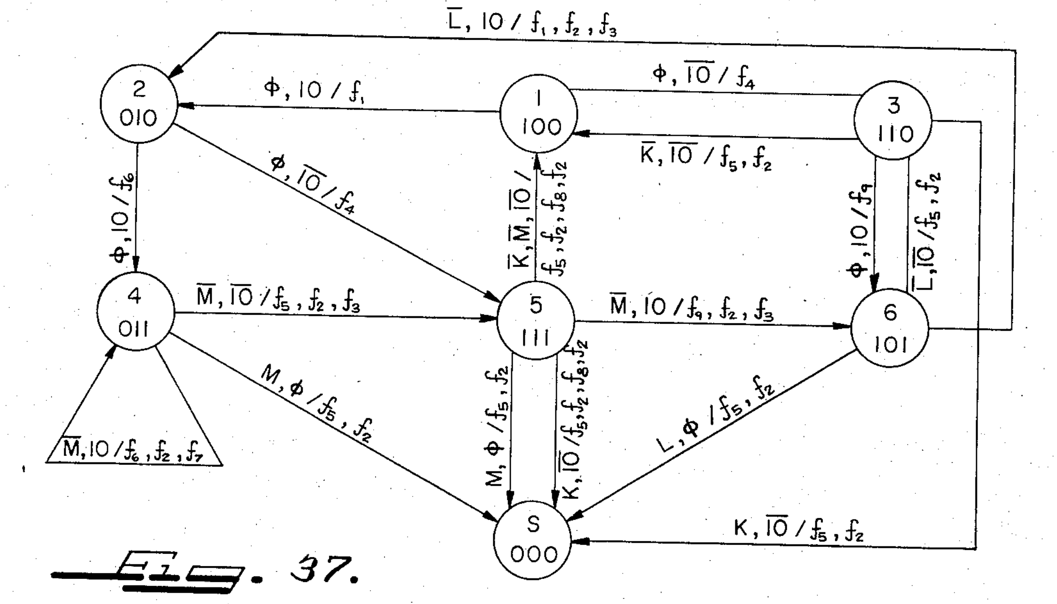
FIGURE 37 is a procedure diagram illustrating the relationship of various operating procedures performed by the state and output control unit shown in FIGURE 4.

FIGURE 37 is a diagram of the relation of the seven scoring states; each of the circles includes the state number found in Table III and the binary code associated therethrough. The circles are joined by a system of arrows each of which contains the notation of two symbols, a slant line, and one or more symbols. The two symbols before the slant line indicate the frame and pinfall information, respectively, which are utilized to decide what state the player's score will be in following the completion of a scoring of a pinfall under computation at the time. Definitions of these symbols are found in Table IV.

TABLE IV

The first symbols referring to frame are:

$\phi$=frame is not important (often called a "don't care" condition)
J=first ball in tenth frame
K=second ball in tenth frame
L=first ball in eleventh frame
M=second ball in eleventh frame Any barred notation (i.e., $\bar{L}$) represents the negation of the function. Thus $\bar{L}$ means "not L," or not the first ball in the eleventh frame.

The second symbols referring to pinfall are:

$\phi$=pinfall is not important
10=ten pins down
$\overline{10}$=less than ten pins down The symbols after the slant line represent the set of instructions that must be carried out once the frame number and the general result of pinfall are known in order to complete the instructions in the player's word for the computation of that particular pinfall. The circle at the arrowhead, indicates the state and its binary identification which is computed and placed in the first three bits of the word at the end of a computation of pinfall to provide instructions for the computation of a subsequent pinfall. The functions, if there are more than one, are carried out in the order they appear on an arrow. The significance of these functions are shown in Table V.

TABLE V

| | | | | |
|---|---|---|---|---|
| $f_1$=1, | 2, | 0, | P, | 1 |
| $f_2$=0, | 0, | S, | 0, | 0 |
| $f_3$=0, | 0, | 0, | 10, | 0 |
| $f_4$=1, | 1, | 0, | 0, | 0 |
| $f_5$=1, | 1, | 0, | P, | 0 |
| $f_6$=1, | 2, | 0, | P, | 2 |
| $f_7$=0, | 0, | 0, | 20, | 0 |
| $f_8$=0, | 0, | 0, | P, | 0 |
| $f_9$=1, | 1, | 0, | P, | 1 |
| ↑ Print Box When=To 1 | ↑ Add # Shown to Box Printer Location | ↑ Print Score when "S" | ↑ Add this # to Score | ↑ Add this # to Mark Total |

The first function following the slant line is referred to as a Rank 1 function, meaning it is the first to be performed. If there is a second symbol, it is referred to as Rank 2, a third as Rank 3, and a fourth as Rank 4.

Thus, to go from one state to another, the appropriate circle indicates the state in which the condition of a player's score was at the time he rolled a ball, and the circle to which the proper arrow points indicates the state in which his score will be after computation of the pinfall resulting from the rolling of the ball. For example, in going from state 4 to State 5, function $f_5$ is first performed, then $f_2$, and finally $f_3$.

Turning now to FIGURE 36, the state and output control unit 17 is connected to the first three multivibrators SR–1, SR–2, and SR–3 of the operating register. Table VI below shows the outputs that are produced by the three operating register multivibrators SR–1, SR–2, and SR–3 when the binary code for the various particular states are shifted into them.

TABLE VI

| State | Binary one Present on Terminals | Scoring Status |
|---|---|---|
| 1 | 1705, 1706, 1708 | First ball following open frame. |
| 2 | 1704, 1707, 1708 | First ball following a single strike. |
| 3 | 1705, 1707, 1708 | Second ball in an open frame (if not preceded by a strike). |
| 4 | 1704, 1707, 1709 | First ball following two strikes. |
| 5 | 1705, 1707, 1709 | Second ball following a strike. |
| 6 | 1705, 1706, 1709 | First ball following a spare. |
| S | 1704, 1706, 1708 | Stop state—all bowling ceased. |
| $\phi$ | 1704, 1706, 1709 | "Don't care" (never produced). |

To supply a series of terminals 1704–1709 with the proper binary ones as indicated in Table VI, a series of power amplifiers 1716–1721 have their respective input terminals connected to the respective three set output terminals and the three respective reset output terminals of the three multivibrators SR–1, SR–2 and SR–3. Since the three multivibrators are connected to form a portion of the operating register which is a shift register, these terminals are also connected to the respective level control terminals of the respective subsequent binary multivibrator in the operating register.

Figure 38:
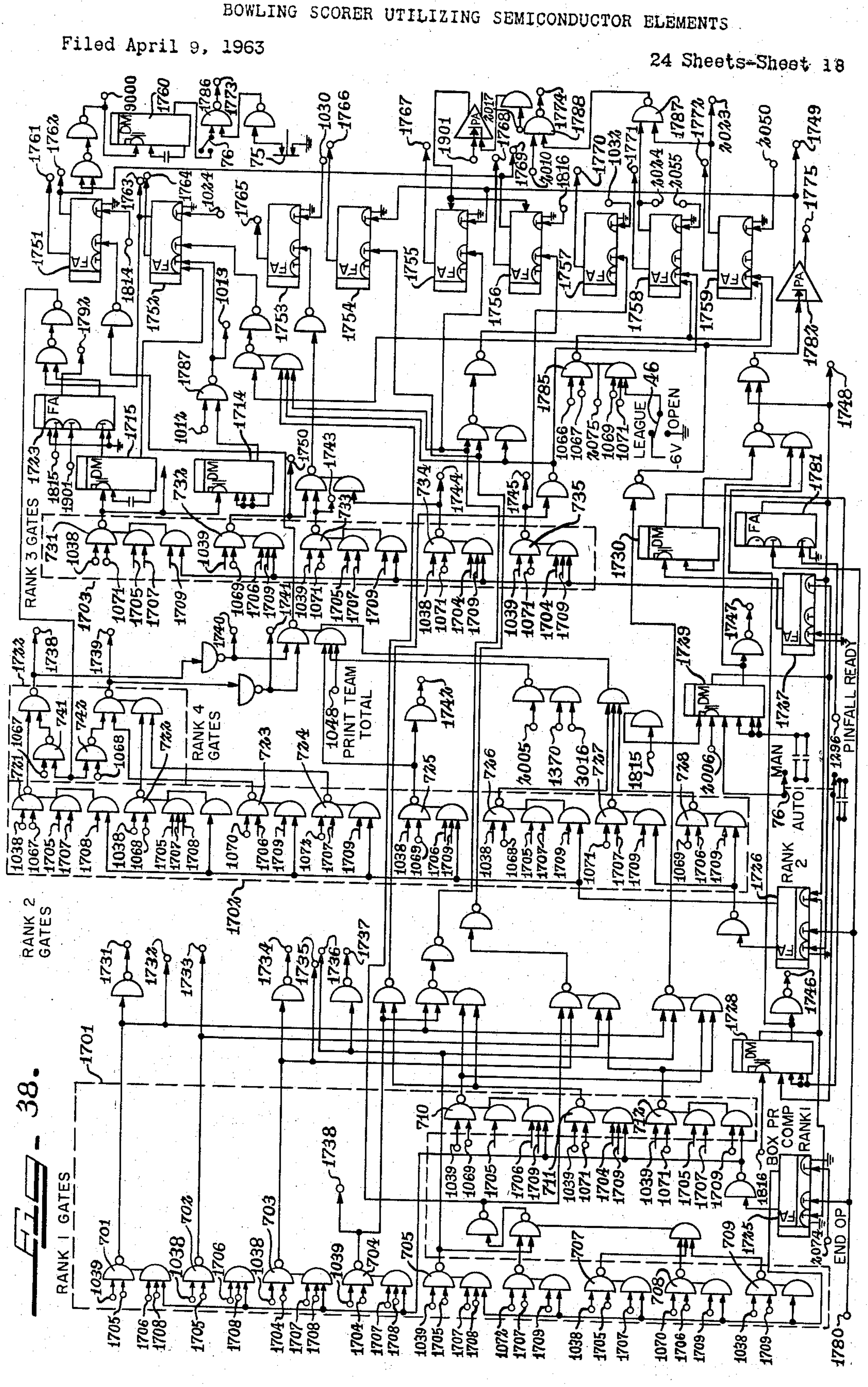
FIGURE 38 is a schematic diagram of a detection section of the state and output control unit shown in FIGURE 4.

Referring now to FIGURE 38, a group of Rank 1 NAND gates 701–712 are generally indicated by being enclosed in a dashed line 1701, group of Rank 2 gates are generally indicated by being enclosed in a dashed line 1702, a group of Rank 3 gates are generally indicated by being included within the dashed line 1703 and a small group of Rank 4 gates are indicated by being included within a dashed line 1722. The ranks refer to the order in which any of the nine functions are to be performed as indicated in FIGURE 37. Thus, for example, in going from circle 5 to circle 6, which is the passage from State 5 to State 6, Function $f_9$ is a Rank 1 function, Function $f_2$ in a Rank 2 function, and Function $f_3$ is a Rank 3 function, indicating that they are performed in that order. Each group of rank gates includes a series of selecting gates 701–712; 721–728; 731–735; and 741–742 which are arranged to detect the information necessary to determine whether a particular function which might occur in each rank is to be performed by the rank. To make such a determination, the NAND gates in each rank group of NAND gates must be capable of receiving states contained in SR–1, SR–2, and SR–3, whether the last pinfall was ten or less than ten and whether one of the following situations prevails or does not prevail.

First ball in tenth frame has been rolled (J)
Second ball in tenth frame has been rolled (K)
First ball in eleventh frame has been rolled (L)
Second ball in eleventh frame has been rolled (M)
Frame is not important ("Don't Care" condition)

Any barred notation ($\overline{L}$) represents the negation or complement function, thus ($\overline{L}$) means "not L" or not the first ball in the eleventh frame. Referring again to FIGURE 37, the first symbol on each arrow refers to the frame information and the second symbol refers to whether or not a count of ten was accomplished on the pinfall being computed. It will be noted that $\phi$ appears both in the first and second character position on some of the arrows indicating that either the frame is not important or pinfall is not important, respectively.

In order to determine from the state code contained in SR–1, SR–2, and SR–3 and the necessary frame and ten or less pinfall information, the NAND gates of the four groups 1701, 1702, 1703, and 1722 have input terminals connected through terminals 1704–1709 to the power amplifiers 1716–1721 to receive the presence of the binary characters contained in SR–1, SR–2, and SR–3. One terminal of each pair 1704 and 1705 or 1706 and 1707 or 1708 and 1709 will contain binary one depending on the state of SR–1, SR–2, and SR–3, respectively. Thus, when one of the NAND gates needs to know that the first character of the state identification code is a binary zero, it receives a binary one on its appropriate terminal. By providing definite binary one signals for both the presence of binary one and zero in the state identification code, the NAND gates in the four groups can have their inputs so arranged that they will actuate further circuits when all their inputs are binary ones by issuing a binary zero from their output terminals. Each one of the power amplifiers 1716–1721 has two output terminals being connected to terminals 1704*a* and 1704*b*, 1705*a* and 1705*b*, 1706*a* and 1706*b*, 1707*a* and 1707*b*, 1708*a* and 1708*b*, and 1709*a* and 1709*b*. The indication of small *a*'s and small *b*'s merely indicates that there are two actual outputs of a given signal from the amplifiers. In referring to a detection section of the state and output control unit shown in FIGURE 38, the numbers of the terminals connected to the power amplifiers are not indicated with a small *a* or small *b* since it is immaterial as far as the theoretical functioning of the circuit as to which output terminal of a power amplifier they are connected to. Thus, in order to distribute the load, about half of the inputs which are indicated by a general terminal number in FIGURE 38 will be connected to the terminal in FIGURE 36 being indicated by a small *a* and the other half to the terminal being indicated by a small *b*. Thus, the four groups of NAND gates are connected to receive the state information from SR–1, SR–2, and SR–3. A number of them must also receive frame information. This information is received from the operating register through the arithmetic unit 10 and placed on the appropriate NAND gate inputs. The third general category of information that the groups of NAND gates must receive is the ten or less pinfall information. This is recived by their appropriate input terminals from connecting terminals 1038 and 1039. The "Ten" and "Less than Ten" pinfall signals appearing on these terminals are produced in the arithmetic unit 10 as will be presently described. Thus, in summary, the NAND gates are connected to SR–1, SR–2, and S3 to the operating register and to the arithmetic unit to obtain their necessary information to make a decision as to which of the nine functions must be performed and to set up the new identification code of the state resulting from the pinfall. For example, referring to FIGURE 37, if the state previous to the pinfall was 5, if it was not the second ball in the eleventh frame and if the pinfall was 10, the NAND gates must signal that the functions $f_9$, $f_2$, and $f_3$ shall be performed and the new state is 6. State 6 must be placed in SR–1, SR2, and SR–3. In order to accomplish the functions, the various outputs of the groups of the NAND gates in the four groups of NAND gates are connected to multivibrators 1751–1759 so that the respective multivibrators are set when a particular function is required. The outputs of these multivibrators are connected to a set of terminals 1761–1772 to issue the appropriate control signals when required as follows:

| Terminal number: | Control signal |
|---|---|
| 1761 | PRINT SCORE. |
| 1762 | DO NOT PRINT SCORE. |
| 1763 | DO NOT ADD PINFALL TO SCORE. |
| 1764 | ADD PINFALL TO SCORE. |
| 1765 | ADD 10 TO SCORE. |
| 1766 | ADD 1 TO BOX PRINT LOCATION. |
| 1767 | ADD 2 TO BOX PRINT LOCATION. |
| 1768 | PRINT BOX SCORE. |
| 1769 | DO NOT PRINT BOX SCORE. |
| 1770 | ADD 20 TO SCORE. |
| 1771 | ADD 2 TO MARK TOTAL. |
| 1772 | ADD 1 TO MARK TOTAL. |

As will be presently described, the control signals appearing on these terminals are utilized to command the operation of various portions of the arithmetic unit 10 and the output unit 18.

Since the functions must be performed in the proper order, there must be a delay between the output command from the Rank 1 NAND gates before the Rank 2 NAND gates command the Rank 2 functions and there must be a delay before the Rank 3 NAND gates issue signals for the functions commanded by Rank 2 to be completed, and in like manner, the Rank 4 signals must not be issued before the functions indicated by Rank 3 have been completed. In order to provide a time delay between the issuing of signals from each of the four respective ranks, a set of delay multivibrators 1728, 1729, 1730, 1714, and 1715 are provided. Referring to FIGURE 38 and Table V, every function that appears as a first rank function which is followed by a second higher rank function calls for the printing of a box score signal to be issued from terminal 1768. The operation of this box printing will be described presently.

Subsequent to the printing of a box score, either an automatic or manual "Box Print Complete" signal is received on a terminal 1816 connected to a trigger input terminal of the delay multivibrator 1728. The NAND gates in the four groups of NAND gates have another input terminal which receives an actuation signal from one of four rank timing multivibrators, 1725 for Rank 1, 1726 for Rank 2, 1727 for Rank 3, and 1715 for Rank 4. Each respective multivibrator is connected to one input of each NAND gate in its respective rank group of NAND gates so that the NAND gates will issue binary zeros only when they receive the timing pulse from the respective timing multivibrator. When a multivibrator 1725 is the Rank 1 timing multivibrator, it is reset by receiving a "Pinfall Ready" signal, it issues a binary one to all the NAND gates of the Rank 1 group 1701 so that if any of them have received binary ones from the operating register, from the pinfall ten or less circuitry in the arithmetic unit 10, or frame information circuitry of the operating register and arithmetic unit, they will then be able to issue a binary zero signifying that a particular operation is to be performed as part of the first function. The "Print Box Complete" signal received by the delay multivibrator 1728 triggers its 11.5 microsecond delay. At the end of this 11.5 microsecond period, delay multivibrator 1728 issues a signal to the set input terminal of multivibrator 1725 resetting it and a signal to a reset terminal of Rank 2 timing multivibrator 1726. The resetting of multivibrator 1726 causes it to issue a binary one timing pulse to all of the NAND gates in Rank 2. It will be noted from FIGURE 37 that the function $f_2$ is the only second rank function that must be determined by the second rank NAND gates. However, a large number of NAND gates are required to detect this function because it must be detected leaving all but States 1, 2 and 3 and for various frame and pinfall information. The one operation that Function $f_2$ refers to is the issuing of a "Print Score" signal. Thus, all the Rank 2 NAND gates are connected to the print score command multivibrator 1751. After it issues its "Print Score" signal a signal will eventually appear on the terminal 2006 which is connected to a trigger input terminal of delay multivibrator 1729 to trigger its delay period of 11.5 microseconds. At the end of this delay period, it issues a signal from its set output terminal which is connected to a set terminal of Rank 2 multivibrator 1726 and to the reset terminal of Rank 3 multivibrator 1727 to set the Rank 2 multivibrator and to reset the Rank 3 multivibrator. The Rank 3 NAND gates detect the need for performing either functions $f_3$, $f_7$, or $f_8$ which are to add either 10, 20, or the actual pinfall to the score in the register. Therefore, they will issue a signal to multivibrators 1753, 1757, or 1752 to command them to issue the appropriate "Add 10, 20, or Pinfall" signal from terminals 1765, 1770, or 1764, respectively.

At the time Rank 3 multivibrator 1727 is reset in order to time the Rank 3 NAND gates, its set output, which is connected to a trigger terminal of the delay multivibrator 1730 issues a binary zero to initiate the 200 microsecond delay of delay multivibrator 1730. An assertion output terminal of delay multivibrator 1730 is connected to the set input terminal of the Rank 3 multivibrator 1727 to set it. Thus, Rank 3 multivibrator 1727 is set 200 microseconds after it has been thrown to its reset position timing the Rank 3 NAND gates. The 200 microsecond period is sufficient for the NAND gates to issue their appropriate signals although not necessarily sufficient to allow for the action initiated by the command signals to take place. The action, however, will continue until completed. The only Rank 4 function is $f_2$ and the only operation in $f_2$ is the "Print Score" command. Thus, the only command to be issued as a result of the action of the Rank 2 NAND gates is the issuing of a "Print Score" command signal by multivibrator 1751. If a fourth rank function is required, the first NAND gate of the Rank 3 NAND gates will trigger delay multivibrators 1714 and 1715 through their respective set input terminals. Delay multivibrator 1714 has a 215 microsecond delay period before it issues a signal through a reset output terminal, which is connected to the set input terminal of multivibrator 1752 in order to have it issue an "Add Pinfall to Score" command signal at terminal 1764. It will be noted that multivibrators 1714 and 1715 are triggered by the first Rank 3 NAND gate only when the fourth rank function $f_2$ is required. Referring to FIGURE 37, it will be noted that this would be going from State 5 to either State 1 or State S. The only difference between the decision to go to State 1 or State S would be whether the pinfall results from the second ball in the tenth frame or not. Thus, the first NAND gate of the Rank 3 group 731 detects all the necessary information except whether this is the second ball in the tenth frame when it triggers delay multivibrators 1714 and 1715. Delay multivibrator 1715 has a 2,200 microsecond delay. Its set output terminal is connected to a reset input terminal of the Rank 4 timing multivibrator 1723 and its reset output terminal is connected to a control level set input terminal of the output command multivibrator 1752 so that the multivibrator 1752 can be set by delay multivibrator 1714 only during the 2,200 microsecond delay period of multivibrator 1715. When the Rank 4 multivibrator 1723 is reset, it places a signal on the inputs of the Rank 4 NAND gates 1722. One of these NAND gates will issue a binary zero if it is the second ball in the tenth frame and the other will issue a signal if it is not the second ball in the tenth frame. Thus, an output signal will appear either on terminal 1738 or 1739. The issuance of a binary zero by either gate will initiate the setting of print score command multivibrator 1751 so that it issues a print score command at terminal 1761.

Referring to FIGURE 36, a set of output terminals 1731 through 1745 of the four ranks of NAND gates are connected to the input terminals of various NAND gates which form three groups of NAND gates each of which has its final output terminals connected to the input terminals of multivivrators 1710, 1711, and 1712, respectively. Thus, the four ranks of NAND gates can provide output signals which are combined by the NAND gates shown in FIGURE 36 to set up a binary code of a new state in three multivibrators 1710–1712. The output terminals of these three multivibrators are wired to the set and reset level control input terminals of the three multivibrators SR–1, SR–2, and SR–3 of the operating register. In each of the groups of NAND gates 1701–1703, which are the Rank 1, 2, and 3 gates, are the necessary circuits to detect that this particular rank is to be the last rank required in going from one state to another. These signals having been produced by the circuit shown in FIGURE 38 appear in the circuit of FIGURE 36 so that they finally trigger a delay multivibrator 1779 and issue an "End of Operation" signal on a terminal 1780. As shown in FIGURE 38, the signal on terminal 1780 is connected to the timing multivibrators 1725–1727 to cause them to be set. In addition, terminal 1780 is connected to a multivibrator 1781 which has its set output terminal connected to reset level terminals of multivibrators 1726 and 1727 to prevent these Rank 2 and Rank 3 timing multivibrators from being set at the end of the 11.5 microsecond delay period of delay multivibrators 1728 and 1729, respectively. Thus, if only a Rank 1 function is required, Rank 2 timing multivibrator is prevented from being reset and issuing a timing signal to the Rank 2 NAND gates and if two ranks are required but not a third rank function, Rank 3 timing multivibrator 1727 is prevented from resetting and issuing a timing signal to the Rank 3 NAND gates after the Rank 2 functions have been performed. As previously explained, the Rank 4 gates are placed in action only when the first Rank 3 gate has determined that there shall be a Rank 4 function. The output terminal of multivibrator 1781 is also connected to a terminal 1775 through a power amplifier 1782. Referring again to FIGURE 36, it will be noted that the terminal 1775 is connected to the AC set and AC reset input terminals of SR–1, SR–2, and SR–3, so that when multivibrator 1781 is set by an "End of Operation" signal from terminal 1780, a state code contained in the bistable multivibrators 1710–1712 will be transferred to SR–1, SR–2, and SR–3, so that the operating register SR now contains the new state resulting from the pinfall.

After any player finishes bowling, it is desirable to increment the sequencer to prepare for the next player. All states not involving a second ball (States 1, 2, 4, 6 and S) should cause incrementing, except when the player is bowling as the result of marking in the tenth frame. The player sequencer 11 should be incremented to the next player after a mark or team total printing. The set of NAND gates within a dashed line 1783 detect this information by being wired, as shown in FIGURE 36, to bistable multivibrators 1710 and 1711, to the operating register, to the arithmetic unit, and to the "LEAGUE-OPEN BOWL" switch 46. Multivibrator 1781 provides a signal to terminal 1749 to power amplifier 1782 at the same time it applies a signal to terminal 1775. Terminal 1779 is connected to a delay multivibrator 1784 which has a delay period of ten microseconds which allows time for the state code in multivibrators 1710–1712 to be transferred to SR–1, SR–2, and SR–3 before delay multivibrator 1784 issues a signal at its assertion output terminal. This terminal is connected to input terminals of the NAND gate circuitry 1783 allowing it to produce an increment sequencer signal at terminal 1102 of the sequencer unit 11.

The command multivibrators 1758 and 1759 which perform the function of issuing "Add 2 To The Mark Total" signal or "Add 1 To The Mark Total" signal, respectively, will issue these signals at the terminals 1771 and 1772, respectively, if a strike or spare was made, and if the multivibrators were not inhibited at their set input level terminals by a binary one on an output terminal of a NAND gate 1785. The NAND gate 1785 receives on its input terminals the "League Bowling" signal of switch 46, the "Not First Ball In Tenth Frame" signal, the "Not Second Ball in Tenth Frame" signal, the "Not First Ball In Eleventh Frame" signal, and the "Not Second Ball In The Eleventh Frame" signal. In the tenth and eleventh frames, as well as in open bowling, no mark total is to be made. Thus, if the NAND gate 1785 receives on its input terminals an "Open Bowling" signal in the form of a "Not League" signal or if it receives any signal which indicates that the ball bowled was a tenth or eleventh frame ball, a binary one is issued to the set control levels of the multivibrators, preventing them from issuing any signal to add to the mark total. A reset output terminal of multivibrator 1758 and a reset output terminal of multivibrator 1759 are connected through a pair of NAND gates 1787 and 1788 to an output terminal 1774 to provide it with a "Not Mark Total" signal there. The utilization of the signal appearing on terminal 1774 will be described presently.

A set input terminal of a delay multivibrator 1760 is connected through a pair of NAND gates to a reset output terminal of print score command multivibrator 1751 and to the reset output terminal of print box score multivibrator 1756 in order that if either a "Print Score" or "Print Box Score" command signal is issued, the delay multivibrator 1760 will be triggered. Its delay period is several seconds. A negation output terminal of the delay multivibrator 1760 is connected through the "AUTOMATIC-MANUAL" switch 76 and a NAND gate 1786 to a terminal 1773 when the switch 76 is in the "Automatic" position in order to place a "Print Complete" signal on terminal 1773 during the delay period of the delay multivibrator 1760. If the switch 76 is in the manual position, the manual "PRINT COMPLETE" press switch 75 may be operated to apply a "Print Complete" signal to terminal 1773 when it is opened by being manually pressed. The connection of terminal 1773 to the circuitry of the output unit 18 will be described presently.

*Arithmetic unit*

The arithmetic unit performs the functions commanded by the state and output control unit at the proper time. In addition, it contorls the team total calculation, detects the code word, and generates the frame information for use elsewhere in the machine. The arithmetic unit is connected to multivibrators SR–4 through SR–22 of the operating register. SR–4 through SR–13 are shown in the score section of arithmetic unit 10 which is schematically illustrated in FIGURE 39 and SR–14 through SR–22 are schematically shown in FIGURE 40 which illustrates the box-frame locater and player identification sections of the arithmetic unit 10.

Figure 39:
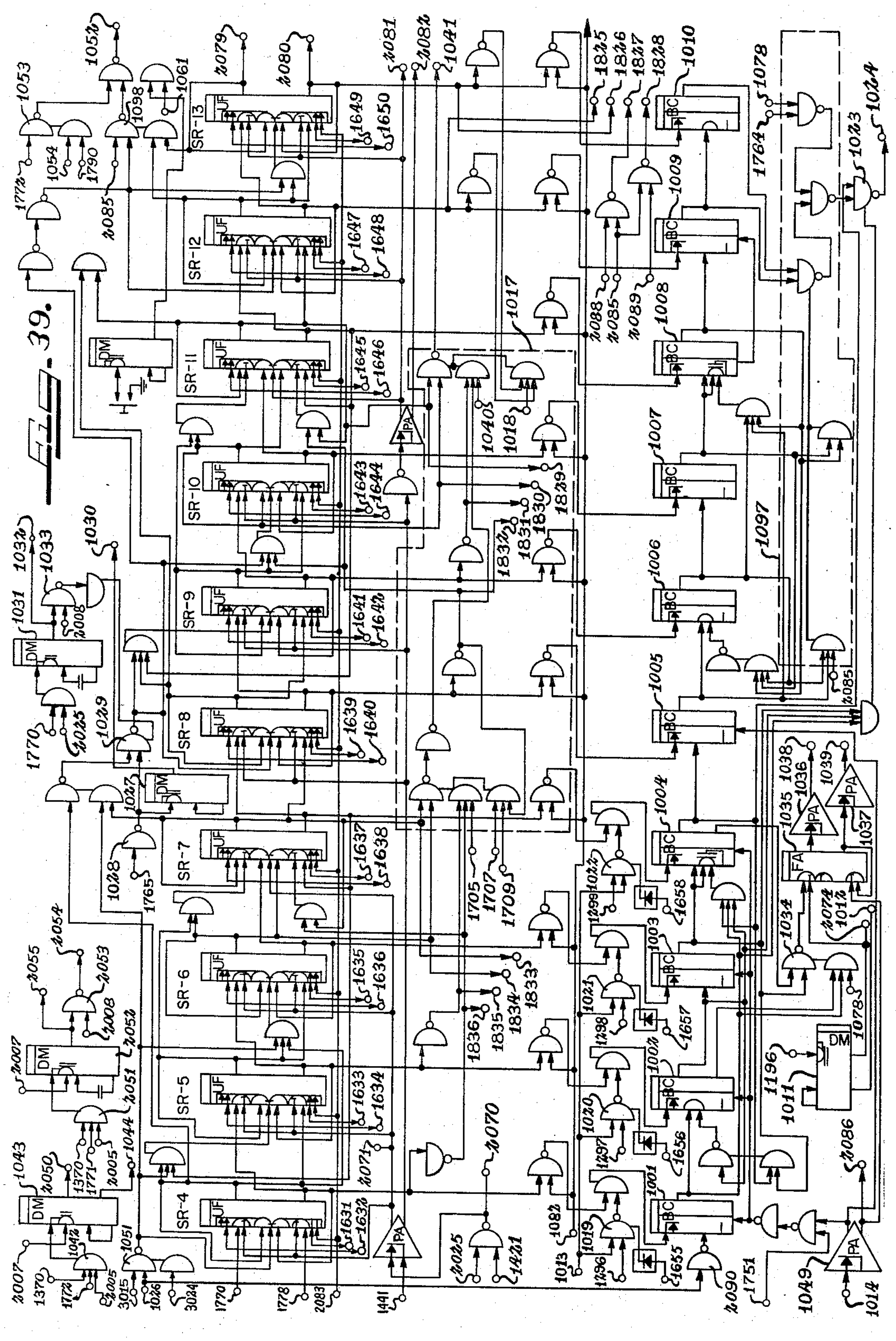
FIGURE 39 is a schematic diagram of a score section of an arithmetic unit shown in FIGURE 4.

Referring first to FIGURE 39, a delay multivibrator 1011 has its trigger terminal connected to terminal 1196 of the player sequencer 11 in order to receive the "Pinfall Ready" signal to commence its five microsecond delay period. During this five microsecond delay period, a binary zero is applied to terminal 1012 by having it connected to a reset output terminal of multivibrator 1011. Referring to FIGURE 38, terminal 1012 is connected through the NAND gate 1787 to a terminal 1013. Referring again to FIGURE 39, the terminal 1013 is connected to input terminals of NAND gates 1019, 1020, 1021, and 1022. The outputs of these NAND gates are, in turn, connected to input set node terminals of bistable multivibrators 1001, 1002, 1003, and 1004, respectively. The NAND gates 1019–1022 are connected via terminals 1296, 1297, 1298, and 1299 to the pinfall sequencer 12. Thus, the complement of the pinfall from an appropriate portion of the pinfall sequencer is available at input terminals of the NAND gates 1019–1022. However, these four multivibrators are wired to receive a binary one on their common reset input terminals and thus keep the set of multivibrators reading 1111. These four multivibrators, as may be seen from FIGURE 39, are wired as a four bit binary counter-register. Thus, although pinfall is available at the NAND gates 1019–1022, it cannot be registered in the binary counter of multivibrators 1001–1004 until the reset signal on their common reset input terminals is removed.

Referring again to FIGURE 39, the terminal 1197 from the pinfall sequencer 12 which carries the "Pinfall Ready" signal is connected to a terminal 1014 through a NAND gate which inverts it before applying it to a power amplifier 1049 which again inverts it and applies it through a series of two NAND gates to the common reset input terminals of the four bistable multivibrators 1001–1004. These various inversions result in the removing of the reset signal from the four bistable multivibrators. The gates 1019–1022 reinvert the complement of the pinfall data so that the actual pinfall is present in the binary counter composed of multivibrators 1001–1004 as soon as the reset signal is removed from the common reset input terminal of each multivibrator. Thus, a binary one on the complemented pinfall input to the respective NAND gates reports a binary zero or true pinfall into the inverted multivibrators. A set output terminal of each of the multivibrators 1001–1004 is connected to one of four input terminals of a NAND gate 1023 in order that an output terminal of NAND gate 1023 may issue a binary one to a terminal 1024 whenever one or more of the multivibrators constituting the binary counter contains a binary zero, thereby indicating that pinfall has been received from the sequencer and placed in the counter composed of the multivibrators 1001–1004.

Figure 40:
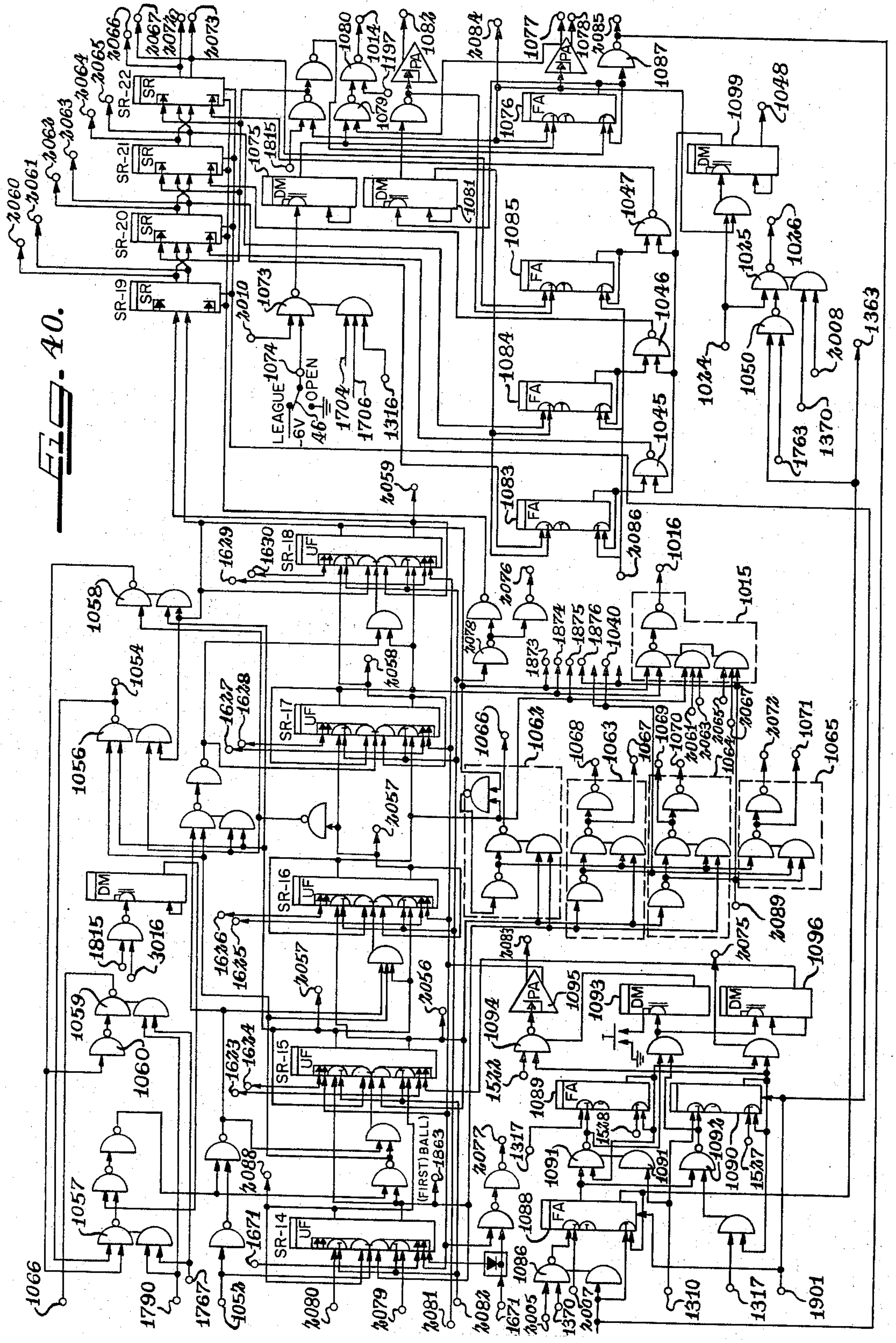
FIGURE 40 is a schematic diagram of a box-frame location and player identification section of the arithmetic unit shown in FIGURE 4.

Referring now to the box print location and player identification section of the arithmetic unit shown in FIGURE 40, terminal 1024 is connected to an input terminal of NAND gate 1025. An input terminal of a NAND gate 1050 is connected to the terminal 1763 to receive the "Not Add Pinfall to Score" signal from multivibrator 1752 in the detection section of the state and output control unit 17. The NAND gate 1050 has an output terminal connected to another input terminal of NAND gate 1025. In addition, NAND gate 1025 is connected to terminal 1370 to receive the "Equal" signals from the comparator and has an input terminal connected to a terminal 2008 to receive timing pulses from the timing unit. With these two NAND gate circuits, the output of which appears on terminal 1026 by being connected to output terminal of NAND gate 1025, count pulses are issued only as long as the "Not Add Complete" signal is present, the "Not Add Pinfall to Score" signal is present at an input to NAND gate 1050 which inverts this signal, and an "Equal" signal is present from the comparator. Thus, with the proper word in the comparator, a "Not Add Complete" signal from the score section of the arithmetic unit 10, pulses will appear on the terminal 1026 upon the "Not Add Pinfall" signal becoming a binary zero at terminal 1763 which causes the issuance of a binary one to NAND gate 1025. At this moment, all inputs to NAND gate 1025 are binary one except for the timing pulse which is a binary one for seven microseconds of each 200 microseconds. Thus, the timing pulses are allowed to pass through to terminal 1026. Referring again to FIGURE 39, the count pulses are applied to bistable multivibrator 1009 at a complement terminal through a NAND gate 2090 and to a complement input terminal of bistable multivibrator SR–4 through a NAND gate 1051. Thus, as the timing pulses are received, the binary counter composed of bistable multivibrators 1001–1004 counts downward while the multivibrators 1001–1010 will count upward. When a binary zero has been reached in each of the multivibrators 1001–1004, the "Add Complete" signal issued at terminal 1024 becomes a binary zero which causes NAND gate 1025 to cease passing counting pulses to terminal 1026. Thus, the pinfall count which was contained in the binary counter of multivibrators 1001–1004 has been transferred to the operating register, adding it to any previous score of the bowler.

Referring to FIGURE 39, the terminal 1765 of the state and output control unit 17, which issues the "Add 10 to Score" signal, is connected to the trigger input terminal of a delay multivibrator 1027 through a NAND gate 1028 in order to trigger the delay multivibrator which has a ten microsecond delay period. Terminal 1765 is also connected through NAND gate 1028 and a NAND gate 1029 to a complement input terminal of multivibrator SR–8. An assertion output terminal of delay multivibrator 1027 is connected to a terminal 1030 for the purpose of issuing a "Reset—Add 10 to Score" complement signal. Referring to FIGURE 38, terminal 1030 is connected to a reset input terminal of bistable multivibrator 1753 so that it is reset at the end of the ten microsecond delay period of multivibrator 1027.

The terminal 1770 of the state and output control unit which issues the "Add 20" signal is connected through a diode cluster to an input node terminal of delay multivibrator 1031. Timing pulses are applied through the same diode cluster to the input node terminal from the terminal 2025. Thus, when delay multivibrator 1031 receives both an "Add 20" signal and a timing pulse, it is triggered to begin a 400 microsecond delay period. During this delay period, a binary one appears on an assertion output terminal. This terminal is connected through a NAND gate 1033 which receives the complement of timing pulses on another input terminal from the terminal 2008, and through the NAND gate 1029 to the complement input terminal 23 of SR–8. Since the delay period of delay multivibrator 1031 is 400 microseconds long, two timing pulses will be transmitted through the circuitry to SR–8, causing it to increase the score by 20. The assertion output terminal of delay multivibrator 1031 is connected to a terminal 1032 for the purpose of issuing a "Reset—Add 20 to Score" signal to a respect input terminal of bistable multivibrator 1757.

Two of the pieces of information that were required as inputs to the four ranks of NAND gate groups were the "Pnfall 10" or "Less Than 10 Pinfall" signals. This information is supplied through a NAND gate 1034, a bistable multivibrator 1035, and a pair of power amplifiers 1036 and 1037 to terminals 1038 and 1039. A reset input terminal of multivibrator 1035 is connected to an output terminal of power amplifier 1049 in order that multivibrator 1035 may be rest during the pinfall ready delay period. NAND gate 1034 has its input terminals connected to the four bistable multivibrators 1001–1004 which compose the pinfall binary counter, as shown in FIGURE 39, so that a binary zero will be issued only when the counter contains binary 1010 which is decimal 10. At the end of the five microsecond delay period of delay multivibrator 1011, a new pinfall is contained in the binary counter but the down counting which, in effect, transfers this count to the shift register has not begun. The assertion output terminal of delay multivibrator 1011 is connected to a set input terminal of multivibrator 1035 in order to furnish a set signal to multivibrator 1035 for the five microsecond delay period. However, unless a binary zero has been supplied to the set level terminal of multivibrator 1035 by NAND gate 1034, multivibrator 1035 cannot be set. Thus, the binary equivalent of decimal 10 must be present in the counter before multivibrator 1035 can be set. In order that the "Les Than 10" and "10 Pinfall" signals may be issue to the multiplicity of NAND gates in the state and output control unit 17, a set output terminal and a reset output terminal of multivibrator 1035 are connected to terminals 1038 and 1039 through power amplifiers 1036 and 1037, respectively.

Referring now to FIGURE 40, it will be noted that the multivibrators SR–14 through SR–18 are not only connected to shift the bits of the binary words through them but are connected as a binary counter. This binary counter is for the storage and counting up of both frame and ball information. Table VII indicates the arrangement of binary numbers contained in SR–14 through SR–18 to indicate the ball and frame information.

TABLE VII

| SR-18 | SR-17 | SR-16 | SR-15 | SR-14 | Frame | Ball |
|---|---|---|---|---|---|---|
| 0 | 0 | 0 | 1 | 0 | 1 | 1 |
| 0 | 0 | 0 | 1 | 1 | 1 | 2 |
| 0 | 0 | 1 | 0 | 0 | 2 | 1 |
| 0 | 0 | 1 | 0 | 1 | 2 | 2 |
| 0 | 0 | 1 | 1 | 0 | 3 | 1 |
| 0 | 0 | 1 | 1 | 1 | 3 | 2 |
| 0 | 1 | 0 | 0 | 0 | 4 | 1 |
| 0 | 1 | 0 | 0 | 1 | 4 | 2 |
| 0 | 1 | 0 | 1 | 0 | 5 | 1 |
| 0 | 1 | 0 | 1 | 1 | 5 | 2 |
| 0 | 1 | 1 | 0 | 0 | 6 | 1 |
| 0 | 1 | 1 | 0 | 1 | 6 | 2 |
| 0 | 1 | 1 | 1 | 0 | 7 | 1 |
| 0 | 1 | 1 | 1 | 1 | 7 | 2 |
| 1 | 0 | 0 | 0 | 0 | 8 | 1 |
| 1 | 0 | 0 | 0 | 1 | 8 | 2 |
| 1 | 0 | 0 | 1 | 0 | 9 | 1 |
| 1 | 0 | 0 | 1 | 1 | 9 | 2 |
| 1 | 0 | 1 | 0 | 0 | 10 | 1 |
| 1 | 0 | 1 | 0 | 1 | 10 | 2 |
| 1 | 0 | 1 | 1 | 0 | 11 | 1 |
| 1 | 0 | 1 | 1 | 1 | 11 | 2 |

The addition of a binary one to any of the five bit notations makes it equal to the subsequent notation. Thus, for example, to go from the first ball in a frame to the second ball of the same frame, it is only necessary to add a binary one to the notation for the first ball of the frame. In like manner, to go from the second ball of a frame to the first ball of the next frame, it is only necessary to again add a binary one to the previous notation. Thus, the addition of a binary one indicates the advancement of one ball or one box on a score sheet. To move a whole frame or two boxes, it is necessary to add two to a previous notation. Since the multivibrators 1040–1044 form a binary counter, they will register the frame and ball information if they receive input pulses at the proper time on a terminal 1052 which is connected to a complement input terminal of multivibrator SR–14. The frame and ball information taken together consitute a box printer location which is utilized to direct the display of box score information in the appropriate box of a score sheet.

Referring now to FIGURE 39, the circuitry necessary to provide pulses to the binary counter will be described, A NAND gate 1053 has its inputs connected to terminal 1772 of the state and output control unit 17 for the purpose of receiving an "Add 1 to Box Print Location" signal, to a terminal 1054 for receiving an eleventh frame second ball signal, and to terminal 1790 of the state and output control unit 17 to receive an "End Operations" signal. If the ball rolled was not the last ball in the eleventh frame, the "End Operations" signal causes an output terminal of NAND gate 1053 to drop momentarily to binary zero. Since its output terminal is connected to an input terminal of a NAND gate 1055, a momentary binary one will appear on the terminal 1052 to which the output terminal of NAND gate 1055 is connected, causing the binary counter of SR–14 through SR–18 to count up by one. Considering that this binary counter contains the box printer location information, this information is thus incremented by one. Referring again to FIGURE 40, a NAND gate 1056 has its input terminals connected to a reset output terminal of multivibrator SR–14 through a NAND gate, and set output terminal of multivibrators SR–15, SR–16, and SR–18 to detect the presence of the binary number 10111 in the binary counter of SR–14 through SR–18. When this combination of binary bits is present in the binary counter, the output of NAND gate 1056 is a binary zero which it applies to terminal 1054 by having its output terminal connected thereto. Thus, the presence of an eleventh frame second ball signal from NAND gate 1056 inhibits the NAND gate 1053 from passing count pulses to the binary counter.

A NAND gate 1057 has its input terminals connected to the output terminal of NAND gate 1056 to receive a second ball in the eleventh frame signal, to an output terminal of a NAND gate 1058 to receive an eleventh frame signal, to terminal 1790 to receive an "End of Operation" signal and to terminal 1767 to receive an "Add 2 to Box Print Location" signal. Gate 1058 is connected to the binary counter composed of multivibrators SR–14 to SR–18 to detect scoring in the eleventh frame, as shown in FIGURE 40. The output of this gate becomes a binary zero during both balls of the eleventh frame. The output terminal of the NAND gate 1057 is connected through a series of NAND gates to a complement input terminal of mutivibrator SR–15. Thus, whenever the "Add 2 to Box Print Location" signal is produced, SR–15 is advanced by one, signifying that the frame and ball count, which is the same as the location of the box print location, is advanced by two.

The NAND gate 1056 does not allow the count in the binary counter, composed of multivibrators SR–14 to SR–18, to exceed the second ball in the eleventh frame. As soon as this point is reached, no further count may be put in by either the "Add 1" or "Add 2" circuitry as previously described.

If the ball rolled is the first ball in the eleventh frame, it is desirable to add one instead of two to the box printer location. Since gate 1057 is inhibited from passing pulses, other circuitry is provided to add one to the box print location count in the counter. A NAND gate 1059 has an input terminal connected to the output terminal of NAND gate 1058 through a NAND gate 1060. The output terminal of NAND gate 1059 is connected to a terminal 1061. Referring to FIGURE 39, the terminal 1061 is connected to an input terminal of the NAND gate 1055 so that after the first ball in the eleventh frame is rolled, the NAND gate 1055 will issue a pulse through terminal 1052 to the first multivibrator SR–14 in the binary counter.

The counter SR–14 through SR–18 is a straight binary counter used for the storage of the box printer location. However, in team totaling, the box printer location is of no significance but the score may need more than the ten binary coded decimal bits available. For this reason, in team totaling, SR–14 and SR–15 are utilized as the two highest order bits of the score, and these plus SR–12 and SR–13 are used as a binary counter with a miximum storage capacity of fifteen. Thus, the arithmetic unit can report scores during team totaling up to and including 1599.

As previously described, the four ranks of NAND gate groups require tenth and eleventh frame and ball information. In other words, many of the NAND gates require the knowledge of whether a particular ball rolled is a particular ball in the tenth or eleventh frame or is the complement of such a signal. A series of NAND gate circuits generally indicated by the circuits enclosed in dished lines 1062, 1063, 1064, and 1065 supply the frame and ball information required by the four ranks of NAND gate groups on terminals 1066–1072, as indicated in FIGURE 40. These terminals are shown in FIGURE 38 connected to input terminals of various NAND gates. As shown in FIGURE 40, each group of NAND gates has its input connected to various terminals of the binary counter SR–14 to SR–18 so that they can detect when the counter contains proper box print location information for a ball of the tenth or eleventh frame.

The circuitry for team totaling is contained in the arithmetic unit 10. An intermediate storage register composed of the bistable multivibrators 1001–1004, additional six bistable multivibrators 1005–1010, and a three bit register 1083–1085 are provided in order that when the detection of the stop state of any bowler is obtained, the player's score and identification may be transferred out of the operating register and stored. If the player is the first one on his team to finish, the mark total word for his team is called into the operating register and the score portion is reset. If he should not be the first player, the word is called into the operating register but is not reset. The player's score which has been transferred to the intermediate register may now be added to the score in the operating register, as will be presently described. Next, the identification of the mark total word is then replaced by the identification stored in the intermediate register. The score in the operating register which is now the team total score which accumulates all of the player's score down to the latest player being totalized may then be printed or displayed in the eleventh frame space in that player's line. The mark total word always contains the identification of frame eleven; therefore, the team total scores are always commanded to be placed in the frame eleven column. After the command for printing or displaying of the team total for each player's line has been issued, the last three digits of the player's identification in the shift register are reset to restore the proper identification of the mark total word.

The team totaling circuitry summarized above will now be described in greater detail. A gate 1073 has input terminals connected to terminal 2010 to receive "End of Operation" indication, terminals 1704 and 1706 for receiving the first two digits of the state identification in the shift register, terminal 1316 for receiving a "Shift Complete" signal, and the switch 46 for manual selection between a minus six volt source and circuit ground for the purpose of indicating league bowling when connected to ground. These inputs allow the NAND gate to detect entrance of a player into the stop gate. When such a detection is made, the output terminal of this gate drops to binary zero. It is connected to a set input terminal of a delay multivibrator 1075 which has a five microsecond delay period. During the delay period, an assertion output terminal becomes binary one. This terminal is connected to a bistable multivibrator 1076 through a set input terminal. A set output terminal of bistable multivibrator 1076 is connected to a terminal 1077 and a terminal 1078 through a power amplifier so that it normally issues a binary zero on these terminals indicating the "Not Team Total" signal. Terminal 1077 is also connected to terminal 1014 through a pair of NAND gates 1079 and 1080. Another input to NAND gate 1079 is from terminal of delay multivibrator 1075. Thus, during the five microsecond delay period, both inputs to NAND gate 1079 are binary one and a binary one will appear on terminal 1014. Referring to FIGURE 39, terminal 1014 is connected through a pair of NAND gates to the common reset input terminals of bistable multivibrators 1001–1004, as previously described, and to the common reset terminals of bistable multivibrators 1005–1010. Since all these ten bistable multivibrators are inverted, they are set whenever a binary one is issued at terminal 1014.

At the conclusion of the five microsecond delay period, multivibrator 1076 is set and its reset output terminal issues a binary zero. This terminal is connected to the set input terminal of a delay multivibrator 1081. The presence of the binary zero triggers the five microsecond delay period of delay multivibrator 1081 which initiates two actions since its assertion output terminal is connected through a NAND gate and a power amplifier to a terminal 1082 and its negation output terminal is connected to a set input terminal of a bistable multivibrator 1083 and an input set terminal of a bistable multivibrator 1084. The assertion terminal of delay multivibrator 1081 is connected through a NAND gate to a set input terminal of a bistable multivibrator 1085. Thus, a binary zero is placed either directly or indirectly on the set terminals of all three bistable multivibrators 1083–1085. The level set inputs of each of these multivibrators is controlled by the contents of the last three significant digits of the player identification stored in SR–20 through SR–22. Thus, the last three digits of player identification are transferred to and stored in bistable multivibrators 1083–1085, which form an intermediate register, whenever the set input terminals go to binary zero. Referring now to FIGURE 39, the terminal 1082 is connected to an input of a series of ten NAND gates which have a second input terminal connected to the reset output terminal of each of the ten multivibrators SR–4 through SR–13, respectively, and have output terminals connected to either the input set terminal or the input set node terminal of bistable multivibrators 1001–1004 and 1005–1010, respectively, in order to transfer the score contained in the operating register into the intermediate register.

Figure 43:
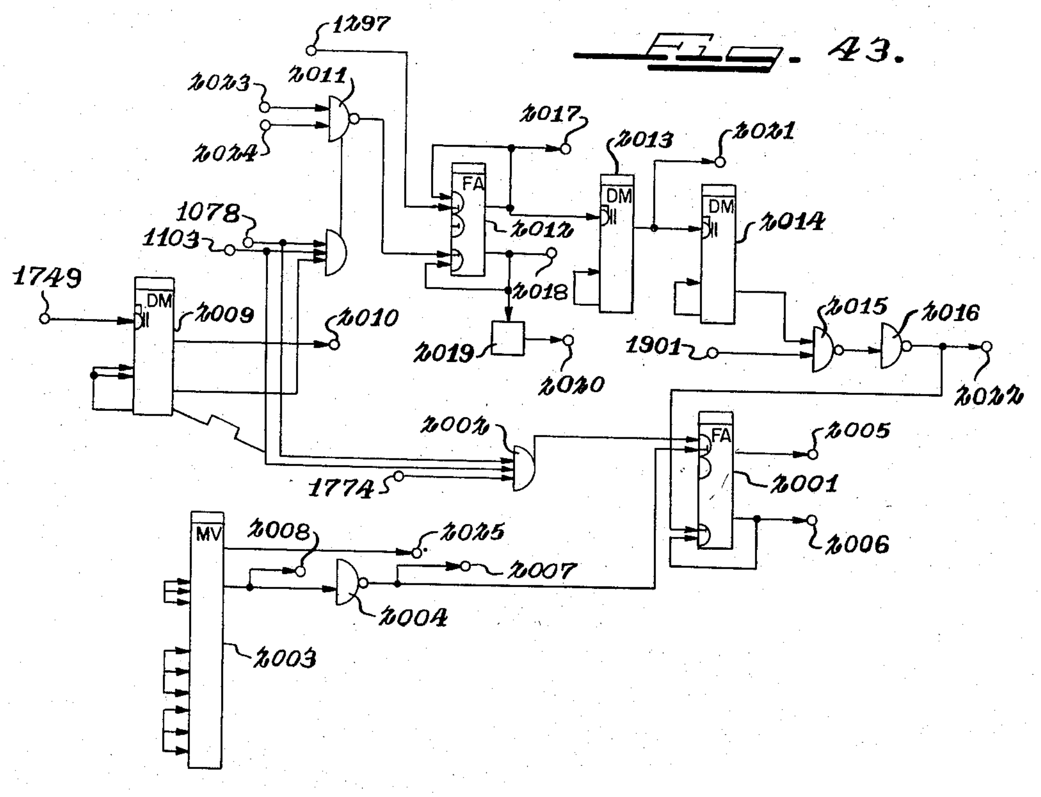
FIGURE 43 is a schematic diagram of a timing unit shown in FIGURE 4.

A the end of the five microsecond delay period, the "Not Team Total" signal, binary zero, is applied to a timing unit shown in FIGURE 43 through the terminal 1078. Terminal 1078 is connected to a set level control terminal of a bistable multivibrator 2001 through an AND gate 2002. The AC set input terminal of bistable multivibrator 2001 is connected to a multivibrator clock 2003 through a NAND gate 2004 for the purpose of receiving timing pulses. Therefore, at the trailing edge of the timing pulse after the level set input terminal of multivibrator 2001 has become binary one, the multivibrator will issue a TMT signal from its set output terminal which is connected to a terminal 2005. A reset output terminal of the multivibrator 2001 issues a $\overline{\text{TMT}}$ signal to the terminal 2006. Referring now to FIGURE 29, terminal 2006 places a binary zero on NAND gates 1196, 1197, and 1198 so that the player sequencer 11 issues the identification code of a team total word to the comparator. In this manner, a team total word is called into the shift register. The timing pulses issued by multivibrator 2003 are also placed on the terminal 2007 via the NAND gate 2004. Referring now to FIGURE 40, as soon as the proper team total word arrives in the operating register, the comparator unit 13 issues an "Equal" signal on its terminal 1370 which is connected to an input terminal of a NAND gate 1086. Another input is connected to terminal 2005 of the timing unit to receive the TMT signal, and an input terminal is connected to a reset output terminal of team total multivibrator 1076 through a NAND gate 1087. A bistable multivibrator 1088 has a set level control terminal connected to the output terminal of the NAND gate 1086 and has an AC set input terminal connected to terminal 2007 of the timing unit in order that the multivibrator may be set by timing pulses only when it is not inhibited by a binary one from NAND gate 1086. This binary one is removed by the reception of a "TMT" signal, an "Equal" signal, and a "Team Total" signal. Bistable multivibrator 1088 is therefore set by the first timing pulse received after the inhibiting binary one is removed from set level control terminal of multivibrator 1088. A set output terminal of multivibrator 1088 is connected to the AC set input terminal of multivibrator 1089 and 1090 through a NAND gate 1091 and a NAND gate 1092, respectively. Since multivibrator 1090 is to be activated only when the team total word is for Team A and multivibrator 1089 is utilized only when the team total word is the operating register is for Team B, the terminal 1310 of the comparator is connected to an input terminal of NAND gate 1091 and terminal 1317, which is separated from terminal 1310 by the NAND gate 1313 in the comparator, is connected to an input terminal of the NAND gate 1092. Therefore, only one or the other of the multivibrators 1089 and 1090 can be set by a signal from multivibrator 1088 at any given time. Output terminals of both NAND gates 1091 and 1092 are connected through an AND gate to a trigger input terminal of a delay multivibrator 1093. A negation output terminal of delay multivibrator 1093 is connected through a NAND gate 1094 and a power amplifier 1095 to DC reset input terminal of the multivibrators SR–4 through SR–18 to accomplish resetting of the frame code and score portions of the operating shift register. Thus, the frame and ball identification and score portions of the operating register are reset prior to taking on the job of team totaling. It will be remembered that at such a time the team total word is in the operating register. Since resetting of SR–4 through SR–18 takes place only before the first team total cycle for each team, it is not repeated during the subsequent team totaling operations. Thus, any marks in the mark total word for either team are reset to zero prior to beginning team totaling for that team. It should be pointed out that delay multivibrator 1093 is connected to the DC set input terminal 512 of delay multivibrator SR–15 so that a binary one appears in this multivibrator upon resetting of SR–14 and SR–16 to SR–18. In open bowling, it is desirable to leave SR–15 with a binary one. However, for league bowling where team totaling is desired, it is necessary to utilize SR–15 for counting and, therefore, it must be reset. Therefore, a delay multivibrator 1096, having a 200 microsecond delay period with a trigger input terminal connected to NAND gates 1091 and 1092 and a negation output terminal connected to DC reset terminal of SR–15, will reset SR–15 after a delay period of 200 microseconds.

A reset output terminal of bistable multivibrator 1088 is connected to terminal 1363 of the comparator 13 in order to place a binary zero on an input terminal of NAND gate 1360 so that an "Equal" signal will remain on terminal 1370. This operation permits the player identification temporarily stored in the intermediate register consisting of bistable multivibrators 1083–1085 to be transferred to the shift register for a printing or display operation without causing shifting.

At this point, all resetting necessary has been accomplished. The score is stored in the intermediate register so that this score may now be added to the team total word. An input terminal of NAND gate 1050 is also connected to the reset output terminal of bistable multivibrator 1088 so that gate 1050 will continue to issue a binary one from its output terminal to an input terminal of NAND gate 1025. Thus, referring now to FIGURE 39, the NAND gate 1023 and a NAND gate circuit generally indicated within a dashed line 1097 will detect the presence of binary zeros in the intermediate register and make the "Not Add Complete" signal issued at terminal 1024 a binary one. With the other input terminals binary ones, the count pulses which are received on terminal 2008 which is connected to an input terminal of NAND gate 1025 are passed to terminal 1026. Thus, with the time pulses being issued from terminal 1026, the entire intermediate register consisting of multivibrators 1001–1010 are counted down as the shift register multivibrators SR–4 through SR–15 are counted upward. SR–14 and SR–15 are used to accommodate a high team total. SR–14 is connected to SR–13 and subsequent multivibrators through a NAND gate 1098 and the NAND gate 1055, as shown in the drawing.

When the addition is accomplished, the "Not Add Complete" signal appearing at terminal 1024 becomes a binary zero and a delay multivibrator 1099, which has a trigger input terminal connected to terminal 1024, is triggered. An assertion output terminal of delay multivibrator 1099 is connected to input terminals of NAND gates 1045, 1046, and 1047, respectively. The placing of binary one on the input terminals opens the NAND gates 1045, 1946, and 1047. Since a reset output terminal of each of the multivibrators 1083, 1084, and 1085 is connected through one of the respective NAND gates to a DC reset terminal of SR–20, SR–21, and SR–22, respectively, the identification in multivibrators 1083–1085 will be transferred to the multivibrators SR–20 through SR–22 upon the NAND gates 1045–1047 receiving a binary one from delay multivibrator 1099. At this point, a team total score and the identification of the player opposite whose name the team total score is to be printed or displayed are now in the operating register. A negation terminal of delay multivibrator 1099 is connected to a terminal 1048 upon which is issued a "Print Team Total" signal at the end of the five microsecond delay period of delay multivibrator 1099. Referring now to FIGURE 38, terminal 1948 is connected through a pair of NAND gates to AC set input terminal of bistable multivibrator 1751 so that a "Print Score" signal is issued from terminal 1761 and a "Not Print Score" signal is issued from terminal 1762 in the same manner as they are issued for printing box or frame scores. At the conclusion of the printing cycle, a "Score Print Complete" signal is received for five microseconds through a NAND gate to a DC reset input terminal of each of these delay multivibrators SR–20, SR–21, and SR–22. Thus, these three multivibrators are set to restore the proper identification to the team total word. It is also connected to an AC reset input terminal of NAND gate 1076 through a pair of NAND gates in order to reset the multivibrator. Resetting of multivibrator 1076 causes multivibrator 2001, in the timing unit illustrated in FIGURE 41, to issue a binary zero to terminal 2005, making the "TMT" signal a binary zero.

In order to insure that each word shifted in the shift register contains its proper twenty-two bits, one of the sixteen new words is the memory resetting code word which contains all binary ones for multivibrators SR–1 through SR–19 and binary zeros for SR–20 through SR–22. Circuitry for detecting the arrival of this code word in its proper position in the shift register is contained in the arithmetic unit and consists of a group of NAND gates generally indicated within a dashed line 1015 in FIGURE 40, and by another set of NAND gates generally indicated by enclosure within a dashed line 1017 in FIGURE 39. The group of NAND gates 1015 have their inputs connected to the multivibrators SR–14 through SR–22 in order to detect binary ones on NAND gates SR–14 through SR–19 and binary zeros on SR–20 to SR–22 at any given moment. The output of these NAND gates is connected to a terminal 1016. The NAND gate 1017 has an input terminal connected to multivibrators SR–1 through SR–13 to sense simultaneous binary ones in each of these multivibrators, has an input connected to terminal 1018 and has an input connected to terminal 1040, whenever the code word of 1111111111 111111111000 places a binary zero on the terminal 1041. Referring now to the shift counter 14, illustrated in FIGURE 32, terminal 1041 is connected as an input to an AC reset input terminal of bistable multivibrator 1025 so that whenever the code word is detected, multivibrator 1025 is reset, thereby causing the binary counter, consisting of bistable multivibrators 1414–1418, to be reset and thereby begins a new count of twenty-two with the first shift following the detection of the code word. In this manner, the counter is reset each time the code word passes to the shift register. Therefore, any error in the counting of the words can only exist until the code word again arrives in the shift register or one full cycle of the words to the register and memory loop.

The circuitry for crediting to the mark total word of each team is contained primarily in the arithmetic unit although portions of it are found in a number of other units. Referring first to FIGURE 38, the NAND gate 1787 has its inputs connected to the reset output terminals of the add to mark total multivibrators 1758 and 1759 in order that the NAND gate will issue a binary one whenever the "Add 1 to Mark Total" or "Add 2 to Mark Total" signal is given. The output terminal of NAND gate 1787 is connected to an input terminal of NAND gate 1788. At the conclusion of the changing of state, a binary one will be applied to the other input terminal of NAND gate 1788, causing a binary zero to appear on the output terminal of this gate which is connected to terminal 1774. The binary zero on terminal 1774 is the complement "Mark Total" signal. Referring now to FIGURE 43, terminal 1774 is connected through AND gate 2002 to the set level control terminal of the bistable multivibrator 2001 so that when a complement "Mark Total" signal is received, the inhibiting signal will be removed from multivibrator 2001 and it will be set by the trailing edge of the next timing pulse received on set input terminal. As previously described, the setting of multivibrator 2001 issues the "TMT" signal at terminal 2005 and its complement at terminal 2006. Referring momentarily to FIGURE 29 once again, the reception of the complement of the "TMT" signal on terminal 2006 causes the sequencer to call for the mark total word, as previously described. When this word arrives, an "Equal" signal will be issued by the comparator 13 to terminal 1370. Referring again to FIGURE 39, the arithmetic unit contains circuitry for issuing the proper number of pulses to be added to the mark total when commanded by the state and output control unit 17. This circuitry consists of two delay multivibrator circuits which receive an "Equal" signal from the comparator to indicate that a mark total word is in the operating register, the "TMT" signal and timing pulses from the timing unit and either the "Add 1" or "Add 2 to Mark Total" signals from the state and output control unit 17. The first of these two circuits has an AND gate 1042, whose inputs are connected to terminal 1370 of the comparator 13, terminal 1772 of the state and output control unit 17, and terminal 2005 of the timing unit and its output connected to an input node terminal of the delay multivibrator 1043 in order that timing pulses will trigger the multivibrator 1043 when received on a trigger input terminal which is connected to terminal 2007. In like manner, the second circuit has an AND gate whose input terminals are connected to terminal 1370 of the comparator 13, to terminal 1771 of the state and output control unit 17 and to terminal 2005 of the timing unit and an output terminal connected to an input node terminal of a delay multivibrator 2052 in order that timing pulses received on an input terminal, which is connected to terminal 2007, will set the multivibrator when all inputs to AND gate 2051 are binary ones. The delay period of delay multivibrator 1043 is ten microseconds and the delay period of delay multivibrator 2052 exceeds 400 microseconds. During the ten microsecond delay period of delay multivibrator 1043, a single pulse is transmitted to a terminal 1044 which is connected to a negation output terminal of delay multivibrator 1043. This pulse is a binary zero. Since the delay period is limited to ten microseconds, only one binary zero is issued at the terminal 1044. Delay multivibrator 2052, having a delay period great enough to span at least two of the timing pulses which are separated by 200 microseconds, is able to maintain a binary one on an input terminal of a NAND gate 2053 which is connected to an assertion output terminal of multivibrator 2052. The other input terminal of NAND gate 2053 is connected to terminal 2008 of the timing unit to receive the inversion of the timing pulse. An output terminal of NAND gate 2053 is connected to a terminal 2054. Therefore, terminal 2054 will receive two timing pulses each time delay multivibrator 2052 is triggered. One terminal 1044 is provided for issuing one pulse when an "Add 1 to Mark Total" command has been issued and terminal 2054 is provided for issuing two pulses when the "Add 2 to Mark Total" command has been given by the state and output control unit 17. The assertion terminals of both delay multivibrators 1043 and 2052 are connected to terminals 2050 and 2055, respectively, for the purpose of resetting command multivibrators 1759 and 1758 of the state and output control unit 17, respectively.

Figure 41:
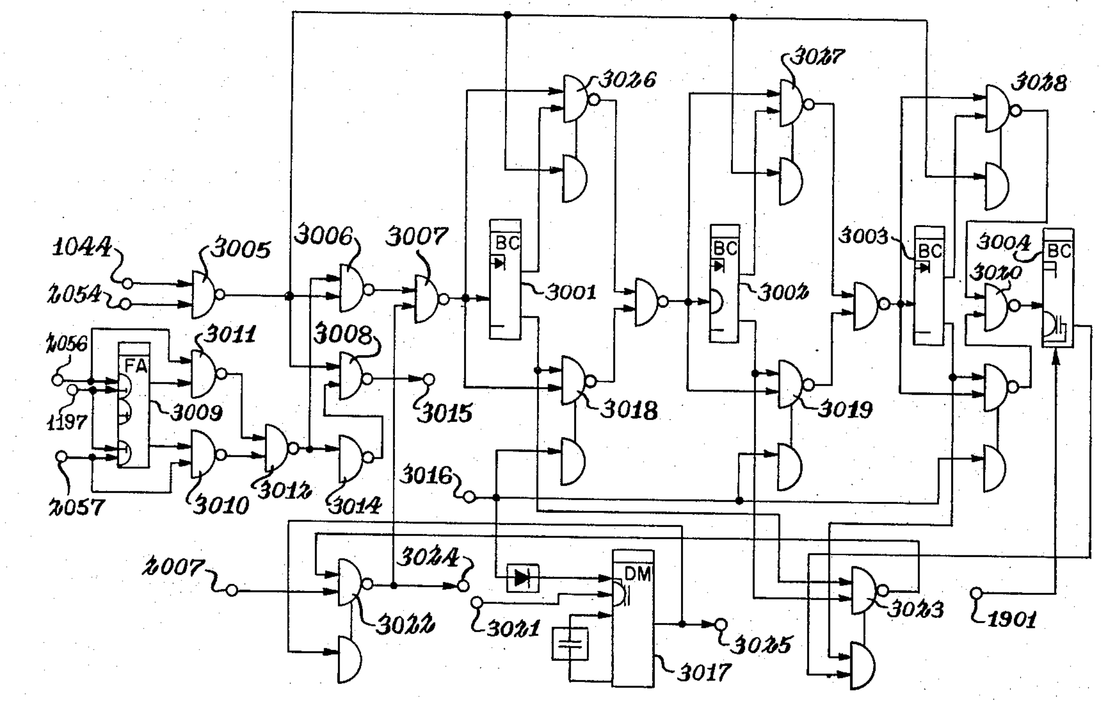
FIGURE 41 is a schematic diagram of an advanced frame mark total register section of the arithmetic unit shown in FIGURE 4.

Referring now to FIGURE 41, a series of four bistable multivibrators 3001, 3002, 3003, and 3004 are connected to act as a binary counter. This counter acts as an intermediate register for counting up mark total pulses which cannot be added immediately into the shift register because the mark total word which may have been called into the shift register is still accumulating the count for the previous frame. This situation can happen where a team bowling on one lane is particularly faster than the team bowling on the other lane, so that for a period of time the slower team is bowling simultaneously on two lanes. When this occurs, members of the one team may be accumulating mark totals for two different frames. Since the mark total word must total the marks only for a given frame until all marks are made for that frame and then be utilized for display or printing, it must not count up marks in a subsequent frame. The intermediate register therefore fulfills the need for an intermediate storage place for mark total counts of a subsequent frame to the latest frame for which mark totaling is still being computed.

The terminals 1044 and 2054 are connected to the two input terminals of a NAND gate 3005 so that if binary zero mark total pulses are received on either of these terminals, they will be transmitted as a binary one at the output terminal of the NAND gate 3005. The output terminal of NAND gate 3005 is connected to a complement input terminal of the first stage of the binary counter which is bistable multivibrator 3001 to receive count pulses through a pair of NAND gates 3006 and 3007. In addition, the output terminal of NAND gate 3005 is connected to a terminal 3015 through a NAND gate 3008. The NAND gates 3006 and 3008 are provided between the NAND gate 3005 and the binary counter or the terminal 3015 to either allow the count pulses issued from NAND gate 3005 to cause the binary counter composed of bistable multivibrators 3001–3004 or the score portion of the shift register composed of bistable multivibrators SR–4 through SR–13 to count upward. Referring to FIGURE 39, the terminal 3015 is connected to an input terminal of NAND gate 1051 so that the count pulses may be applied to the complement input terminal of SR–4. The counting up by the binary counter composed of SR–4 through SR–13 proceeds in the same manner as it does when counting pinfall score pulses are received on terminal 1026.

The circuitry for determining whether count pulses should be issued by NAND gate 3005, to the binary counter 3001–3004 or to the operating register through terminal 3015, will now be described. Referring now to multivibrator SR–15, illustrated in FIGURE 40, Table VII indicates that this multivibrator will be set whenever the frame identification contained in the frame and ball indication portion of the operating register is an even numbered frame and will be reset whenever the frame identification contained in the operating register is an odd numbered frame. As indicated in FIGURE 40, the set and reset output terminals are connected to terminals 2057 and 2056, respectively. Referring again to FIGURE 42, these terminals are connected to a reset level control terminal and to a set level control terminal of a bistable multivibrator 3009, respectively, and to an input terminal of a NAND gate 3010 and to an input terminal of a NAND gate 3011, respectively. Thus, both the bistable multivibrator 3009 and the NAND gates 3010 and 3011 may be simultaneously aware of whether a frame identification of either an odd or even frame is momentarily contained in the shift register. However, the only time that the bistable multivibrator 3009 will assume a state corresponding to that of SR–15 will be whenever it receives a "Pinfall Ready" signal on both its AC set terminal and on an AC reset input terminal which are both connected to terminal 1197 of the pinfall sequencer 11. Since the "Pinfall Ready" signal is only issued as previously described, when a player's words in the operating register, the multivibrator 3009 can only be set to correspond to whether a player's frame is an even or odd frame. When a team mark total word is called into the register, there will be no "Pinfall Ready" signal and, therefore, the bistable multivibrator 3009 will remain in the state that it established when the last player's word was called into the shift register. In this manner, the two inputs to NAND gate 3010 and to NAND gate 3011, respectively, will be different provided both frames are the same, either odd or even. NAND gate 3010 will have one input terminal at binary zero and the other terminal at binary one and NAND gate 3011 will have one input terminal at binary one and the other at binary zero. This causes an issuance of two binary ones at their output terminals which are connected to input terminals of a NAND gate 3012. Thus, if the two frames are both even or both odd, NAND gate 3012 will issue a binary zero at its output terminal which is connected to an input terminal of NAND gate 3006 directly and to an input terminal of NAND gate 3008 through a NAND gate 3014. The NAND gate 3014 inverts the binary zero to a binary one, thus applying a binary one to NAND gate 3008 while the binary zero is applied to NAND gate 3006. Therefore, NAND gate 3008 allows the passage of the mark total pulses to terminals 3015 while the NAND gate 3006 prevents the passage of mark total pulses to the intermediate register which is the binary counter 3001–3004. If the compared frames were not equal, then the inputs to NAND gate 3010 and 3011 would be the same causing these NAND gates to issue binary zero to NAND gate 3012 which, in turn, would issue a binary one to NAND gate 3006 which would allow the passage of the mark total pulses to the binary counter 3001–3004. At the same time, NAND gate 3014 would invert the binary one to a binary zero before applying it to NAND gate 3008 to thereby prevent the passage of mark total pulses to terminal 3015.

Figure 42:
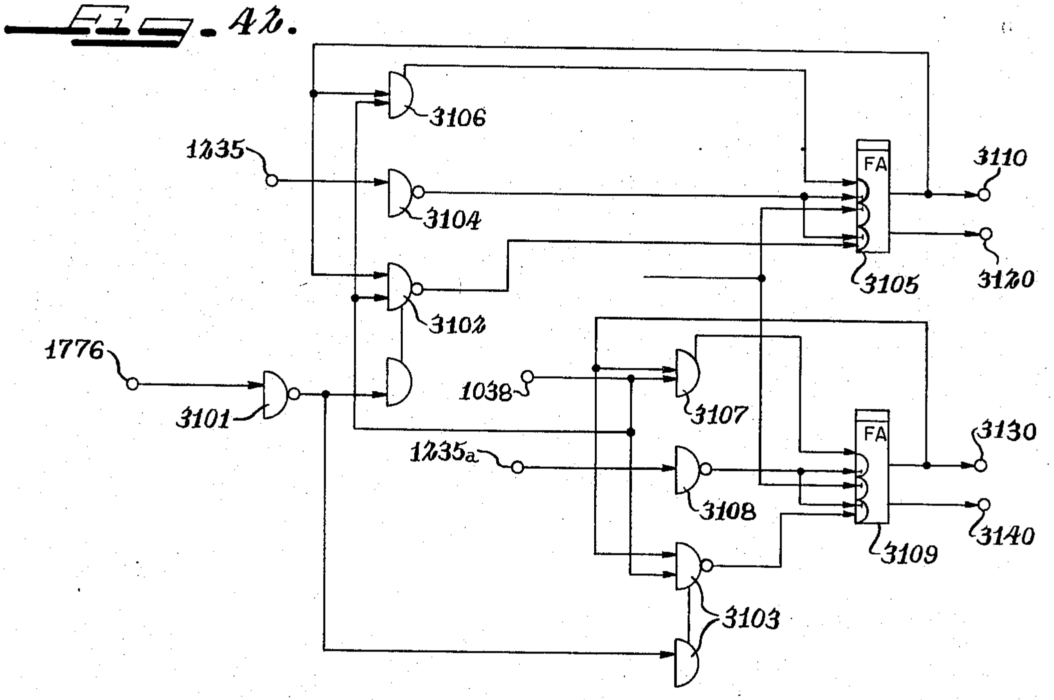
FIGURE 42 is a schematic diagram of a first and second ball section of the arithmetic unit shown in FIGURE 4.

Whenever the mark total pulses have been passed directly to the shift register so that they are incorporated directly into a team mark total word, no further action is required in the mark totaling process. However, if it has been necessary to store mark total pulses in the binary counter 3001–3004, these must eventually be transferred at a proper time to the operating register so that they can then be included in the mark total count in a team's mark total word. This is done immediately after the mark total for the previous frame has been utilized for a printing or display cycle. Referring briefly to FIG- URE 29, the terminal 3016 is connected to the said output terminal of the bistable multivibrator 1186 to receive the "Print Mark Total" signal. Referring to FIGURE 42, this terminal is connected to a node input terminal of a delay multivibrator 3017 and to an input terminal of each of three NAND gates 3018, 3019 and 3020. This terminal is normally a binary zero which prohibits triggering of delay multivibrator 3017. When a "Print Mark Total" signal is applied to the trigger terminal of delay multivibrator 3017, no triggering results since the negative going signal has been applied (from zero volts to minus six volts). The presence of a binary one, however, serves to activate the multivibrator for later triggering. As soon as the printing or displaying commanded by the "Print Mark Total" signal is complete, a "Score Print Complete" signal will be received on a terminal 3021 which is connected to a trigger input terminal of the delay multivibrator 3017. At the trailing edge of this signal, the delay multivibrator is triggered. The delay period of 2,500 microseconds is sufficiently long to allow for the addition of the largest possible storage of the counter to be added into the mark total word. During the delay period an assertion output terminal which is connected to an input terminal of a NAND gate 3022 is at binary one. If marks have been stored in the counter 3001–3004, a NAND gate 3023 which has its inputs connected to each of the multivibrators 3001–3004 will detect the presence of a mark count in this intermediate register. If a NAND gate 3023 detects zero in all four multivibrators, it issues a binary zero, and if it detects a count in any one of the multivibrators, it issues a binary one. The output of NAND gate 3023 is connected to an input terminal of NAND gate 3022. Thus, the NAND gate 3022 can pass timing pulses from the terminal 2007 which is connected to one of its input terminals. The output terminal of gate 3022, which is connected to both an input terminal of the NAND gate 3007 and to a terminal 3024, then receives pulses. Referring briefly to FIGURE 39, terminal 3024 is connected to an input terminal of NAND gate 1055 so that it will cause the binary counter of SR–4 to SR–13 to count upwardly when the NAND gate 3022 passes time pulses to terminal 3024. The NAND gates 3018, 3019, and 3020 are referred to as the "subtract" gates, for they are connected to the binary counter 3001–3004 to create down-counting when a binary one is applied by the "Print Mark Total" signal on terminal 3016. Since these gates are open, they will cause the binary counter to count downward as the operating register counts upward from pulses passed by NAND gate 3022. When the binary counter is emptied, its count has been transferred to the operating register and no further down-counting of the binary counter will occur, or up-counting of the operating register will occur because NAND gate 3023 detects zeros in all of the bistable multivibrators 3001–3004 and provides a binary zero to NAND gate 3022 to thereby stop the passage of time impulses.

At the close of the delay period of 2,500 microseconds of delay multivibrator 3017, it applies a binary zero which is a positive going pulse to an output terminal 3025. Referring briefly again to FIGURE 29, a terminal 3025 is connected to a reset input terminal 1188 of the bistable multivibrator 1186 so that it is reset by the appearance of the binary zero at the end of the 2,500 microsecond delay. Resetting of multivibrator 1186 ends the mark total printing and extinguishes the issuance of the "Print Mark Total" signal on terminal 3016.

A set of three NAND gates 3026, 3027, and 3028 are connected to the four multivibrators 3001–3004 of the intermediate register as shown in FIGURE 42 with an input terminal connected to the output terminal of the NAND gate 3005 in order that they will operate as "add" gates for the binary counter when it is to perform addition by receiving mark total pulses from NAND gate 3005 to count upwardly.

An examination of Table II will indicate that the code identification for a second ball always includes a binary one in both the first and second bit positions which correspond to the contents of SR–1 and SR–2. All the first ball scoring status and the stop state contain one or two zeroes in the first and second bit positions. Therefore, terminal 1776 of the state and output control unit 17 which issues the complement of the character stored in SR–1 plus the complement of the character stored in SR–2 is connected to a NAND gate 3101, in FIGURE 42, which inverts this signal to issue a binary one on its output terminal whenever a second ball is rolled. The output terminal of NAND gate 3101 is connected to an input terminal of NAND gate 3102 and an input terminal of NAND gate 3103. These NAND gates receive binary one whenever a second ball is rolled. Assuming that pinfall scoring is taking place on lane 1, a binary zero will be issued by terminal 1235 of the pinfall sequencer. This signal is the "Not Scoring on Lane 1" signal and is inverted to a binary one by a NAND gate 3104 before it is applied to both the set and reset input terminals of a bistable multivibrator 3105. The less than ten pinfall issuing from terminal 1038 of arithmetic unit 10 is connected to input terminals of an AND gate 3106, the NAND gate 3102, and NAND gate 3103, and an AND gate 3107. Reception of a binary zero, indicating play on lane 1 at terminal 1235 causes a binary one to be placed upon the set and reset input terminals of multivibrator 3105. If less than ten pins were knocked down by this first ball, a binary one is applied to an input terminal of AND gate 3107, to an input terminal of NAND gate 3102, to an input terminal of AND gate 3106 and to an input terminal of AND gate 3102. Another input terminal of gate 3102 and another input terminal of gate 3106 are connected to the set output terminal of the bistable multivibrator 3105 in order that a binary one will appear on these terminals at this time. Since the output of AND gate 3106 is a binary one, it applies a binary one onto the set level control terminal of NAND gate 3105 to which it is attached. This inhibits the set input of multivibrator 3105. Since the new state must be either 3 or 5, because less than ten pins are down, NAND gate 3101 will issue a binary one making all inputs to gate 3102 binary one. This places a binary zero on a reset level control terminal of the lower multivibrator 3105 leaving the reset terminal in an inhibited state. At the conclusion of calculations, the "Not Scoring on Lane 1" ($\overline{S_1}$) signal becomes a binary one and a binary zero is placed on the multivibrator in such a manner as to cause it to transfer to its uninhibited state and to thus reset. Since the reset state serves to indicate a second ball condition, the next ball rolled on lane 1 will be treated as a second ball.

If on the rolling of the first ball, all ten pins have been knocked down, the "Ten Pinfall" signal arriving on terminal 1038 would be a binary zero resulting in the inhibiting of multivibrator 3105 by reset level control terminal. With the removal of the binary one from the AND gate 3106, a binary zero is applied to the set level control terminal of the multivibrator 3105 so that the multivibrator will remain in a set or ball 1 condition.

When a second ball has been rolled, a binary one produced by NAND gate 3101 disappears and again the reset level control terminal inhibits the reset input terminal while the set input terminal is inhibited by the fact that a binary zero appears on an input terminal of NAND gate 3106. The operating of AND gate 3107, inverting NAND gate 3108, the NAND gate 3103 and a bistable multivibrator 3109 for lane 2 corresponds to the connections and operations of NAND gate 3106, NAND gate 3104, NAND gate 3102, and multivibrator 3105, respectively, for lane 1. Thus, the first and second ball circuit, shown in FIGURE 42, is capable of issuing first and second ball signals for either lane 1 or 2 by receiving the "Not Scoring on Lane 1" or "Not Scoring on Lane 2" signals, the "Less Than Ten Pinfall" signal, and the second ball indication signal from the state identification portion of the shift register. The first and second ball signals are issued on terminals 3110, 3120, 3130, and 3140 which are connected to the set and reset output terminals of NAND gate 3105 and to the set and reset terminals of NAND gate 3109, respectively.

*Timing unit*

Referring now to FIGURE 43, which illustrates the timing unit 20*a* shown in FIGURE 4, the operation of the multivibrator clock 2003 in producing timing pulses in the operation of bistable multivibrator 2001 in producing the "Team and Mark Total" signal and its complement have been described in the discussion of the arithmetic unit 10.

In addition to the issuance of timing pulses and the "Team and Mark Total" signals, the timing unit 20 produces a number of "End of Computation" signals for use as previously described in the various units of the scorer. The "End of Computation" signal is issued only when a "Pinfall Ready" signal is received, the complement of both the "Add 1" and "Add 2" to mark total signals are received, the complement of the "Team Total" signal is received, the complement of the "Print Mark Total" signal is received and there has been a 215 microsecond elapse of time since the issuance of the pulse which sets the new state into SR–1, 2, 3 from terminal 1749. The reception of the reset SR–1, 2, 3 signals is received on terminal 1749 which is connected to a trigger input terminal of a delay multivibrator 2009. During the 215 microsecond delay period, a negation terminal of the delay multivibrator 2009 places a binary zero on an input terminal of NAND gate 2011. This is a positive going pulse and will reset a bistable multivibrator 2012 if all the other inputs to the NAND gate 2011 are binary one when the negation terminal of delay multivibrator returns to binary one. The other terminals of NAND gate 2011 are connected to terminal 2023 to receive the complement of the "Add 1 to Mark Total" signal, to terminal 2024 to receive the complement of the "Add 2 to Mark Total" signal, to terminal 1078 to receive the complement of the "Team Total" signal and to terminal 1103 to receive the complement of the "Print Mark Total" signal. Therefore, when multivibrator 2021 is reset, an "End of Computation" signal is issued from its reset output terminal to terminal 2018 and a complement of the "End of Computation" signal is issued from its set output terminal to the terminal 2017 and to a trigger input terminal of delay multivibrator 2013. During the delay period of ten microseconds, the delay multivibrator 2013 issues another "End of Computation" signal to the terminal 2021 and to a trigger input terminal of another delay multivibrator 2014 from the assertion terminal of delay multivibrator 2013. During the ten microsecond delay period of delay multivibrator 2014 still another "End of Computation" signal is issued at the terminal 2022 through a pair of NAND gates 2015 and 2016 provided the "Initial Reset" signal is a binary one. To receive the "Initial Reset" signal, an input terminal of NAND gate 2015 is connected to a terminal 1901. By the utilization of this circuitry, the "End of Computation" signal is issued in every form that it is required for the various other units of the scorer.

The bistable multivibrator 2012 is set by receiving the complement of the "Pinfall Ready" signal from a terminal 1297 which is connected to a set input terminal of the multivibrator 2012. The lamp of "MAKE CORRECTION" switch 66 is connected to terminal 2020 which, in turn, is connected to a lamp driver 2019 to the reset output terminal of bistable multivibrator 2012 so that it is illuminated upon the issuance of the "End of Computation" signal.

*Output unit*

The output unit 18 transmits scores and frame information for the operation of a recording system which may be either a general display system or a printing mechanism for printing bowling score sheets. The output unit 18 transmits frame position and score information in binary code whenever it is commanded to do so by the state and output control unit 17. Output unit 18 presents score information on a set of twelve output terminals 1801 through 1812 and presents frame position information on a set of four output terminals 1821 through 1824. The most significant digit of a score is issued in binary code in terminals 1801–1804. The decimal numbers that can be issued by the binary code on these terminals are zero through fourteen. Since the maximum score that a bowler can bowl is 300, the most significant digit cannot exceed decimal 3. However, if a team of five bowlers is bowling, their highest possible score is 1500. However, it is quite impossible that the total count for a team can ever exceed 1499. Therefore, it is not considered necessary to have the most significant digit exceed a binary fourteen. Thus, as shown in FIGURE 44, the terminals 1801–1804 are wired to indicate a decimal zero to a decimal fourteen. The terminals 1805 through 1808 issue in binary code decimal numbers of zero through nine for the purpose of issuing the second digit of a score. Terminals 1809 through 1812 issue in binary code, decimal numbers from zero or nine to represent the least significant digit of the scoring in decimal form. Scores are taken from two sources: box scores which are the first ball pinfall and the accumulation of the first and second ball pinfall in a given frame are taken from the pinfall sequencer 12 through the sequencer output terminals 1296, 1297, 1298, and 1299. Frame total scores are taken from the operating register by terminals 1825 through 1836. Referring briefly to FIGURES 39 and 40, these terminals are each connected to one of the multivibrators SR–4 through SR–15 so that the complement of the binary code for the most significant decimal digit appears on terminals 1825 to 1828, the binary code for the second decimal digit appears on terminals 1829 through 1832, and the binary code for the least significant decimal digit appears on terminals 1833 through 1836. The source of the frame information is the operating register and specifically SR–15 through SR–18. As shown in FIGURE 40, terminals 2056 through 2059 are connected to the multivibrators SR–15 to SR–18 to detect the complement of the frame identification.

The group of NAND gates between the terminals 1825 through 1836 and output terminals 1801 through 1812, respectively, control the transference of scores from the operating register to the output terminals. In like manner, the group of NAND gates between the terminals 1296 to 1299 and output terminals 1805 through 1812 control the transference of pinfall information in the pinfall register of the arithmetic unit to the output terminals. The groups of NAND gates and bistable multivibrators between the terminals 2056 to 2059 and the output terminals 1821 to 1824 control the transference of frame information from the operating register to the output terminals.

The four terminals 1825 through 1828 are connected to the four output terminals 1801 through 1804 by a series of coordinating gates 1837–1840. Each of these NAND gates has a second input terminal which is connected to a set output terminal of a multivibrator 1820 through a NAND gate 1819 and a NAND gate 1817. A DC set input terminal of the multivibrator 1820 is connected to terminal 1762 so that it receives the complement of the "Print Score" signal from the state and output control unit 17. When the multivibrator 1820 is reset by the "Initial Reset" or "Score Print Complete" signal (as is usually the case when a box score is being printed), it will produce binary zeros at the input terminals of the NAND gates 1837 through 1840, so that binary ones will appear at their output terminals and on terminals 1801 through 1804. Any recording device connected to the output unit recognizes four binary ones on these terminals as indicating a blank. When the complement of the "Print Score" signal is received binary multivibrator 1820 is set and binary ones are issued at the input of NAND gates 1837 through 1840 thus allowing the terminals 1801 through 1804 to display in binary code the most significant decimal digit present in the operating register. It will be noted that since the binary complement of this digit appears on the terminals 1825 through 1828, the complement will be reinverted by the NAND gates 1837–1840 to the actual binary code for the digit on the output terminals 1801–1804. Thus, these output terminals will either issue the most significant digit in the operating register or a binary 1111, indicating that the digit is blank, in accordance with the complement of the "Print Score" control signal, received from the state and ouput control unit 17.

The second score decimal digit output terminals 1805–1808 are used to display two different quantities, the box display of the first ball in any frame and the second or middle digit of a frame total or team total score. The input terminals 1829 through 1832 are each connected to a pair of NAND gates 1841, 1842; 1943, 1844; 1845, 1846; and 1847, 1848, respectively. An input terminal of NAND gates 1841 and 1843 is connected to the set output terminal of multivibrator 1820 through the NAND gates 1817 and through the NAND gate 1819, and an input terminal of NAND gates 1845 and 1847 are connected to a reset output terminal of multivibrator 1820 through a NAND gate 1818 in order that binary one will be placed upon the four NAND gates 1841, 1843, 1845, and 1847, whenever a print score command is issued by the state and output control unit 17. With binary ones on the input terminals of these four NAND gates, they will pass the complement of the binary digits on terminals 1829–1832 to an input terminal of NAND gates 1842, 1844, 1846 and 1848, respectively. The other input terminals of these four NAND gates are connected to output terminals of a group of five NAND gates 1857–1861 which, in turn, each have an input terminal connected to NAND gate 1819 to the set output terminal 425 of multivibrator 1820. Thus, when a "Print Score" command signal is issued by the state and output control unit 17, a binary zero is placed on an input of each of these five NAND gates 1857–1861 in order that binary ones will be issued by them to all the inputs of NAND gates 1842, 1844, 1846 and 1848 except the respective input terminals of these NAND gates which receive the complement of the digital code from the operating register. In this manner, the binary code for the second decimal digit of the scoring is issued to terminals 1805 to 1808, respectively.

In regard to printing a score of the last significant digit in the shift register, NAND gates 1849 through 1856 operate in the same manner as described for NAND gates 1841 to 1848 with the last significant decimal digit appearing in binary code on the output terminals 1809–1812 whenever a print score command is issued by the state and output control unit 17. It will be noted that the five NAND gates 1857 through 1861 perform the same function of putting binary one on all of the input terminals of NAND gates 1850, 1852, 1854, and 1856, except the terminals connected to the output terminals of NAND gates 1849, 1851, 1853, and 1855. In the same manner, it performs this function for NAND gates 1842, 1844, 1846, and 1848.

When box printing is desired, the input terminals of NAND gates 1857–1861 will be binary ones because of the presence of the complement of the "Print Score" signal at multivibrator 1820. Each of the other input terminals of the four NAND gates 1858–1861 are connected to a NAND gate for inversion of the signals received on terminals 1296, 1297, 1298, and 1299, respectively, in order to receive the ball score data contained in the pinfall sequencer 11. Terminals 1296 through 1299 contain the complement of pinfall. With the common inputs of gates 1858–1861 at binary one, the complement of a ball score is passed to the even numbered gates from 1842 through 1855, as shown in FIGURE 44, so that the ball information is supplied both to the NAND gates which issue the second decimal digit and the first box score, and to the NAND gates which issue the less significant decimal digit and the second box score. Since only the first box score is to be printed it is to be indicated by terminals 1805, 1808, and the second box score is to be indicated only by terminals 1809–1812, circuitry is provided to prevent a box score from appearing on the incorrect second set of terminals when either a first or second box score is being commanded. The NAND gates 1857 and 1862 perform these functions. The NAND gate 1857 receives a second ball signal on an input terminal which is connected to terminal 1864 and a NAND gate 1862 receives a first ball signal on an input terminal which is connected to terminal 1863. The output terminal of NAND gate 1857 is connected to an input terminal of NAND gates 1842 and 1844. If a binary one, indicating a second ball is received on terminal 1864, binary ones would be present at terminals 1805 and 1806. This represents a decimal twelve or greater decimal digit at the output of gates 1805 through 1808. The decimal twelve (or greater) condition is interpreted by a recording unit connected to these terminals as a blank. Thus by putting out a decimal twelve or higher, the terminals 1805–1808 issue no box score information when a second ball has been rolled, but they do issue the first box score when the first ball is rolled. The NAND gate 1862 has an input terminal connected to terminal 1863 and has its output terminal connected to input terminals of NAND gates 1850 and 1852 so that the terminals 1809–1812 will issue a decimal twelve or higher whenever the first ball signal is being received by the NAND gate 1862.

The circuitry for issuing frame position in binary code on terminals 1821–1824 will now be described in detail. Each of a set of four NAND gates 1865–1868 has its output terminal connected to the output terminals 1821–1824, respectively. An input terminal of three of these four NAND gates 1865, 1867, and 1868 are connected to terminals 1077 of the arithmetic unit 10 which issues the complement of the "Team Total" signal. When the complement of the "Team Total" signal is binary zero, the NAND gates 1865, 1867, and 1868 will issue binary ones to terminals 1821, 1823, and 1824, respectively, while NAND gate 1866 issues a binary zero to terminal 1822. Thus, at this time, the output of the frame position terminals 1821–1824 is a binary 1011 which is decimal eleven. Thus, when team totaling is to be recorded by displaying or printing it, the output unit will direct the printing to occur in frame 11. When team totaling is not occurring, terminal 1077 is binary one which allows the three NAND gates to receive binary code from another set of NAND gates whose output terminal is connected to one of each of their inputs. The second set of NAND gates consists of gates 1869–1872. An input terminal of each of these latter four NAND gates are connected to each of four terminals 1873–1876, respectively. As shown in FIGURE 40, these gates are connected to operating register multivibrators SR–15 to SR–18, respectively, to receive the binary code of frame identification contained in these multivibrators. A second input terminal of the NAND gates 1869–1872 are all connected to the terminal 2006 of the timing unit which issues the complement of the "TMT" signal through a NAND gate 1877 and to the reset output terminal of the bistable multivibrator 1820 through the NAND gate 1877 and the NAND gate 1818 so that the NAND gates 1869–1872 will receive a binary one on their input terminals allowing the frame identification encoded on terminals 1873–1876 to be transferred to terminals 1821–1824, respectively. This occurs when the complement of the "TMT" signal is a binary one and the multivibrator 1820 is reset by receiving the previous "Score Print Complete" signal because multivibrator 1820 places a binary zero at the input to NAND gate 1877. Thus, under these conditions the box score frame position for each recording is made available at terminals 1821–1824. When score recording is to be accomplished, bistable multivibrator 1820 will be set and the NAND gates 1869–1870 will receive binary zeros which prevent them from transferring the binary code on terminals 1873–1876 to terminals 1821–1824.

The frame position of the recorder, such as a printer display system, is not as simple in frame or team total score recording as it was in box score recording, because if two consecutive strikes have been rolled, the next ball causes recording to occur two frames back and if a single strike or spare had been rolled, the next ball causes printing one frame back. The circuitry that makes it possible to indicate the proper frame scoring will now be described in detail. Terminals 2056 through 2059 receive the frame score information from the operating register, as shown in FIGURE 40. When the print score signal is given, the bistable multivibrator 1820 is set. An output terminal of this multivibrator is connected through the NAND gate 1818 and a NAND gate 1878 to the trigger input terminals of two delay multivibrators 1879 and 1880. A negation output terminal of delay multivibrator 1879 is connected to a common reset input terminal of each of four bistable multivibrators 1881, 1882, 1883, and 1884, which are connected as a binary counter, as shown in FIGURE 44. The delay period of delay multivibrator 1879 is ten microseconds and during this time the binary counter causes its output reset terminals which are connected to an input terminal of four NAND gates 1885–1888, to issue 1111. An assertion output terminal of delay multivibrator 1880 is connected to an input terminal of each of a set of NAND gates 1889–1892. The first terminal of these four NAND gates are respectively connected to the four terminals 2056–2059. The output terminals of these NAND gates are connected to a DC set input terminal of each of the four bistable multivibrators 1881–1884, respectively. During the 200 microsecond delay period of delay multivibrator 1880, the NAND gates 2056–2059 copy the frame indicated in the operating register into the binary counter composed of binary multivibrators 1881–1884. Thus, this counter contains the present frame number.

Assuming that two strikes have been previously rolled, printing two frames back will be desired. Referring briefly to FIGURE 37, it will be noted that for this situation to exist, the bowler must be in state 4. A NAND gate 1993 is connected, as shown in FIGURE 44, to detect the state 4 condition in the operating register. When it so detects such a condition in the shift register, it is capable, through its output terminal connection to a gated terminal of bistable multivibrator 1882, of inverting that multivibrator so that two is subtracted from the frame identification contained in the binary counter 1881–1884. This occurs at the close of the 200 microsecond delay period of delay multivibrator 1880.

Subtractions of one frame number are desired on the first recording following a single strike, on the last ball in the eleventh frame when it follows two strikes, and on the first recording following a spare. Each of these three conditions is set by one of three NAND gates 1994, 1995, or 1996 which are connected, as shown in FIGURE 44, to detect these conditions. The output terminal of each of these NAND gates is connected to a complement input terminal of multivibrator 1881 so that this multivibrator may be complemented to subtract one from the frame position identification contained in binary counter 1881–1884.

The complement of the "Print Complete" signal from terminal 1773 of the state and output control unit 17 is connected to a trigger terminal of a delay multivibrator 1997 which has a delay period of five microseconds. During this five microsecond period, a binary one pulse is issued from an assertion output terminal of delay multivibrator 1997 to input terminals of a pair of NAND gates 1998 and 1999. Another input terminal of NAND gate 1998 is connected through NAND gates 1817 and 1819 to the set output terminal of bistable multivibrator 1820 so that it may issue the complement of the "Score Print Complete" signal at its output terminal which is connected to terminal 1814 and issue a "Score Print Complete" signal at terminal 1815 which is connected to its output terminal through a NAND gate which inverts the complement of the "Score Print Complete" signal. A second input terminal of NAND gate 1998 is connected to a reset output terminal of bistable multivibrator 1820 through NAND gates 1878 and 1818 in order to issue the complement of a "Box Print Complete" signal on terminal 1816 which is connected to its output terminal.

*Output indicator unit*

Figure 45:
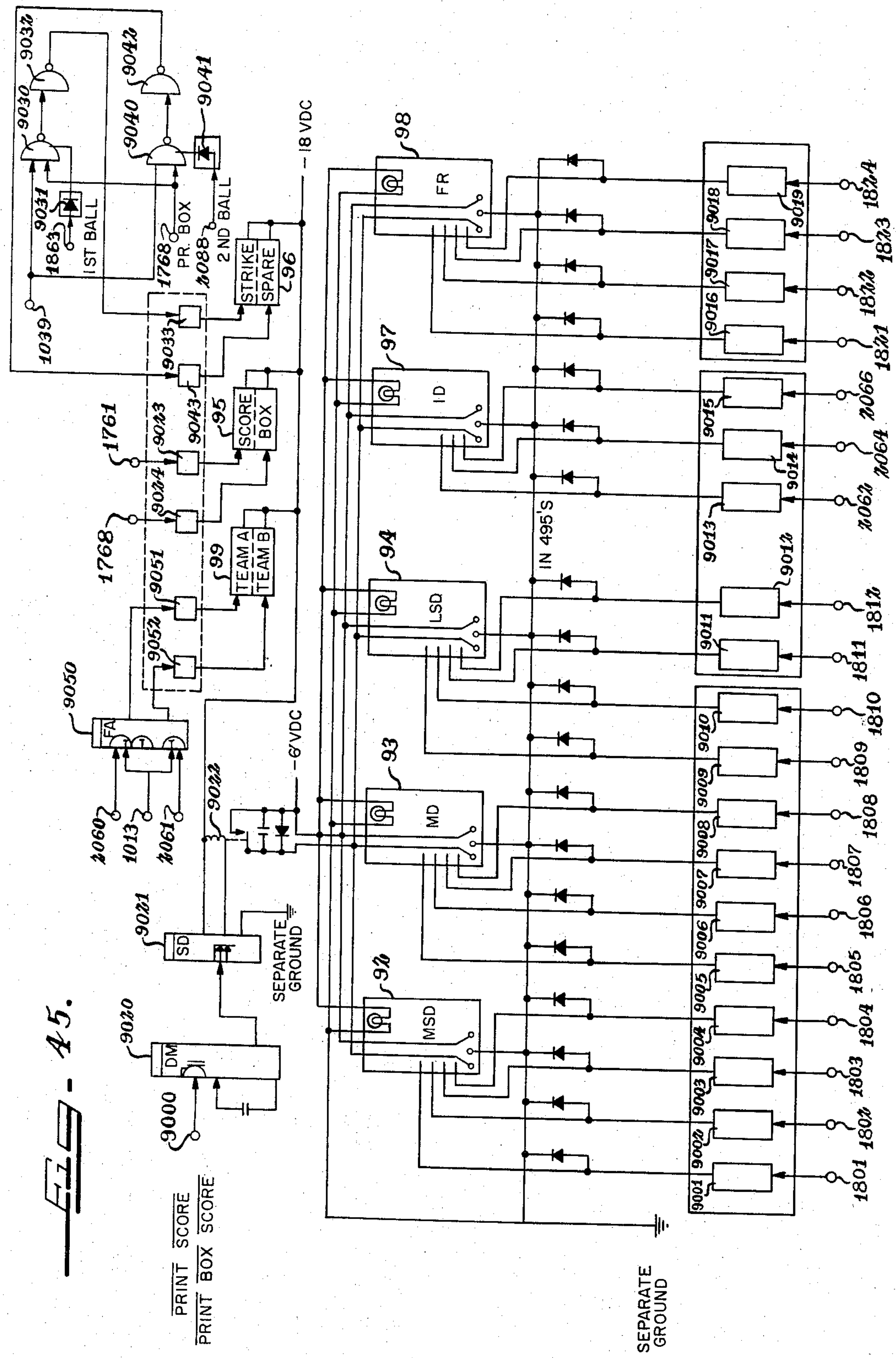
FIGURE 45 is a schematic diagram of an output indicator unit shown in FIGURE 4.

The output unit 18 and the operating register provide signals so that a recording system either in the form of a display system or a printing system can record in a bowling score sheet form all of the scores and symbols presently utilized in the American Bowling Congress scoring regulations. The output indicator unit 90 does not utilize such signals for displaying at any one time a complete tabulation of the game, but merely indicates the output of computation from the output unit 18 that is currently being provided so that a full recording system can produce a full score sheet. Therefore, the output indicator unit 90 is a small device which can perform two important functions short of producing simultaneously a full score sheet or short of providing a permanent record of a score sheet if the printing device is connected to the output unit 18. It can be used as a test unit to insure that the electronic scorer is operating correctly, and secondly it can provide a visual display output of computations which a manual scorer may copy down as it occurs without being required to perform the computations of the scoring. As shown in FIGURE 2, three self-decoding digital display units 92–94 are assembled to provide the display of ball, frame, total and team total scores. Two more of these units 97 and 98 are utilized to display the vertical position on a score sheet which is the player's identification and the horizontal or frame position in which the score is to be printed. Referring now to FIGURE 45, the three display units 92–94 which display the most significant digits, the middle digit and the least significant digit of a score have input terminals connected to the score output terminals 1801–1812 of the output unit 18 through a series of lamp drivers 9001–9012. The self-decoding decimal display units may be of any conventional type presently known in the art such as the "Bina-view Self-decoding Digital Read-out" manufactured by Industrial Electronics Engineers, Inc., wherein various screens are positioned between the viewing screen and a lamp in accordance with the binary code received to display the decimal figure represented by a four bit binary code. The frame digital display unit 98 has its input terminals connected to terminals 1821–1824 of the output unit 18 through lamp drivers 9016–9019. The vertical position or player identification display unit 97 is connected to terminals 2062, 2064, and 2066 of the arithmetic unit 10 to lamp drivers 9013–9015, respectively. The lamp drivers 9001–9019 may be of any conventional design suitable for connecting the output of a signal from the output unit 18 to the input terminals of the various digital display units 92, 93, 94, 97 and 98. When signals are received on the terminals 1801–1812, 1821–1824, 2062, 2064, and 2066, the display units receive the necessary information to decode the binary code into combinations of the overlaying screens which will display the proper digital numerals. However, each numeral is not displayed until either a "Print Score" or a "Print Box Score" signal is issued in the detection section of the state and output control unit 17. Referring briefly to FIGURE 38, terminal 9000 is connected to the reset output terminals of bistable multivibrator 1751 and bistable multivibrator 1756 through a pair of NAND gates in order that the complement of either a "Print Score" command signal or a "Print Box Score" command signal will appear at terminal 9000. The terminal 9000 is connected to a trigger input terminal of delay multivibrator 9020 which has its output terminal connected to a DC input terminal of a solenoid driver 9021 in order to provide a wide pulse to the solenoid driver which actuates a solenoid 9022. When solenoid 9022 is actuated, it closes the circuit, as shown in FIGURE 45, causing each of the digital display units to visually display the decimal numeral represented by the binary code at its input. The digital display units will retain the decimal display until a new binary code is received at their inputs. The new binary code will not be displayed until the units again receive a code circuit signal actuated by solenoid 9022.

The display of score in the box or score indicator 95 consists of a pair of lamps, one for the "score" portion and one for the "box" portion of indicator 95. The lamp for the score is connected to the terminal 1761 of the state and output control unit 17 through a lamp driver 9023 in order to light the "score" portion of the indicator whenever a "Print Score" command signal is being issued by the state and output control unit 17. In like manner, the lamp illuminating the "box" portion of the indicator 95 is connected to terminal 1768 through a lamp driver 9024 in order to display the "box" portion of indicator 95 whenever a "Print Box Score" signal is being issued by the state and output control unit 17.

The special mark indicator 96 is similar to the indicator 95 in that it has two sections each with separate lamps that display, when illuminated, a "strike" or a "spare." These lamps are connected so that the appropriate one is illuminated whenever the last ball rolled was a strike or a spare. A NAND gate 9030 has one of its input terminals connected to terminal 1039 of the arithmetic unit 10 to receive the "Ten Pinfall" signal, and another input terminal connected to terminal 1768 of the state and output control unit 17 to receive a "Print Box Score" command signal. A node input terminal of NAND gate 9030 is connected to terminal 1863 in order to receive a first ball signal. Instead of utilizing a diode cluster or AND gate to expand a number of input terminals to NAND gate 9030, a diode 9031 is connected between the terminal 1863 and the node terminal of NAND gate 9030. Thus, NAND gate 9030 will issue a binary zero at its output terminal whenever it receives binary ones from terminal 1039, terminal 1768 and terminal 1863 to indicate that a strike has occurred. The output terminal of NAND gate 9030 is connected to the strike lamp of the indicator 96 through a NAND gate 9032 which inverts the binary zero, indicating a strike into a binary one, and a lamp driver 9033 which amplifies the binary one signal. Similarly, a NAND gate 9040 is connected to terminal 1039 to receive the pinfall signal and to terminal 1768 to receive the "Print Box Score" signal. However, the node terminal is connected through a rectifier 9041 to the terminal 2088 to receive the second ball signal instead of the first ball signal. Therefore, NAND gate 9040 detects the occurrence of a spare by issuing a binary zero at its output terminal. This terminal is connected to the spare lamp of the indicator 96 through an inverting NAND gate 9042 and a lamp driver 9043.

A bistable multivibrator 9050 has an AC set input terminal and an AC reset input terminal connected to the terminal 1013 in the detection section of the state and output control unit 17 to receive a "Pinfall Ready" initiating signal. A set level control input terminal of bistable multivibrator 1050 is connected to terminal 2060 and a reset level control input terminal is connected to terminal 2051 of the arithmetic unit in order to set the multivibrator 1050 when the team identification multivibrator SR–19 of the operating register is set and the next "Pinfall Ready" signal is issued or to reset multivibrator 1050 when multivibrator SR–19 is reset and the subsequent "Pinfall Ready" signal is issued. An output set terminal of multivibrator 9050 is connected for actuation to the Team A lamp of indicator 99 through a lamp driver 9051 and a reset output terminal of multivibrator 9050 is connected to a Team B illuminating lamp of indicator 19 through a lamp driver 9052. Thus, indicator 99 indicates a Team A score when a Team A player's identification is in the operating register upon the receipt of the issuance of the next "Pinfall Ready" signal from the state and output control unit 17 or a Team B score whenever a Team B member's identification is in the operating register and the subsequent "Pinfall Ready" signal is issued by the state and output control unit 17. Thus, the display unit 90 displays all of the information in sequence issued by the electronic computer during the procedure of either an open or league bowling game.

*Power circuits*

Figure 46:
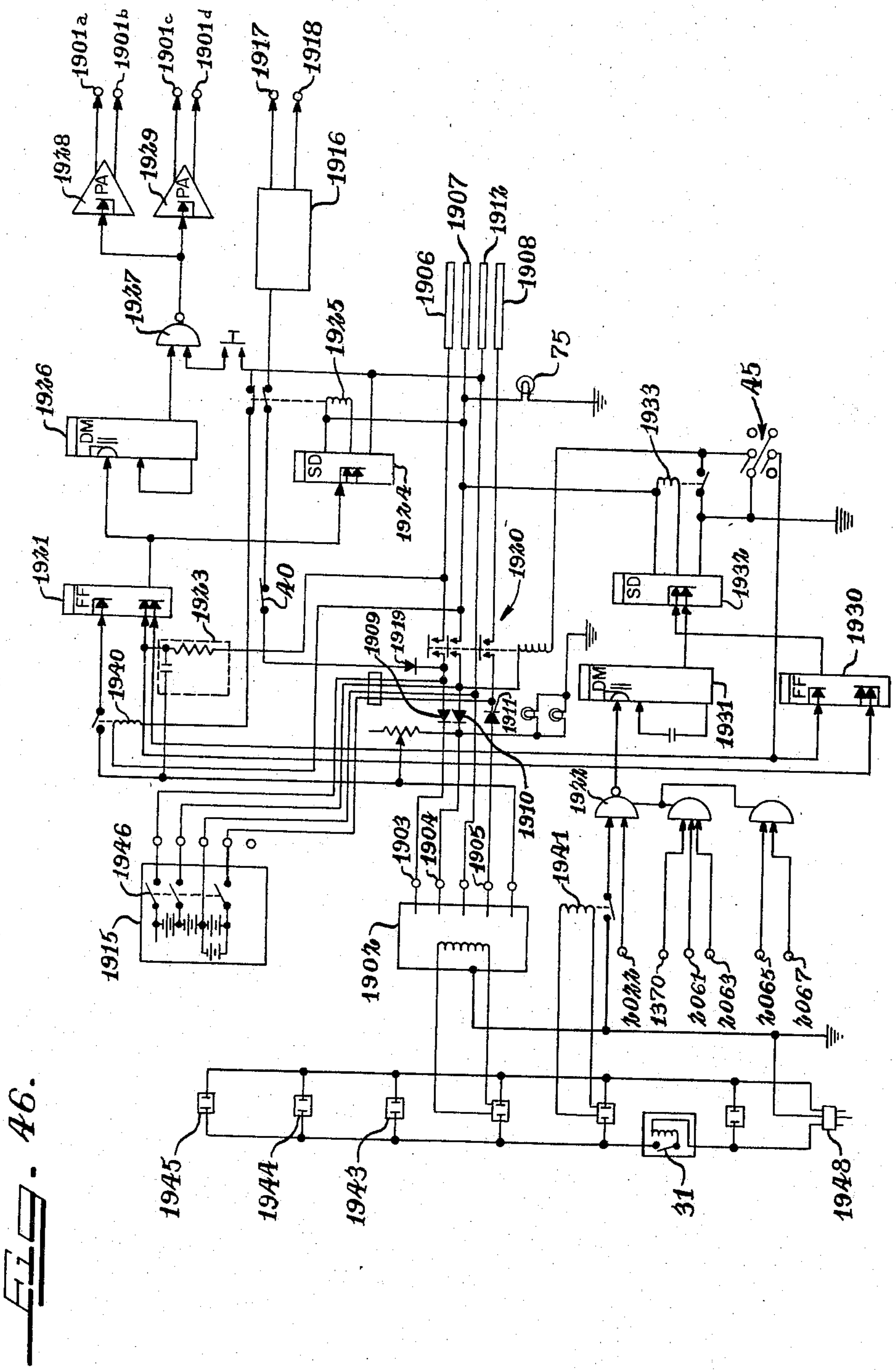
FIGURE 46 is a schematic diagram of a power unit shown in FIGURE 4.

Referring specifically to FIGURE 46, a power supply 1902 is connected to a source of 110 volt alternating current by a connector 1948 through the main power switch 31 and produces DC voltages of minus eighteen volts, minus six volts, and plus twelve volts relative to a circuit ground on terminals 1903–1905, respectively. The terminals 1903, 1904, and 1905 are connected to a minus eighteen volt bus bar 1906, a minus six volt bus bar 1907, and a plus twelve volt bus bar 1908 through a set of diodes 1909, 1910, and 1911, respectively. The figures illustrating the logic circuits have appropriate leads connected to these bus bars as indicated in each logic circuit drawing. The ground terminal 1906 is connected directly to a ground bus bar 1912. A battery supply 1915 supplies almost the same DC voltages as in power supply 1902 and are connected to the respective bus bars 1906–1908 and 1912. The function of the diodes 1909–1911 is to allow the battery supply 1915 to charge as long as current is being received from the power supply 1902 and if the power supply should fail, the battery supply would continue providing the correct voltages to the four bus bars. In order to prevent the battery supply 1915 from discharging while the power supply is in operation, the voltages supplied by the power supply 1902 are a few tenths of a volt greater than those supplied by the battery supply 1915.

The power supply 1902 may be of any conventional design well known to those skilled in the art. In like manner, a memory power supply 1916 supplies plus one hundred fifty-five volts DC to a terminal 1917 and minus sixty volts DC to a terminal 1918 which are both connected to the memory 15 to supply it with the necessary operating voltages. The memory supply 1916 is also of conventional design well known to those skilled in the art and is connected to diode 1909 through a resistance dropping diode 1919 for energization.

One of the important functions of the power failure circuit is to provide an "Initial Reset" signal to establish an initial condition within the various units of the scorer. In league bowling when teams are between games, the power circuits do not issue an "Initial Reset" signal because it is desired to have the scorer sequence lanes; however, after the end of a set of games when it is desired to have Team A on lane 1 and Team B on lane 2, the scorer is turned off and then turned on again so that an "Initial Reset" signal is issued. As shown in FIGURE 46, the power supply 1902 and the battery supply 1915 are separated from the bus bars by a master relay generally indicated at 1920. When the momentary-contact front-panel power switch 45 is depressed, the contacts of the master relay 1920 are closed so that power is delivered to the bus bars. A bistable multivibrator 1921 has reset input terminals connected to the minus eighteen volt bus bar 1906 through a wave shaper 1923 so that it is energized in a reset state. Since a reset output terminal of multivibrator 1921 is connected to a solenoid driver 1924, energization of the multivibrator 1921 in the reset state places a binary one on solenoid driver 1924 preventing the closure of a relay 1925 thus keeping power away from memory supply 1916. The reset output terminal of multivibrator 1921 is also connected to a trigger input terminal of a delay multivibrator 1926 which has a negation terminal connected to a NAND gate 1927 to a pair of power amplifiers 1928 and 1929. Five seconds after power is switched "ON," multivibrator 1921 is set by action of the thermal relay 1940. This causes triggering of delay multivibrator 1926, the output of which is amplified by power amplifiers 1928 and 1929. These two power amplifiers issue the "Initial Reset" signal to a series of output terminals **1901*a*–1901*d*. Therefore, the "Initial Reset" signal is supplied to the set of terminals 1901 for a period of 200 microseconds, which is the delay period of delay multivibrator 1926. At the time multivibrator 1921 is set, solenoid driver 1924 is given a binary zero signal. Since the circuit comprising solenoid driver 1924 and relay 1925 is partially electrical-mechanical, several milliseconds are required before power is supplied to the memory supply 1916. The "Initial Reset" signal is issued before power is applied to the memory 15. Starting operations in this order insures that the memory 15** is not energized during a shifting cycle, thereby destroying all or part of its contents.

Referring again to the operation of the battery supply 1915, wherein a failure of the power supply 1902 has occurred, the battery supply 1915 will be supplying the necessary voltages to complete a computation and return the "zero" word into the operating register so that the other fifteen words are contained in the memory and will not be destroyed when power is removed from the scorer. The NAND gate 1922 performs the function of determining the following set of facts:

(1) That the 110 volt alternating current source has failed (failure of the alternating current source allows relay 1941 to open, removing the grounded input to NAND gate 1922);

(2) That an "End of Computation" signal has appeared on terminal 22; and (3) That an "Equal" signal appears on terminal 1370 and that the player identification of the words in the operating register is that of the "zero" word. When these conditions provide a binary one on each of the seven input terminals to NAND gate 1922, the gate will issue a binary zero, indicating that power failure of the alternating current source has occurred and that subsequent to the power failure, any computation in progress has been completed, and all words, except the zero word, have been shifted back in the memory 15 so that they will retain their information in the magnetically set cores until alternating current power can be restored. The output terminal of NAND gate 1922 is connected to a set input terminal of the bistable multivibrator 1930, to a trigger input terminal of the delay multivibrator 1931 and to the reset input terminal of bistable multivibrator 1921. By this action, multivibrator 1930 is set and provides a binary one to an input terminal of the solenoid driver 1932 and multivibrator 1921 is reset, de-energizing the memory supply 1916. Since a negation output terminal of delay multivibrator 1931 is connected to another input terminal of solenoid driver 1932, the solenoid driver will be de-energized at the end of the 1.2 second delay period of delay multivibrator 1931, and the relay 1933 controlled by the solenoid driver will cause the contacts to open to de-energize master relay 1920. De-energization of master relay 1920 then opens its contacts. In this manner, the memory supply 1916 is shut down to prevent further shifting and loss of information before any of the other circuits of the scorer are turned off.

If the power switch 45 is manually depressed to its "OFF" position, the inputs to delay multivibrator 1931 and to multivibrator 1930 are grounded, resulting in de-energization at the end of the 1.2 second delay period of all circuits in the same sequence as if NAND gate 1922 had detected a power failure and the "End of Computation" and return of the "zero" word into the operating register.

A set of AC outlets 1943–1945 are also connected to connector 1948 through main power switch 31 so that they are energized only when switch 31 is closed.

SCORER OPERATION

The operation of the scorer shown in FIGURE 4 will now be described for all possible bowling scoring situations. Although the pinfall sequencer 12 may be connected to many means for supplying pinfall information and the output unit 18 may be connected to many means for indicating bowling scores, as aforementioned, the present description will be primarily confined to the operation of the scorer shown in FIGURE 4 with the lane simulator 70 connected to the pinfall sequencer 12 and the output indicator 90 connected to the output unit 18. As previously described, there are seven states in which a player's score may exist. Each one of these states will be considered separately along with all possible scoring situations which may result from the existence of each state.

*Placing the scorer in stand-by condition*

When the scorer is placed in a stand-by condition, the power supply 1902, shown in FIGURE 46, is energized and the battery supply 1915 is charged from the power supply 1902, if the battery supply is connected. If the memory supply 1916 and the terminals which supply all the computing circuits remain de-energized in the stand-by condition, the computer is placed in stand-by condition by the following procedure:

(1) Referring to FIGURE 1, the plus twelve volt, minus six volt, and minus eighteen volt power supply breakers 32–34, which are contained in the power supply 1902, are turned on allowing the respective voltages to appear on terminals 1903, 1904 and 1905 when the main power switch 31 is turned on.

(2) Again, referring to FIGURE 1 and to FIGURE 46, the memory power switch 40, which is internal to power supply 1916, is then turned on.

(3) The main power switch 31 is turned on energizing power supply 1902 and the AC detection relay 1941 which thereby connects an input terminal of NAND gate 1922 to ground. Cooling fans and other accessory equipment, which are connected to a set of AC outlets 1943–1945, are also energized by the closure of the main switch 31.

(4) If the batteries are to be charged, the battery supply 1015 must be connected to the terminals 1903, 1904 and 1905, as aforementioned, and an emergency battery power supply switch 1946 in the battery supply 1915 must be closed.

With the manual closure of these switches, the scorer is ready to commence operation at any time.

*Placing the scorer in operating status*

The manually operated switch to put the scorer into stand-by condition is located on the power supply panel 22 while all the switches necessary to place the computer in an operating status or to produce special operations such as skipping a bowler, out-of-turn bowling, or indicator correction may be manually initiated by controls which are found on the control panel 28. Referring now to FIGURE 2, the "LEAGUE-OPEN BOWL" switch 46 must be positioned in either the league or the open position. When the switch 46 is thrown to the league position, appropriate circuits in the scorer are energized so that the scorer will perform four operations which are required only when there is league bowling occurring on a pair of lanes wherein a pair of teams ultimately bowls each frame of a game on the opposing lanes and ultimately begins bowling each subsequent game of a set of games on opposing lanes. When the switch 46 is thrown to the open bowling position, the appropriate circuitry of the scorer is disabled so that these four functions which are peculiar to league bowling are not performed during the use of the lanes for open bowling. The four operations peculiar to league bowling are the issuance of the "Print Mark Total" signal at the appropriate time by the player sequencer 11, the complementing of the multivibrators 1117 and 1121, which indicate that a team has switched lanes, the adding of marks to the mark totals contained in the team words, and the totaling of team scores in the team words at the conclusion of each team player's game.

Referring specifically to FIGURE 29, when the switch 46 is switched to its "open" position, it places a binary zero on the NAND gates 1184 and 1104 to prevent them from passing the signals which normally set the multivibrator 1186 to thereby issue the "Print Mark Total" signal at terminal 3016. When the switch 46 is switched to the league position, a binary one is placed on one input of NAND gate 1184 and on one input of NAND gate 1104 so that these gates do allow the passage of the signals to multivibrator 1184 which set that multivibrator and thereby issue the "Print Mark Total" signals on terminal 3016. As previously described, the set output terminal of 1186 is connected to the complement input terminals of multivibrators 1117 and 1121 so that these multivibrators can be complemented only when the multivibrator 1186 is reset and the "Print Mark Total" signal is removed from the set output terminal and the terminal 3016. Since the "Print Mark Total" signal is issued only at the conclusion of the bowling of a frame by all members of a team, the multivibrators 1117 and 1121, which indicate the team bowling on either lane 1 or lane 2, cannot be changed to indicate the other team unless the "Print Mark Total" signal is issued and then removed by multivibrator 1186. Thus, since this occurs only when switch 46 is in its "League" position, the team's switching of lanes, indicated by the multivibrators 1117 and 1121, occurs when switch 46 is in its "League" position and does not occur when it is in its "open" position.

Referring specifically to FIGURE 38, placing the switch 46 in its "League" position places a binary one on NAND gate 1785 which allows the multivibrators 1758 and 1759 to be complemented when they receive the appropriate signals commanding them to issue either "Add 1 to Mark Total" or "Add 2 to Mark Total" signals. Placing of switch 46 in the open position grounds an input of NAND gate 1758 to thereby prevent multivibrators 1758 and 1759 from being complemented, thereby issuing any command signals.

Referring now to FIGURE 40, placing switch 46 in its league position places a binary one on NAND gate 1073 which allows the delay multivibrator 1075 to be triggered when the appropriate binary ones are received on terminals 2010, 1704, 1706, and 1316. Since the delay multivibrator 1075 initiates the team totaling procedure, as previously described, it must receive a trigger signal from the NAND gate 1073. This can occur only when a binary one is being received from the setting of switch 46 in its "league" position. Thus, throwing the switch to its open position, continuously places a binary zero on an input to the NAND gate 1073 and the delay multivibrator 1075 will not receive a trigger signal from the NAND gate 1073 even though all other inputs to the NAND gate may be binary one.

A second set of controls must be set on beginning a new game or set of games with the setting of the team size selector switches 52 and 55. If league play has been selected on switch 46, the size of Team A is selected on switch 52, and the size of Team B is selected on switch 55 so that, as previously described, the multivibrators 1114–1117 and 1118–1120 will be reset to indicate the first player of each team when a player, one greater than the team size selected by the corresponding switch, has been reached. Since switch 46 is in its league position, the multivibrators 1171 and 1121 will be complemented to indicate the opposing team, and register 1110 and 1111 will indicate the first player of the team that has been bowling on the other lane, regardless of whether all members of that team have completed bowling a frame thereon. Since each register 1110 and 1111 will count through the members of one team and then proceed to count up through the members of the opposing team independently of each other, it is possible not only for members of the same team to be bowling on both lanes, but for even sequential players of a single team to be bowling on the two lanes simultaneously. If the switch 46 has been set to the open position, the multivibrators 1117 and 1111 will not be complemented, and, therefore, will continue to indicate the same team throughout the bowling of one or more games. Therefore, when the switch 46 is set to its "open" position, Team A size selector switch 52 will indicate the number of players which will bowl open games on the first lane while the team size selector switch 55 should be set to the number of players which will be bowling open games on the second lane. Since there is no complementing on the multivibrators 1117 and 1121, the respective registers 1110 and 1111 will indicate the first player of the respective lane who is bowling on that lane after the last bowler on that lane has completed a frame.

After the switch 46 is in an appropriate position to "league" or "open" play, and the team size selector switches 52 and 55 have been properly positioned, the "POWER OFF-ON" switch 45 should be turned "ON."

Referring to FIGURE 46, the closure of switch 45 grounds the relay 1920, energizing it, which in turn connects the bus bars 1906, 1907 and 1908 to terminals 1903, 1904 and 1905, respectively, to apply the appropriate voltages thereto, which energize all of the operating circuits of the scorer except the memory supply 1916 and the "Initial Reset" terminals **1901*a*–1901*d*. These are energized through multivibrator 1921 by the thermal delay relay 1940 after a delay of approximately five seconds, as previously described in greater detail. As soon as power is applied to the minus six volt bus bar 1907, a lamp behind the "PRINT COMPLETE" switch 75 lights indicating that power has been turned on. After the five-second delay, the initial reset circuits for resetting all the necessary multivibrators to an initial position through the terminals 1901*a*–1901*d* are actuated. As may be seen in FIGURE 30, the initial resetting of such multivibrators as 1218 will cause the lamps behind the "PRESS TO SIGNAL FOUL" switches on the front panel of the lane simulator 70** to be lit, indicating that the initial reset has been accomplished.

When the first player of Team A in league bowling or the first player to bowl on lane 1 in open bowling is ready to start, he presses the "START GAME" switch 51, and when the first player of Team B in league bowling or the first player to bowl on lane 2 in open bowling is ready to start, he presses the "START GAME" switch 54.

Referring again to FIGURE 35, pressing switch 51 causes the memory reset unit to commence bringing in the first seven code words into the operating register SR and resetting them to zero value in preparation for the new game. As aforementioned, the first six words are the code words corresponding to the six players of Team A in league play or the players bowling on lane 1 in open play. The switch 54 initiates the action of the memory reset unit to bring the ninth through fifteenth code words into the operating register SR and resetting them to zero value for a new game. The ninth through fourteenth words correspond to six players playing on Team B in league play, and a possible six players bowling on lane 2 in open play. The seventh word is the team word for Team A and the fifteenth word is the team word for Team B. These words are, of course, not utilized in open play. Once the switch 46, to choose either league or open play, the switches 52 and 55, to indicate team size or number of players bowling on a lane, and switch 45, to apply electrical power to the scorer, have been set, they do not have to be reset during successive games of a set of games played by the same players. However, the "START GAME" switches 51 and 54 must be pressed before the beginning of each new game.

If not already set to its desired position, the "AUTO-MANUAL" switch 76 should be placed in the desired position. Referring to FIGURE 38, the delay multivibrator 1760 initiates a "Print Complete" signal after a delay of approximately two seconds from the time it receives a "Print Score" signal. Since switch 76 is connected to its negation output terminal, it will connect its negation output terminal to an input terminal of the NAND gate 1786 to allow this automatic "Print Complete" signal to pass to terminal 1773 at the end of a two-second delay period when the switch is in its automatic position.

If switch 76 is in its manual position, the "Print Complete" signal issued by the delay multivibrator 1760 can never reach terminal 1773. Other sections of the switch 76 vary the delay periods of the delay multivibrators 1728 and 1729 by adding in additional capacitors into their delay circuits when the switch is in its automatic position. In the automatic position, the delay multivibrators 1728 and 1726 have sufficient capacitance to delay the time during which a "Print Box Score" signal is issued from the rank 1 gates and the time during which a "Print Score" signal is issued from the rank 2 gates. When the switch 76 is in its "manual" position, these delay periods are reduced to a period of 11.5 microseconds, for it is presumed that a manual "Print Complete" signal will not be initiated until the appropriate scores have been absorbed by the viewer of the output indicator 90. The two-second delay period provided when the switch 76 is in automatic position is to allow a sufficient time for the scores displayed by the output indicator unit 90 to be observed by a viewer. However, for the purposes of the operation of the circuit, only 11.5 microseconds are required for all rank 1 commanded operations to be completed before the beginning of rank 2 operations.

*First ball following an open frame*

As previously described in detail, the state and output control unit 17 contains switching gates which, by issuing command signals, dictate the scoring operations that must be performed in accordance with the American Bowling Congress rules or any other set of predetermined bowling rules, following a pinfall indicative of the rolling of a bowling ball on a bowling lane. In bowling, the action of the game which results in scoring is the rolling of each ball and the pinfall resulting from the rolling of that ball. The state and output control unit selects a formula which results in the issuing of command signals for every operation resulting from each pinfall. The selection of the formula and the activation of the circuitry to issue the required command signals are based upon: (1) the state of the player's game at the time of the pinfall, (2) the location of the pinfall in the player's game, which is defined by the frame and ball number of the pinfall, and (3) whether the pinfall was ten or less than ten. The operations commanded by each formula are divided into one or more functions which must be performed sequentially rather than simultaneously. Thus, each function is a set of simultaneously commanded operations and contains all of the operations that may be commanded simultaneously. If all the operations in a formula can be commanded simultaneously, the formula consists of only one function. As aforementioned, each one of the ranks of gates shown in FIGURE 38 constitute the circuitry of all functions that may be possibly performed simultaneously in any formula. Therefore, the ranks are numbered in the sequence in which the functions of each formula must be performed.

The first ball following an open frame refers to the first ball in any frame which is not preceded by a frame in which ten pins were knocked down. This, of course, includes the first frame of a player's game since no pins can be knocked down in a frame previous to the first one of the game.

Referring now to FIGURE 37, state 1 is the first ball or pinfall resulting therefrom following an open frame. As indicated in the drawing, there are two arrows which run from state 1 to states 2 and 3, respectively, indicating that a pinfall occurring when a player is in state 1 requires a choice between two formulas for the proper scoring of the pinfall. In order to, in this particular situation, make the choice between the two possible formulas represented by the two arrows leaving the state 1 circle, the choice does not depend upon the location of the pinfall in the game, but it does depend upon whether the pinfall was ten or less than ten. If the pinfall is ten, which is a strike, the formula consists of a one-rank function which is function $f_1$ shown in Table V. On the other hand, if the pinfall was less than ten, the formula that must be chosen consists of a one-rank function which is $f_4$ shown in Table V.

Referring to FIGURE 37 and the Table V, it will be noticed that a ten pinfall causes a function number $f_1$ to be issued as previously mentioned. In Table V, it will be noticed that function $f_1$ consists of five operation notations. The first of these indicates that a box score is to be printed. The second indicates that the box printer location is to be increased by two. This is equivalent to increasing the frame by one. Thus, the box printer location was changed from the first ball of one frame to the first ball of the subsequent frame. This occurs after the box has been printed. The fourth output notation P indicates that the pinfall is to be added to the score now existing in the player's code word. No score is to be printed at this time, however. The final notation associated with the $f_1$ function refers to the number to be added to the team mark total. In the case of $f_1$, this number is one.

For the $f_4$ function, which occurs when the player is in state 1, but when his pinfall is less than ten, the notation as shown in Table V indicates that the box score is to be printed and the box printer location is to be increased by one. This is equivalent to remaining in the same frame but moving from first to second ball in that frame.

Refer now to FIGURE 38. Each of the gates 701 through 712 in FIGURE 38 are associated with rank 1 functional outputs. These gates have three types of inputs: (1) state inputs as indicated in Table VI, (2) location in the game of the pinfall associated with the ball rolled and (3) the type of pinfall credited to the ball (10 or $\overline{10}$). Certain of these three types of inputs may be missing indicating that this particular input is of no consequence to the gate or function involved. For state 1, gate 701 and gate 702 have the proper state inputs. No location input is applied to either of these gates because it is not important to the performance of these functions, as indicated by the first input notation on each arrow leaving state 1 in FIGURE 37. Gate 701 in FIGURE 38 requires a pinfall of ten for activation. Gate 702 requires that the pinfall be less than ten. Activation of gate 701 will cause multivibrator 1756 to be set. This produces the "Print Box Score" command. Simultaneously multivibrator 1755 will be set commanding that the box printer location be increased by two. Multivibrators 1752 and 1759 will also be set commanding that the pinfall be added to the score existing in the operating register, and that a one be added to the team mark total, respectively. Thus, all of the required operating commands are issued by gate 701 when it is activated as a result of the player state being one and a pinfall being ten. Gate 702 is activated under identical state conditions but with a pinfall of less than ten. Gate 702 causes the setting of multivibrators 1756 and 1754 resulting in the "Print Box Score" command and a command to increase the box printer location by one, respectively.

Gate 701, when activated, places binary zero on terminal 1732 and binary one on terminal 1731. These terminals are shown on FIGURE 36 and result in the new state being placed in multivibrators SR–1–SR–3. This action, however, does not occur until after printing occurs. Prior to setting SR–1–SR–3, the new state is temporarily stored in multivibrators 1710–1712. At the time these multivibrators are placed in the new state, the "End Operations" command is issued from terminal 1790. Referring again to FIGURE 38, the issuance of the "End Operation" command causes multivibrator 1725 to change state resulting in the ending of all rank 1 operations, and causing issuance of the set and reset signals to SR–1–SR–3 from terminal 1775. Thus, it is impossible for rank 2 and rank 3 functions to take place because the new state has been issued and operations in the state and output control unit cease. When the "Print Box Score" command is issued by multivibrator 1756, the output unit 18 causes the pinfall at the output of the pinfall sequencer 12 to be displayed in the proper location on the indicator unit 90, or to be printed on a printer unit, or otherwise displayed when appropriate equipment is connected. At the conclusion of the box printing cycle, the addition is made to the box printer location in the arithmetic unit 10, as previously described. Additions to the team mark total word are made when commanded by multivibrators 1758 or 1759 and after the team mark total word has been called into the operating register SR.

*First ball following a single strike*

Whenever a player bowls a first ball in the frame following a single strike, his game is in state 2. Referring to FIGURE 37, there are two possible formulas, one of which must be selected on the basis of whether the pinfall is ten or less than ten, for it will be noted that the location of the pinfall in the player's game has no effect in deciding which formula should be chosen. Both formulas consist of a single rank function, either $f_4$ or $f_6$, listed in Table V. In the formula utilizing the function $f_4$, the new state computed is state 5, while the new state computed by the formula utilizing function $f_6$ is state 4.

State 2 is indicated by the signals of binary one on terminals 1704, 1707 and 1708, as indicated by Table VI. Referring to FIGURE 38, only two gates in rank 1, gates 703 and 704, can be activated in state 2, gate 703, when the pinfall is less than ten, and gate 704, when the pinfall is ten. Gate 703, when activated, causes setting of multivibrators 1756 and 1754, resulting in issuance of the "Print Box Score" signal, and in the addition of one to the box printer location, respectively. Upon activation of gate 703, a binary zero signal is placed on terminal 1735 and a binary one on terminal 1734. Referring to FIGURE 36, it will be noted that these signals result in the setting of multivibrators 1710 through 1712 to binary one at the proper time. When these multivibrators are set, the "End Operation" signal is issued by terminal 1780 and by terminal 1790 resulting in the ending of rank 1 by the setting of multivibrator 1725 shown in FIGURE 38. Also, as a consequence of the "End Operation" signal, the new state is transferred to SR–1 through SR–3 by action of power amplifier 1782 in FIGURE 38. Thus, the completion of rank 1 operation concerned with gate 703 ends operation in the state and output control unit for this pinfall calculation.

As previously explained, gates 703 and 704 are the only possible choices in state 2. When the pinfall is ten, gate 704 is chosen. Activation of gate 704 results in the setting of multivibrators 1756, 1755, 1758 and 1752. When multivibrator 1756 is set, the "Print Box Score" command is issued. Setting multivibrator 1755 causes two to be added to the box printer location, which is equivalent to moving to the next frame, when the proper time arrives. Setting multivibrator 1758 results in two being added to the mark total stored in the team mark total word in a manner similar to that described previously. Multivibrator 1752, when set, causes a number equal to the pinfall to be added to the store in the player's code word by the arithmetic unit 10.

Gate 704 issues a binary zero to terminal 1738 in FIGURE 36. Upon completion of the box printing cycle, the new state, state 4, is loaded into the intermediate storage multivibrators 1710 through 1712 and the "End Operation" signal is issued on terminal 1780. This signal causes the ending of rank 1 operations and the transferral of the new state to SR–1 through SR–3 as previously described.

In both cases arising when a first ball follows a strike, no score printing is required. Only the pinfall is displayed or printed in the proper box. This action results when multivibrator 1756 is set causing issuance of the "Print Box Score" signal. Because the output unit 18 receives the "Print Box Score" command rather than a "Print Score" command, a selection of the proper digit (hundreds, tens, or units) must be made in order that pinfall be displayed in the proper location. This choice is governed by the first or second ball signal. If the first ball signal, as issued by the arithmetic unit 10, is present the pinfall is printed with the tens digit. If the second ball signal is present, the units digit is used.

*Second ball following an open frame*

If the player is bowling a second ball following an open frame, his game is in state 3. Referring to FIGURE 37, it may be seen that a selection between three formulas must be made. The selection of a proper formula depends first upon whether the pinfall was greater or less than ten and if it was less than ten, whether the pinfall being scored is indicative of a pinfall resulting from the second ball in the tenth frame. If the pinfall was ten, then a single rank function $f_9$ should be selected and a new resulting state of 6 should be computed. If the pinfall was less than ten, functions $f_5$ and $f_2$ should be selected. However, if it was the second ball in the tenth frame the stop state should be computed since the player's game would be concluded. However, if it is not the second ball in the tenth frame, a new state 1 should be computed, for the player's next pinfall must be a first ball following the open frame since less than ten pins were knocked down.

State 3 is indicated by binary ones appearing on terminals 1705, 1707 and 1708, as listed in Table VI. In rank 1, the only gates which can be activated by these signals are gates 705 and 707; gate 705 in the case of ten pins down, and gate 707 if less than ten pins have fallen. In the case where ten pins have fallen, a spare has been made and the player should enter state 6 after the scorer performs the formula which is comprised of the $f_9$ function. For the $f_9$ function to be completed, the pinfall must be printed in the proper box, the box printer location should be incremented by one, the pinfall should be added to the score in the operating register, and one should be added to the mark total stored in the team mark total word, as indicated by Table V. Gate 705, when activated, causes the setting of multivibrators 1756, 1754, 1752 and 1759, resulting in issuance of the "Print Box Score" command, the adding of one to the box printer location, the adding of the pinfall to the score, and the adding of one to the mark total, respectively. Thus, all of the operations necessary to produce the $f_9$ function have been commanded and will be carried out by the proper units in the scorer; the displaying of the box score by the output indicator unit 90; the implementing of the box printer location by the arithmetic unit; the adding of pinfall to the score by the arithmetic unit; and the additions to the mark total by the arithmetic unit. The spare indication will be displayed by the output indicator unit 90 as a result of the "Print Box Score" command. If a printer is used, the spare symbol would appear in the unit's digit box in the proper frame. Activation of gate 705 by the aforementioned signals results in the application of a binary zero to terminal 1736 on FIGURE 36. At the conclusion of the box printing cycle, the new state, state 6, is placed in the intermediate storage multivibrators 1710 through 1712, the "End Operations" signal is issued, rank 1 is terminated, the new state is placed in SR-1 through SR-3, and all state and output control unit operations cease.

If the pinfall was less than ten, two possible formulas may be chosen, depending upon the frame indication. If the last ball in the tenth frame was bowled, it is desired that the next state be the stop state. If not, the next state should be state 1. In either case, the output formula consists of function $f_5$, followed by function $f_2$. Since the functions are identical in the first rank, a single gate may be used to detect this state 3 condition where less than ten pins have fallen. This gate is gate 707. When gate 707 is activated, multivibrators 1756, 1754, and 1752 are activated, resulting in issuance of "Print Box Score" signals, the addition of one to the box printer location, and the addition of the pinfall to the score, respectively. Thus, during the first rank, the output indicator unit 90, will display the pinfall as indicated by the pinfall sequencer 12. It will be noted that no interconnection between gate 705 and any terminal on FIGURE 36 has been made. This is because the formula to be performed contains more than one function, and therefore, the new state should not be entered until after the second function has been performed rather than solely the first. At the conclusion of the box printing cycle, the "Box Print Complete" signal is applied to delay multivibrator 1728. Its output then causes multivibrator 1725 to change state ending rank 1 and causes multivibrator 1726 to transfer states starting rank 2 operations.

Of the eight rank 2 gates, only two can be activated in state 3, gates 721 and 722. Each of these gates requires that the pinfall be less than ten; however, gate 722 requires that the frame indication for the ball rolled be the last ball in the tenth frame, as indicated by the symbol K and defined in Table IV. When either of these gates is activated, the print score multivibrator 1751 will be set and the output unit 18 and output indicator unit 90 will cause display of the score then in the operating register. In the case of gate 721, the new state should be state 1. Terminal 1738 becomes binary one and terminal 1740 binary zero when gate 721 has been activated. These terminals, as shown in FIGURE 36, are connected to the multivibrators 1710–1712 so that the binary code signal for state 1 is set up in these three multivibrators when terminal 1738 is binary one and terminal 1740 is binary zero and the print cycle is completed. In case of gate 722, the new state should be state S. Terminal 1739 becomes binary one and terminal 1741 becomes binary zero when gate 722 has been activated. As shown in FIGURE 36, this action places the binary code for state S in the multivibrators 1710–1712. When the "End Operation" signal is issued, as previously described, causing the ending of the rank 2 operations, the new state is transferred to SR-1 through SR-3. Issuing of the "End Operation" signal concludes all actions of the state and output unit 17.

When the "Print Score" command is initiated by the rank 2 NAND gates by setting multivibrator 1751, the output control unit 18 and the output indicator unit 90 will cause the player's score contained in the operating register to be displayed, along with the corresponding ball and frame numbers.

*First ball following two strikes*

Referring to FIGURE 37, the first ball following two strikes is state 4. When a player's game is in this state, the selection between three formulas must be made based upon whether the pinfall is indicative of the rolling of the second ball in the eleventh frame, and if it is not, whether the pinfall was ten or less than ten. If the pinfall is indicative of the rolling of a second ball in the eleventh frame, then a two-rank function $f_5$ and $f_2$ with a computation of the stop state as a new state is selected as the formula. If the pinfall is indicative of the rolling of any ball other than the second in the eleventh frame and the pinfall is ten, a three-rank formula consisting of the functions $f_6$, $f_2$, and $f_7$ with the recomputation of state 4, is selected. If the pinfall is indicative of any other ball other than the second ball in the eleventh frame and the pinfall is less than ten, the formula chosen consists of three functions $f_5$, $f_2$, and $f_3$, and the computation of state 5 as the new state. Since the first ball after two strikes is state 4, a player's game can be in state 4 only when he is rolling the first ball of a new frame. With the player's word in the operating register, and his game in state 4, binary ones will appear on terminals 1704, 1707, and 1709. Gates which may be activated for state 4 depending on the other input conditions are gates 706, 709, and 711. Gate 706 is activated if the pinfall is indicative of the second ball in the eleventh frame, and its activation will cause the setting of multivibrators 1752, 1754 and 1756 so that they issue the "Add Pinfall to Score" command, the "Add 1 to Box Print Location" command, and the "Print Box Score" command, respectively. The issuing of these commands accomplishes function $f_5$. If the pinfall is not indicative of the second ball in the eleventh frame, and less than ten pins are knocked down, it is again desirable to have rank 1 perform function $f_5$. This combination of inputs actuates gate 709 which is similarly connected to multivibrators 1752, 1754 and 1756 so that the same set of commands are issued by these multivibrators. However, if the pinfall is not indicative of the second ball in the eleventh frame and is a full ten, which is another strike, rank 1 initiates function $f_6$ because NAND gate 712 is activated, which causes multivibrators 1752, 1754, 1756 and 1759 to be set and thereby issue the "Add Pinfall to Score" command, the "Add 2 to Box Printer Location" command, the "Print Box Score" command, and the "Add 2 to Mark Total" command, respectively. There is no interconnection between these rank 1 gates at any terminal shown on FIGURE 36. Therefore, a rank 2 function is to be carried out regardless of which one of the three NAND gates in rank 1 has been actuated.

Only two of the NAND gates in rank 2, gates 724 and 727, may be actuated when a player's game is in state 4. If the player's game is at the second ball of the eleventh frame, gate 724 is activated to place a binary one on terminal 1739 and a binary zero on terminal 1741 so that the binary code for the stop state will be placed in the multivibrators 1710–1712 when the "Print Complete" signal is received. Activation of NAND gate 724 sets multivibrator 1751 so that it issues the "Print Score" command which subsequently results in the "Print Complete" signal being issued. If the player's game is not at the second ball of the eleventh frame, gate 727 is actuated to set multivibrator 1751 and thereby cause the issuance of the "Print Score" command without creating any effect upon the terminals in FIGURE 36. The issuance of the "Print Score" command is the $f_2$ function which is the second rank function in all three of the formulas which may be selected when a player's game is in state 4. However, if the pinfall is indicative of the second ball of the eleventh frame, there are no further operations beyond the rank 2 function of printing or displaying the score, and therefore, the binary code for the stop state is set up in the multivibrator 1710–1712 and transferred into the operating register's multivibrators SR-1 though SR-3 when the "End Operation" signal is issued, as previously described. Since gate 727 is not connected to any of the terminals shown in FIGURE 36, the state and output control unit is not disabled from carrying out rank 3 functions when the player has not yet reached the second ball in the eleventh frame.

Of the five NAND gates in rank 3, only gates 734 and 735 may be activated when a player's game is in state 4. Gate 734 is activated when the pinfall is less than ten and gate 735 is activated when the pinfall is ten, which is another strike. Activation of gate 734 sets multivibrator 1753 to issue the "Add 10 to Score" command while activation of gate 735 sets multivibrator 1757 to issue the "Add 20 to Score" command. Thus, gate 734 initiates function $f_3$, while gate 735 initiates function $f_5$. When gate 734 is activated, it places a binary zero on terminal 1744 so that the binary code for state 5 is placed in the multivibrators 1710–1712 prior to being transferred to the multivibrators SR–1 through SR–3 of the operating register, as previously described.

Gate 735, when activated, issues a binary zero to the terminal 1745 of FIGURE 36. This terminal causes only the middle digit of the three bit intermediate registers 1710 through 1712 to be set. The other two digits therefore contain the same information as in SR–1 and SR–3. Since the state is not being changed, but remains in state 4, it would be unnecessary to command any of the intermediate multivibrators 1710 through 1712 except for the desire to cause issuance of the "End Operation" signal. Therefore, the multivibrator 1711 is again set so that the "End Operations" signal will be issued on terminals 1780 and 1790. This "End Operations" signal results in cessation of operations in rank 3, the commanding of the new state in SR–1 through 3 (although no new state need be commanded), and in the ceasing of all state and output control unit operations.

During rank 1 operations in state 4, when a pinfall was rolled of ten, the strike light of the output indicator unit 90 was lit. If a printer was used, a strike symbol X would be printed in the first box in the proper frame. Where the pinfall was less than ten, the proper pinfall would be displayed in the first box in the proper frame on the printer, or in the first box on the output indicator unit 90. During rank 2 operations, a score print was commanded. Therefore, on the output indicator unit 90 the score along with the proper frame to which it was credited would be displayed. If a printer were used, the proper score would be printed in the proper frame.

*Second ball following a strike*

Referring to FIGURE 37, the second ball following a strike is state 5, and when the player's game is in this state, the selection must be made based upon the location of the pinfall in the game and whether ten or less pins were knocked down of a formula from a group of four. If the pinfall is indicative of the rolling of a second ball in the eleventh frame, then a two-rank function, $f_5$ and $f_2$, with a computation of the stop state as a new state, is selected as the formula. If the pinfall is indicative of the second ball in the tenth frame and the pinfall is less than ten, the player's game is over and therefore, a four-rank formula consisting of functions $f_5$, $f_2$, $f_8$ and $f_2$ is selected. However, if the second ball in the eleventh frame which is the last possible ball which can be rolled in that player's game, is not the location of the pinfall and ten pens are knocked down to form a spare, the formula to be chosen is a three-rank formula consisting of functions $f_9$, $f_2$ and $f_3$, and the computation of state 6 as the new state. If the pinfall is not for the second ball of either the tenth or eleventh frames and is not a spare with a pinfall of ten, then the formula to be chosen is the one which will compute state 1 as a new state and will consist of four-rank formula $f_5$, $f_2$, $f_8$ and $f_2$.

The second ball in any frame following a strike is termed state 5 and is indicated by binary ones appearing on terminals 1705, 1707 and 1709, as listed. Gates which may be utilized for state 5 depending on the other input conditions are gates 706, 707, 708 and 712. In several instances, it is possible that more than one of these gates may be utilized simultaneously, but in all cases where this occurs, the outputs of these gates go to identical locations. This allows a minimum number of diodes to be required in the gating structure. Again, referring to FIGURE 37, it will be noted that from state 5 there are two routes to the stop state. One of these routes depends on the ball rolled being the second ball in the eleventh frame, the M designation. This particular route does not depend on pinfall and, for this reason, may or may not activate more than one gate. This set of input conditions will always activate gate 706; if the pinfall is less than ten it will also activate gates 707 and 709 in rank 1. The desired formula is comprised of functions $f_5$ and $f_2$. The rank 1 function $f_5$ requires the printing of a box, the movement of the box printer by one box and the addition of pinfall to the score existing in the player's word at this time. When gate 706 is activated, irrespective of whether or not gates 707 and 709 are also activated, multivibrators 1756, 1754 and 1752 will be set resulting in the issuance of the required commands, as previously described. The "Print Box Store" command will result in the displaying of the accumulated pinfall in the proper location of the output indicator unit 90 or on a printer if utilized. Gate 706 does not issue any signal to FIGURE 36 and therefore, no new state is transferred by any rank 1 operation. Therefore, upon reception of the "Box Print Complete" command, rank 1 is terminated and rank 2 starts. In rank 2, gate 704 is activated by the input conditions described, and results in the issuance of the "Print Score" command by multivibrator 1751, and in placing a binary one on terminal 1739 and a binary zero on terminal 1741 of FIGURE 36. These two terminals transfer the new state, that of the stop condition, to the intermediate storage multivibrators 1710 through 1712, and start the "End Operation" sequence described previously. Thus, rank 2 terminates actions in the state and output control unit for this particular formula. During the score printing cycle, the proper score is displayed by the output indicator unit 90 or by a printer in the proper frame, if used.

If the input conditions are those of state 5, and the ball rolled resulted in ten pins being knocked over, and it was not the second ball in the eleventh frame, the player enters state 6 after the scorer peforms the three-function formula $f_9$, $f_2$ and $f_3$. $f_9$, the first rank function, requires that the box score be displayed, that the box printer location be incremented upwards by one, that the pinfall be added to the score, and that a one be added to the team mark total word. Gate 712 of rank 1 is activated by the input conditions described and results in the setting of multivibrators 1756, 1754, 1752, and 1759. These multivibrators cause the performance of the required operations, as previously described. During the box printing cycle, the output indicator unit 90 will display the spare light, or if a printer is used, the spare symbol will be displayed in the proper frame. No signal is issued by gate 712 to FIGURE 36 and therefore, no state can be changed by this rank 1 function. Therefore, upon receipt of the "Box Print Complete" command, rank 1 is terminated and rank 2 initiated.

In rank 2, the gate activated under the aforementioned input conditions is gate 727. Setting of this gate activates multivibrator 1751, the "print score multivibrator." No signal is issued by gate 727 of rank 2 to FIGURE 36 and therefore, the state is not changed by rank 2 operations. Upon receipt of the "Score Print Complete" command, rank 2 is terminated and rank 3 begins.

In rank 3, gate 733 is activated under the stated conditions resulting in the setting of multivibrator 1753, which commands that ten be added to the score. Gate 733 also activates terminal 1743 of FIGURE 36 resulting in transfer of the new state, state 6, to the intermediate storage multivibrators 1710 through 1712. This action produces the "End Operations" cycle, and causes rank 3 to terminate and the new state to be transferred to SR–1 to SR–3. Operations in the state and output control unit then cease with the rank 3 operation. During the score print cycle commanded in rank 2, there is displayed on the output indicator unit the proper score along with the proper frame designation for this score. Nothing is displayed, however, during the rank 3 operation since this operation requires only approximately 200 microseconds.

If the input conditions are such that ten pins were not overturned and it is not the second ball in the eleventh frame, the formulas involved contain four functions each.

It will be noted in FIGURE 37 that if input conditions are as described and it is the second ball in the tenth frame, the stop state is entered at the conclusion of the performance of the formula. If it is not the second ball in the tenth frame, nor the second ball in the eleventh frame, and if ten pins were not overturned, state 1 is entered after performance of the formula. Within the state and output control unit, operations on either of these formulas are identical through rank 3 and differ only slightly in rank 4. They will therefore, be described simultaneously through rank 3 and the differences noted for rank 4 operations.

During either of the stated input conditions, gates 707 and 709 of FIGURE 38, rank 1, will be activated and will cause issuance of signals from multivibrators 1756, 1754 and 1752, resulting in the commands "Print Box Score," "Add 1 to Box Printer Location," and "Add Pinfall to Score." Thus, all operations associated with the $f_5$ function are commanded in rank 1. No commands are issued to FIGURE 36 and therefore at the conclusion of the box print cycle, rank 1 will be terminated and rank 2 initiated.

Under the required input conditions, gate 727 of rank 2 is activated. It is also possible that gate 726 may be activated, but both of these gates perform the same function, that of setting multivibrator 1751 and thereby causing the "Print Score" command to be issued. Neither of these gates causes issuance of any signal to FIGURE 36 and therefore the state is not changed. At the conclusion of the score print cycle, during which the score is displayed by either the output indicator unit 90 or a printer, if used, rank 2 is terminated and rank 3 begins.

In rank 3, gate 731 is activated under either of the formula conditions described. Through a delaying cycle caused by delay multivibrators 1714 and 1715, an addition is performed of the pinfall to the score by multivibrator 1752. During the delay period of multivibrators 1714 and 1715, rank 3 is terminated by action of delay multivibrator 1730. However, since operations have been started by multivibrators 1714 and 1715, they must continue until completed.

Upon completion of the delay period of delay multivibrator 1715, the multivibrator 1723 is reset, applying binary one to terminal 1792. This action results in application of binary one to one of the input terminals of rank 4, gate 741, and to one of the input terminals of rank 4, gate 742. On terminals 1067, the $\overline{K}$ signal, as defined in Table IV, is applied. On terminal 1068, the K signal defined in the same table is applied. These signals now differentiate between the two formulas to be performed and consequently between the states to which the computation proceeds. If the condition is the $\overline{K}$ condition, a binary one is applied to terminal 1738 and a binary zero to the terminal 1740, causing the intermediate storage multivibrators to accept the new state, state 1, upon completion of the score print, which is also commanded simultaneously by gate 741 of rank 4. Gate 742 of rank 4 will also command a score print, but will activate terminal 1739 with a binary one and terminal 1741 with a binary zero, causing transfer in FIGURE 36 of the intermediate storage multivibrators 1710–1712 to the stop state S upon completion of the score printing cycle. Thus, after this second score printing is complete, rank 4 is terminated, the new state is inserted in SR–1 through SR–3, and the operations of the state and output control units cease. During the second score printing, the output indicator unit 90 will receive score information in the present bowling frame as indicated by the output unit 18. If the printer is attached, printing of scores in the present frame will result.

*First ball following a spare*

Referring to FIGURE 37, the first ball following a spare is state 6 of a player's game. When the player is in state 6, one of three formulas must be chosen for the scoring of subsequent pinfall based upon whether the pinfall is indicative of the rolling of the first ball in the eleventh frame, or if it is not, whether the pinfall is ten or less than ten. If the pinfall is indicative of the first ball in the eleventh frame, a two-rank formula, consisting of $f_5$ and $f_2$, with the computation of the stop state, must be selected. If the pinfall is not for the first ball in the eleventh frame and is for a pinfall less than ten, a two-rank formula consisting of functions $f_5$ and $f_2$ and the computation of state 3 should be selected, and if the pinfall was ten, a three-rank formula of $f_1$, $f_2$ and $f_3$, with the computation of a new state 2, should be selected.

State 6 is indicated by binary ones on terminals 1705, 1706 and 1709, as shown in Table VI. This state is associated with the first ball following a spare and can lead to the stop state if the ball bowled is the first ball in the eleventh frame, or to the state 2 position if ten pins are knocked down and it is not the first ball in the eleventh frame, or to state 3 if ten pins are not knocked down, and it is not the first ball in the eleventh frame. In calculating these new states, three formulas are utilized, two of which consist of two ranks, $f_5$ and $f_2$, and one of which contains three functions, $f_1$, $f_2$ and $f_3$. If the prior state is state 6, and it is the first ball in the eleventh frame, regardless of pinfall, the player goes to the stop state after performing the functions $f_5$ and $f_2$. The first-rank function $f_5$ is performed through action of gate 708 which is opened with the required signals. The $f_5$ function consists of displaying the box score, advancing the box printer location by one and adding the pinfall to the score existing in the operating register. Thus, gate 708 sets multivibrators 1756, 1754 and 1752, commanding the aforementioned operations in the order mentioned. Gate 708 does not connect to any terminal on FIGURE 36, and therefore, cannot cause a transfer to a new state. Thus, at the end of the box printing cycle, rank 1 is completed and rank 2 is initiated.

In rank 2, gate 3 is activated by the input conditions described. This gate commands the print score operation through multivibrator 1751 and applies binary one to terminal 1739 and binary zero to terminal 1741 in FIGURE 36. Thus, the stop state is placed upon application of the "Score Print Complete" command into the intermediate multivibrators 1710–1712. The "End Operation" signal is issued, causing termination of rank 2 operations, transferring indirectly the new state into SR–1 through SR–3, and terminating all state and output control unit functions, as has been previously described. During the box print cycle, the accumulated pinfall is displayed in the proper location on the output indicator unit 90 or may be printed by use of a remote printer. During the score print cycle, the score is similarly displayed.

If the input conditions are such that less than ten pins have fallen, and it is not the first ball in the eleventh frame, the formula comprised of functions $f_5$ and $f_2$ leading to state 3 must be performed. In FIGURE 38, in rank 1, gate 709 is activated under these conditions and produces the $f_5$ output consisting of the "Print Box Score" command, "Add 1 to Box Printer Location" command, and "Add Pinfall to Score" command, as previosuly described. No commands are given to FIGURE 36 by action of gate 709, and therefore, the state is not transferred in the first rank. Thus, at the end of the box print cycle, rank 1 is terminated and rank 2 is started, as previously described.

In rank 2, gate 725 is activated by the input signals mentioned, resulting in the setting of print score multivibrator 1751. A binary one is applied at this same time to terminal 1742 of FIGURE 36, and upon completion of the score print cycle, the new state, state 3, is transferred to the intermediate storage multivibrators 1710–1712, and the "End Operation" signal is issued, as previously described. All of the operations associated with the issuance of this signal then proceed terminating action in the state and output control unit. During the box print cycle, the proper pinfall is displayed in the second box of the proper frame, either by the output indicator unit or by a printer, if used. During the score print cycle, the proper score is displayed by these devices in the proper frame.

If the input conditions are such that the player is in state 6, it is not the first ball in the eleventh frame and he has overturned ten pins, he has just bowled a strike and should therefore go to the state associated with a single strike following a strike. The formula to be completed consists of three functions $f_1$, $f_2$ and $f_3$. The $f_1$ function consists of the commands "Print Box Score," "Add 2 to Box Printer Location" (equivalent to incrementing the box printer location by one frame), "Add Pinfall to Score" in the operating register, and "Add 1 to Mark Total" in the team mark total word. Gate 710 of rank 1 detects the input conditions described and causes setting of multivibrators 1756, 1755, 1752 and 1759, which command the operations described, respectively. No command is issued by gate 710 of rank 1 which will cause changing of the state. Therefore, at the conclusion of the box print cycle, rank 1 is terminated and rank 2 is started.

In rank 2, gate 728 detects the input conditions for state 6 with a pinfall of ten if it is not the first ball in the eleventh frame. Gate 728 commands the print score operation by setting multivibrator 1751. No command is given to FIGURE 36, therefore, rank 2 does not produce a new state and does not terminate operations in the state and output control unit. At the conclusion of the score print cycle, rank 2 is therefore terminated and rank 3 started. Gate 732 of rank 3 detects the input conditions described and causes setting of multivibrator 1753 issuing the command "Add 10 to Score." Gate 732 also activates terminal 1750 in FIGURE 36 causing the new state to be entered into the intermediate storage multivibrators 1710–1712. This causes the "End Operation" signal to be issued, as previously described. This results in completion of operations of the state and output control unit.

During the box print cycle, the strike symbol would be displaced on a printer, if utilized, or the strike light is lit on the output indicator unit 90. During the score printing cycle, the score is displayed by either of these units in the proper frame and location.

*The stop state*

In FIGURE 37, the stop state is indicated by S and is the state to which a player's computation goes at the end point of his game. The stop state is indicated by the presence of binary one on terminals 1704, 1706 and 1708, as shown in Table VI. The stop state is unique in that no operations are performed in this state, but merely signal the need for team totaling for the ending of computation, depending on the status of league or open bowling. Referring to FIGURE 40, the box printer location and the player identification sections of the arithmetic unit, gate 1073 in FIGURE 40 detects the presence of the stop state and, under league conditions, will activate the team totaling circuitry at the proper time. One input terminal of this gate marked 2010, is a timing input which is normally activated after the state is transferred in normal computation. Thus, at the time the timing pulse appears on this terminal, the player finishing a game has entered the stop state. Since no shifting motion is occurring at this time in the memory and operating register shift circuits, the "Shift Complete" signal applied to terminal 1316 will be a binary one. Thus, all inputs to gate 1073 become binary one. When gate 1073 is activated, its output drops to binary zero and delay multivibrator 1075 is activated and begins its delay cycle. The assertion output of this delay multivibrator causes a binary one signal to be issued on terminal 1014 on FIGURE 39. This causes all the multivibrators 1001 through 1010 to be set to binary one thus enabling a transfer of binary zero into these multivibrators when they are used to copy the operating register multivibrators SR–4–SR–13. At the conclusion of the five microsecond delay period of delay multivibrator 1075, the multivibrator 1076 is set causing issuance of the "Team Total" signal. Issuance of this signal causes delay multivibrator 1081 to be triggered issuing a five microsecond assertion level pulse at terminal 1082 on FIGURES 39 and 40. Terminal 1082 causes transfer of all information stored in SR–4 through SR–13 into multivibrators 1001 through 1010. Thus, multivibrators 1001 through 1010 contain the player's accumulated score at the end of his game. At the same time that this transfer occurs, the contents of the player identification stored in SR–20 through SR–22, in FIGURE 40, are transferred to multivibrators 1083 through 1085, respectively. Thus, player's score and player's identification, with the exception of team identification are stored in the subregisters ready for team totaling. The presence of the "Team Total" signal causes a binary zero to be placed on terminal 1078 as shown on FIGURE 41 and thus causes issuance of the "TMT" signal from terminal 2005 on FIGURE 41. This "Team Mark Total" signal signifies to the player sequencer circuits that the team mark total word is to be called into the operating register, and this immediately occurs. Thus, the player word is transferred from the register and the team mark total word is brought into the register. The "Team Total" signal is placed on gate 1086 in FIGURE 40 and on the next timing pulse, multivibrator 1088 is set. If the player bowling is on Team A, the multivibrator 1090 is then set. If the player is on Team B, multivibrator 1089 is set. These two multivibrators only set, however, for the first team totaling of the game. They are not reset until the next game, and therefore, on subsequent team totaling operations for later players, they cannot be reset. They are still set and remain set.

At the time that team totaling is commenced for either team, the marks assigned to that team are in the team mark total word and must be erased prior to team totaling. It is easily seen that this is only necessary the first time team totaling is done for either team and that such erasure is not necessary on subsequent team total operations. For this reason, multivibrators 1090 and 1089 are set only once, that being on the first time team total operations are performed. The setting of these multivibrators causes triggering of the score reset circuitry and resets the complete score register, SR–4 through SR–13. The setting of multivibrator 1088, however, takes place each and every time team totaling is performed. Therefore, the negation output terminal of this multivibrator drops to binary zero every time during the team total cycle, applying a binary zero to one input of NAND gate 1050. This activates NAND gate 1045 and count pulses are issued from terminal 1026. These count pulses cause the score of the player being added to the team total to be transferred, one pulse at a time, from the intermediate register into the operating register. At the same time that this happens, multivibrator 1088 issues a binary one on terminal 1363 of FIGURE 31 causing the comparator to operate as if it were receiving a "Equal" signal. This is necessary because after completion of the add cycle, the player identification stored in the intermediate registers 1083 through 1085 shown in FIGURE 40, must be transferred in parallel to multivibrators 1046 through 1048. The output of these multivibrators is one series of inputs to the comparator circuit. The other inputs to the comparator circuit come from the player sequencer 11. Thus, at this time, no shifting is desired, but the "Equal" signal is not present to prevent shifting, and a false equal signal must be issued by terminal 1363 to prevent shifting. At the conclusion of the adding cycle, terminal 1024, shown in FIGURE 40, becomes binary zero, triggering delay multivibrator 1099 and causing its assertion output to apply binary one to gates 1045 through 1047. This causes a transfer of the player identification stored in multivibrators 1083 through 1085 into multivibrators 1046 through 1048, respectively. At the same time, terminal 1048 issues a "Print Team Total" command to the state and output control unit FIGURE 38, causing setting of the "Print Score" multivibrator 1751. A score print follows. It should be noticed that the score print will occur in a vertical position controlled by the player's identification, and this is the reason for transfer of the player identification into the spot normally occupied by the team total identification in the team mark total word. At the conclusion of the score print cycle, terminal 1815 received the "Score Print Complete" command, a binary one, which remains on this terminal for five microseconds. During this five microsecond time period, multivibrators 1046 through 1048 are set to binary one, reestablishing the team total identification for the team mark total word. Thus, this word re-enters the memory system with its original identification. At the conclusion of the "Score Print Complete" command on terminal 1815, multivibrator 1046 is reset, ending the team total cycle. At the conclusion of the team total cycle, the not team total signal ($\overline{TT}$) on terminal 1078 causes the "End Computation" signals to be issued at terminals 2017, 2021 and 2022 of FIGURE 41.

In the event that league bowling is not being played, the team total cycle is not entered due to the presence of the open signal on terminal 1074 of multivibrator 1073 in FIGURE 40. Thus, no "Team Total" signal exists in the tiimng unit illustrated in FIGURE 43 to inhibit action of the negation output of delay multivibrator 2049 and the "End Computation" signals 2017, 2021 and 2022 are immediately issued after the stop state is reached.

*Out-of-turn bowling*

On occasion, during the course of an evening of bowling, it may be necessary that some player bowl out of turn in order to catch up in order to leave early or for some other reason. This is possible by use of the out-of-turn controls shown in FIGURE 2. These controls are shown on the panel 47 and consist of the switches 48 and 49. Switch 49 is the player selector switch which selects the player who wishes to bowl out of turn. All player numbers 1 through 6, on each Team A and B are found on this indicating switch. The player turns this selector switch to indicate the player number who wishes to bowl out of turn. The connections of this switch are shown in FIGURE 29 and have previously been described. At the time the player is ready to roll the first ball in an out-of-turn sequence, he utilizes switch 48, the out-of-turn bowler lane switch, to select which lane should be credited with the out-of-turn ball. The next ball following use of switch 48 on the lane selected will be credited to player shown by switch 49. Switch 48 is a three-position switch, and when pressed upward, selects lane 1, when pressed downward, selects lane 2. In its center position, neither lane is selected. This switch is shown in FIGURE 33. Multivibrator 1660 is set when switch 48 is moved upward to its lane 1 position. Multivibrator 1661 is set when the switch is moved downward. When the next ball is rolled on lane 1, the $L_1$ signal enters gate 1662 together with the assertion output of multivibrator 1660 and causes issuance of the $\overline{SP}$ signal from terminal 1612. This signal is applied to the player selector switch 49, FIGURE 29, resulting in the issuance of the identification of the player selected on switch 49.

If multivibrator 1661 has been set by pressing the switch 48 downward to the lane 2 position, the $\overline{SP}$ signal will not be issued by terminal 1612 until the lane 2 signal has been received on terminal 1665. It will be noticed that the player bowling on the unselected lane will not be affected by the out-of-turn procedure.

The out-of-turn procedure automatically terminates after each and every ball and therefore, all out-of-turn balls rolled must be preceded by a pressing of switch 48 to the position associated with the lane on which the ball is to be rolled.

*Correction procedure*

The correction controls are recessed behind the hinge panel 60 and are used in conjunction with the player selector switch 49 to make corrections as needed in any printed material previously produced from information received from the scorer.

In making a correction, the player must select, using the controls on panel 62 and switch 49, the last correct frame printed, the score in that frame, and the pinfall relating to each subsequent ball, as well as his own identification. The controls are set up in the following manner.

The player identification of the player needing correction is set on switch 49, the player selector switch. The last correct complete printed frame is set on switch 63 (FIGURE 2). This last correct complete printed frame must be the frame number of the last correct frame where a score was printed. Correct box printings after this point are not considered. The correct score that exists in that last correct printed frame is set up on the score thumbwheel switches 64. These are a series of three frame wheel switches capable of entering any individual player's score. The pinfall on the next ball occurring after the correct printed frame is entered on the pinfall thumbwheel switch 65. Switches 63, 64 and 65 are shown schematically in FIGURE 33, which illustrates the correction and out-of-turn unit. Once the correction procedure is instituted by pressing the "MAKE CORRECTION" switch 66, the player word chosen is locked in the operating register and cannot move. Thereafter, a light is provided behind switch 66 which is lit when all scoring circuits are free, indicating that the scorer is available to perform the required corrections. Switch 66 should not be depressed until this light is on. This light is connected internally to receive the "End Computation" signal so that when no computation is taking place and the "End Computation" signal is on, this light will be lit. When the player presses the "MAKE CORRECTION" switch 66 for the first time, circuits within the correction and out-of-turn unit become locked permanently and remain on until the "CORRECTION COMPLETE" switch 67 is pressed. A single pulse is applied by power amplifier 1606 to the frame thumbwheel switch 63 and to the score thumbwheel switches 64 which cause transferal of the frame information and the score information to the operating register after the player's word has been brought to that register. These switches only receive a pluse from power amplifier 1606 on the first pressing of the "MAKE CORRECTION" switch, since a return to the first frame requiring correction is not desired except during the first correction. The pinfall switch 65, however, receives a pulse each and every time the "MAKE CORRECTION" switch 66 is depressed. The correction procedure occurs then as follows.

The player depresses switch 66 and the scorer proceeds to enter the first pinfall as indicated by thumbwheel switch 65. When the scorer has completed this first correction, the light behind switch 66 will come on again. The player may then select the subsequent ball pinfall using switch 65, and again press switch 66 to indicate the need for the subsequent correction. The light behind switch 66 will then be extinguished, the scorer will proceed with the second correction, and the light will come on again behind switch 66 after this correction. Subsequent settings of switch 65 and pressings of switch 66 continue until the player has caught up with his active bowling game. At this time, switch 67 is pressed releasing the operating register and shifting the player's word back into the memory. The scorer then proceeds with the ordinary scoring of the game of bowling.

*De-energizing the scorer*

Between games, the scorer is normally placed in the stand-by condition, by depressing the front panel "POWER OFF-ON" switch 45, as shown in FIGURE 2, to its downward position momentarily. In case of a power failure, emergency power circuits are activated, as previously described, applying battery power to the scorer to allow it to finish its present computation. When the scorer is de-energized, using "POWER OFF-ON" switch 45, similar circuits are activated in order to insure that no player word is destroyed during shutdown.

Referring to FIGURE 46, at the time when power switch 45 is placed in the "OF" position momentarily, the output of gate 1922 is grounded momentarily causing delay multivibrator 1931 to be triggered and causing the setting of multivibrator 1930. Setting of multivibrator 1930 applies binary one to one of the inputs of solenoid driver 1932. This particular input has formerly been at binary zero, allowing the solenoid driver 1932 to remain locked in its "ON" position. Upon energizing delay multivibrator 1931, its negation output terminal applies binary zero to solenoid driver 1932. Prior to energization of delay multivibrator 1931, this negation output terminal of the delay multivibrator applies binary one to the solenoid driver. Thus, up to and including the delay period of delay multivibrator 1931, at least one input of the solenoid driver 1932 has remained at binary zero thus holding the relay 1933 in its energized condition. However, after the delay period, which is 1.2 seconds in duration, both inputs of solenoid driver 1932 become binary one at the same time permitting the solenoid driver to be de-energized and opening the power relay 1920. Prior to this, however, during the 1.2 second delay of delay multivibrator 1931, multivibrator 1921 has been reset applying a binary one to solenoid driver 1924 causing the output relay of this solenoid driver, relay 1925, to be de-energized. This removes all power from the momeroy supply 1916 and prevents further shifting in the memory circuitry. Thus, approximately 1.2 second prior to total de-energization of all circuits, the memory is cut off, so that no transient introduced in the system during removal of the computing voltages from bus bars 1906, 1907 and 1908 can cause any destruction of information within the memory system of the scorer. The computer is now in its stand-by condition and may be re-energized, as previously described, at any time.

If it is desired to completely shut down the scoring system, the scorer is first placed in the stand-by condition, as previously indicated, and the main power switch 31 moved to its downward position. This interrupts alternating current power to the scoring device and to all convenience outlets located on the scorer. It is unnecessary to de-energize any of the other power supply switches, for example, switches 32 through 34, 36 or 41, because all power is completely removed by action of the main power switch 31.

What is claimed is:

1. An apparatus for scoring a bowling game for a multiplicity of players comprising: means for receiving pinfall information for a multiplicity of players, a single computation means for computing bowling scores for said multiplicity of players connectable to said receiving means, a multi-player storage means for storing scores earned by said multiplicity of players connectable to said single computation means, means for providing said single computation means with any one of the stored scores in said multi-player storage means, and a single control means connected to said single computation means for directing the computation of bowling scores for each of said multiplicity of players.

2. An apparatus for scoring a bowling game as specified in claim 1, wherein said multi-player storage means is connectable to said single computation means through a single register in which the computation means accomplishes all score totalizing.

3. An apparatus for scoring a bowling game as specified in claim 2, wherein said pinfall receiving means includes a storage means for receiving a first ball pinfall and a register for receiving a second ball pinfall.

4. A bowling scorer as specified in claim 2, wherein said register consists of a series of bi-stable electronic circuits.

5. A bowling scoring device for scoring a multiplicity of bowling games simultaneously played on a multiplicity of bowling lanes by a multiplicity of players where each game consists of a number of scoring frames, each including pinfall related to the rolling of at least one ball by a player, comprising: means for receiving pinfall information indicative of the rolling of a first ball and of the rolling of a second ball of each scoring frame for a multiplicity of players bowling on a multiplicity of bowling lanes, a single computation means for computing bowling scores attributable to each pinfall total for said multiplicity of players connectable to said receiving means for sequentially accepting and processing said first and second ball pinfall information, a multi-player storage means for storing scores earned by said multiplicity of players connectable to said computation means and control means connected to said computation means for directing said computation means to accept pinfall information for a given player bowling on one of said multiplicity of lanes from said receiving means without waiting for second ball pinfall information for another player bowling on another of said multiplicity of lanes to be available in the receiving means after said other player's first ball information has been accepted and processed by the computation means.

6. The invention of claim 5 wherein said control means comprises means operative after both first and second ball pinfalls to cause said single computation means to perform the scoring computation required, and means operative after the computation performed after both first and second ball pinfalls for writing the results of such computation into said memory for subsequent use in succeeding computations for the associated player whereby said single computation means is cleared after each pinfall in readiness to accept scores and pinfall information for any one of said multiplicity of players bowling on any one of said multiplicity of lanes.

7. A bowling scoring device for scoring a team bowling game, wherein a bowling team alternates its bowling on two lanes and wherein two players of the team may simultaneously bowl on two lanes, comprising: means for receiving pinfall information for players of a team simultaneously bowling on two lanes, a single computation means for computing bowling scores for the players connectable to said receiving means, a multi-player storage means for storing scores earned by said team players connectable to said computation means, and a single control means connected to said computation means for control thereof for directing the computation of player scores of a team simultaneously bowling on two lanes.

8. An apparatus for scoring a bowling game, wherein a multiplicity of players bowl and the past history of each player's frame-by-frame and ball-by-ball scoring is indicative of the state of the player's game when subsequent pinfall is supplied which is indicative of the player's subsequent rolling of a bowling ball, comprising: means for supplying pinfall information for a multiplicity of players indicative of each player's pinfall resulting from either a first ball or a second ball in a frame, means for receiving each player's pinfall information connectable to said pinfall supplying means, a single computation means for computing bowling scores for said multiplicity of players connectable to said receiving means, a multi-player storage means for storing scores earned by said multiplicity of players connectable to said single computation means, and a single control means connected to said single computation means and connectable to said storage means for directing the computation of each score based on the respective player's state, said control means including means for computing the state of a player's game subsequent to each pinfall.

9. An apparatus for scoring a bowling game as specified in claim 8, wherein said control means provides a formula for dictating the computation of each score based on the respective player's state and said single computation means computes each score in accordance with the formula provided by said control means.

10. A bowling scoring device for scoring a multiplicity of bowling games simultaneously played on a multiplicity of bowling lanes by a multiplicity of players wherein each game consists of a number of scoring frames, each including pinfall related to the rolling of at least one ball by a player and wherein the past history of each player's frame-by-frame and ball-by-ball scoring is indicative of the state of the player's game when subsequent pinfall is supplied which is indicative of the player's subsequent rolling of a bowling ball, comprising: means for supplying pinfall information for a multiplicity of players bowling on a multiplicity of lanes which is indicative of each player's pinfall resulting from either a first ball or a second ball in a frame, means for receiving pinfall information indicative of the rolling of a first ball and of the rolling of a second ball of each scoring frame for the multiplicity of players connectable to said pinfall supplying means, a computation means for computing bowling scores attributable to pinfall information for each of said multiplicity of players connectable to said receiving means for sequentially accepting and processing said first and second ball pinfall information, a multi-player storage means for storing a score and the state of each player's game for said multiplicity of players connectable to said computation means, and a control means connected to said computation means and connectable to said storage means for directing said computation means to accept pinfall information for a given player from said receiving means without waiting for second ball pinfall information for another player to be available in the receiving means after said other player's first ball pinfall information has been accepted and processed by the computation means and to compute a score for each player based on the player's state, said control means including means for computing the state of a player's game subsequent to each pinfall.

11. A bowling scoring device for scoring a bowling game, wherein a multiplicity of players bowl in accordance with a predetermined set of rules which prescribes scoring resulting from each pinfall indicative of each rolling of a bowling ball by each player, comprising: means for receiving pinfall information indicative of every roll of a ball by each of a multiplicity of players, a control means for providing a formula for dictating the computation of scores resulting from each pinfall, a single computation means connectable to said control means and to said receiving means for computing bowling scores for said multiplicity of players resulting from each pinfall in accordance with the formula provided by said control means, and a multi-player storage means connectable to said computation means and said control means for storing prior scoring data of said multiplicity of players.

12. A bowling scoring device for scoring a multiplicity of bowling games simultaneously played on a multiplicity of bowling lanes by a multiplicity of players in accordance with a predetermined set of rules, which prescribes a number of scoring frames, each including pinfall related to the rolling of at least one ball by a player, and which prescribes scoring resulting from each pinfall, comprising: means for receiving pinfall information indicative of the rolling of every first ball and of the rolling of every second ball of each scoring frame for a multiplicity of players bowling on a multiplicity of bowling lanes, a computation means for computing bowling scores attributable to each pinfall total for said multiplicity of players connectable to said receiving means for sequentially accepting and processing said first and second ball pinfall information, a storage means for storing prior scoring data for said multiplicity of players connectable to said computation means, and control means connected to said computation means and connectable to said storage means for directing said computation means to accept pinfall information for a given player from said receiving means without waiting for second ball pinfall information for another player to be available in the receiving means after said other player's first ball pinfall information has been accepted and processed by the computation means and for providing a formula for dictating the computation of scores resulting from each pinfall by said computation means.

13. An apparatus for scoring a set of league bowling games wherein a pair of bowling teams alternate their bowling on a pair of lanes, wherein each team starts bowling each game of the set on the opposite lane from the lane on which it started bowling the previous game, comprising: means for supplying pinfall information for players of two teams bowling a set of league bowling games, means for receiving pinfall information connected to said supplying means, means for effecting bowling scoring for said players of said teams connectable to said receiving means, and automatic means for determining a lane upon which a team is bowling at any time during the playing of a set of league bowling games, connectable to said receiving means for receiving an indication that a pinfall relating to one of said lanes has been received by the receiving means and connectable to said means for effecting scoring to indicate the player whose pinfall has been received by the receiving means, said determining means including means for automatically indicating that a team has changed lanes between the end of one game of a set and the subsequent game of the set.

14. An apparatus for scoring a bowling game wherein a multiplicity of players bowl, comprising: means for receiving pinfall information for a multiplicity of players, computation means for computing bowling scores for said multiplicity of players connectable to said receiving means, multi-player storage means for storing scores earned by said multiplicity of players connectable to said single computation means, control means connected to said computation means for control thereof, a power supply connected to said receiving, computation and storage means to supply power thereto and adapted to normally receive electrical power from an external source, an emergency source of electrical power connected to supply electrical power to said receiving computation and storage means when said external electrical power source fails, means for detecting a failure of said external electrical power source connected to said external source, means for disconnecting said emergency source from said receiving, computation and storage means, and means for determining the completion of a computation and the storing of a resulting score in said receiving, computation and storage means connected to said disconnecting means to actuate it upon the completion of the computation and the storing of the resulting score.

15. A bowling scoring device for scoring bowling games, wherein a multiplicity of players bowl and wherein the past history of a player's frame-by-frame and ball-by-ball scoring is indicative of the state of a player's game, comprising: means for receiving pinfall information for a multiplicity of players, a computation means for computing bowling scores for each of said multiplicity of players connectable to said receiving means, a control means connectable to said computation means for directing the computation of bowling scores for each of said multiplicity of players, and a multi-player storage means having a code word for each player containing player information and connectable to said computation means and said control means for utilization of the player information in the computing of bowling scores.

16. A bowling scorer as specified in claim 15, wherein each player code word contains a player's identification, and said device further includes means for selecting a player code word from said storage means by said player's identification.

17. A bowling scorer as specified in claim 15, wherein said computation means includes a register for receiving a player's score and each player code word contains a player's score.

18. A bowling scorer as specified is claim 15, wherein said control means includes a register for receiving the state of a player's game and each player code word contains the state of a player's game.

19. A bowling scorer as specified in claim 15, wherein said device further includes a register for receiving a player's frame and each player code word contains frame information.

20. A bowling scorer as specified in claim 15, wherein said multiplayer memory is electronic and includes a plurality of bits for team code words, each containing a team's mark total score.

21. A bowling scorer as specified in claim 15 wherein said computation means includes a first register for receiving a player's score; said control means includes a second register for receiving the state of a player's game; said device further including a third register for receiving a player's frame; and each said player code word contains the player's score, the state of the player's game and the player's frame.

22. In an apparatus for scoring a team bowling game wherein the scores of a plurality of players bowling as a team are added to form a team total, the combination of: an operating register, means connected to the operating register for transferring player and team code words containing player and team scores into and out of said operating register, a second register connected to said operating register to receive a player's coded score when the player's coded word is positioned in said operating register and to add a player's score contained in the second register to the score in a team coded word when the team word has been transferred into the operating register.

23. The invention of claim 22 further including means for receiving pinfall information relative to said plurality of players bowling as a team, memory means for storing said player scores during the progress of a bowling game, and computation means including said operating register for utilizing pinfall information obtained from said receiving means for computing said player scores.

24. The invention of claim 22 wherein said operating register comprises a binary up counter formed of a plurality of bi-stable electronic elements and said second register comprises a binary down counter comprised of a plurality of bi-stable electronic elements; and control means for said second register comprising means operative at a predetermined point in a bowling game for loading a player score contained in said operating register into said second register, electronic clock means for simultaneously causing said second register to count downwardly and said operating register to count upwardly, means operative subsequent to said loading means for effectively enabling said clock means, and means operative when said second register has been counted down to zero for effectively disabling said clock means.

25. A device for scoring a bowling game wherein a multiplicity of team players bowl and wherein an individual player handicap is to be entered into at least one player's score, comprising: means for receiving pinfall information for a multiplicity of players, a computation means for computing bowling scores for said multiplicity of players connectable to said receiving means, multi-player storage means for storing scores earned by said multiplicity of players connectable to said computation means, a first selecting means for indicating a player whose score is to have an individual handicap value added thereto connectable to said storage means to cause the storage means to make the indicated player's score available to said computation means for adding the handicap value, a second selecting means for indicating the handicap value to be added to the indicated player's score connectable to said computation to cause said computation means to add said handicap value to the player's score.

26. An apparatus for scoring a team bowling game, comprising: means for receiving pinfall information for a multiplicity of players bowling on a team, a single computation means for computing bowling scores for said multiplicity of players connectable to said receiving means, a multi-player storage means for storing scores earned by said multiplicity of players and a team subtotal score connectable to said computation means, an indicating means connected to said storage means for providing team subtotal score information, and a control means connected to said computation means, connectable to said storage means and connectable to said score indicating means for directing the computation of individual player total scores and the computation of a team subtotal score after each individual player total score is computed and for directing said indicating means to indicate each said team subtotal score after it is computed.

27. An apparatus for scoring a bowling game wherein a multiplicity of players bowl each bowling frame in a predetermined sequence and it becomes necessary to pass by a player who is not prepared to bowl in proper sequence, comprising: means for receiving pinfall information for a multiplicity of players, a computation means for computing bowling scores connectable to said receiving means for sequentially receiving pinfall for said players, a binary electronic counter for indicating an identification number for a player in a predetermined sequence of players whose pinfall will next be received by said computation means, a multi-player storage means for storing scores earned by said multiplicity of players connectable to said computation means and to said binary electronic counter for providing the stored score of each player to said computation means when said counter indicates the identification number of the player, an automatic switching means connected to said binary electronic counter and to said computation means to cause the counter to count upward one player identification number whenever the computation means completes computing bowling scores resulting from a player's pinfall it has received from said receiving means, a manually operated switching means connected to said binary electronic counter to cause the counter to count upward one player identification number whenever said switching means is manually actuated.

28. An apparatus for scoring a bowling game wherein a multiplicity of players bowl each bowling frame in a predetermined sequence and it becomes necessary to allow an out-of-turn player to bowl between two players who are bowling in the predetermined sequence: means for receiving pinfall information for a multiplicity of players, a computation means for computing bowling scores connectable to said receiving means for sequentially receiving pinfall for said players, a binary electronic counter for indicating a binary identification number for a player in a predetermined sequence of players whose pinfall will next be received by said computation means, a manually operated selecting means for indicating a binary identification number for an out-of-turn player who is bowling between two players who are bowling in the predetermined sequence, a multiplayer storage means for storing scores earned by said multiplicity of players normally connected to said computation means and to said binary electronic counter for providing the stored score of each player to said computation means when said counter indicates the identification of the player, and a manually operated switching means for connecting said storage means to said manually operated identification number selecting means and disconnecting the storage means from said binary electronic counter to provide the stored score of the out-of-turn player indicated by the selecting means.

29. An apparatus for scoring team bowling games wherein a multiplicity of team players bowl and wherein a team handicap is to be entered into a team total score, comprising: means for receiving pinfall information for a multiplicity of players, a computation means for computing bowling scores for said multiplicity of players connectable to said receiving means, a multi-player storage means having a code word for each player which contains the player's score and a code word for the team total score connectable to the computation means through an electronic binary register in which the computation means accomplishes score totalizing, a first manually operated selecting means for indicating a code word for a team whose score is to have a handicap value added thereto connectable to said storage means to have the storage means place the code word for the indicated team in the register, a second manually operated selecting means for indicating the handicap value to be added to the team's score connectable to said computation means to cause said computation means to add said handicap value to the score contained in the code word in the register.

30. An apparatus for scoring team bowling games wherein a multiplicity of team players bowl and wherein an absent player's score is to be entered into a team total score, comprising: means for receiving pinfall information for a multiplicity of players, a computation means for computing bowling scores for said multiplicity of players connectable to said receiving means, a multi-player storage means having a code word for each player which contains the player's score and a code word for the team total score connectable to the computation means through an electronic binary register in which the computation means accomplishes score totalizing, a first manually operated selecting means for indicating a code word for an absent player whose score is to be added into the team total score connectable to said storage means to have the storage means place the code word for the indicated absent player in the register, a second manually operated selecting means for indicating the absent player's score to be added to the team total score connectable to said computation means to cause said computation means to place the absent player's score in the code word in the register.

31. An apparatus for scoring a team bowling game wherein teams of different numbers may be scored, comprising: means for receiving pinfall information for a multiplicity of players, a computation means for computing bowling scores connectable to said receiving means for sequentially receiving pinfall for said players, a binary electronic counter for indicating a binary identification number for a player in a predetermined sequence of players whose pinfall will next be received by said computation means connected to said computation means to receive a signal indicative of a completed computation resulting from a pinfall, a manually operated team size selection switching means for manually indicating the number of players bowling on a team, an electronic multiple gate circuit connected to said electronic counter and to said switching means for issuing a signal to said counter to cause said counter to indicate a first player on another team when the counter receives a signal from the computation means, and a multi-player storage means for storing scores earned by said multiplicity of players normally connected to said computation means and to said binary electronic counter for providing the stored score of each player to said computation means when said counter indicates the identification of the player.

32. An apparatus for scoring a bowling game wherein a multiplicity of players bowl on a lane, comprising: means for receiving pinfall information for a multiplicity of players, a computation means for computing bowling scores connectable to said receiving means for sequentially receiving pinfall for said players, a binary electronic counter for indicating a binary identification number for a player in a predetermined sequence of players whose pinfall will next be received by said computation means connected to said computation means to receive a signal indicative of a completed computation resulting from a pinfall, a manually operated selection switching means for manually indicating the number of players bowling on a lane, an electronic multiple gate circuit connected to said electronic counter and to said switching means for issuing a signal to said counter to cause said counter to indicate a first player in said sequence when the counter receives a signal from the computation means, and a multi-player storage means for storing scores earned by said multiplicity of players normally connected to said computation means and to said binary electronic counter for providing the stored score of each player to said computation means when said counter indicates the identification of the player.

33. An apparatus for scoring a bowling game wherein a multiplicity of players bowl, comprising: means for receiving pinfall information for a multiplicity of players, an electronic computation means for computing bowling scores to be printed for said multiplicity of players connectable to said receiving means, a multi-player electronic storage means for storing scores earned by said multiplicity of players connectable to said computation means, an electronic code indicating means connectable to said storage means and adapted to be connected to a printer to produce electronic signals usable for the control of a printing means, and an electronic control means connected to said computation means for directing the computation of bowling scores to be printed and connectable to said indicating means for directing the producing of electronic signals usable for the control of a printing means.

34. An apparatus for scoring a bowling game wherein a multiplicity of players bowl on a plurality of bowling lanes, comprising: means for receiving pinfall information for a multiplicity of players bowling on a plurality of lanes, means for matching pinfall information with a player's identification, a single computation means for computing bowling scores for said multiplicity of players connectable to said receiving means, a multi-player storage means for storing scores earned by said multiplicity of players connectable to said single computation means and connected to said matching means to supply a player's score to said computation means after said matching means matches a player's identification to pinfall information recorded by said receiving means, and a control means connected to said single computation means for directing the computation of bowling scores for each of the players.

35. An apparatus for scoring a bowling game having a multiplicity of scoring frames in which pinfall occurs from the rolling of at least one bowling ball, comprising: electronic means for receiving pinfall information, a computation means connectable to said electronic pinfall receiving means, an electronic storage means for storing scores earned by a player as a bowling game progresses connectable to said computation means, and electronic control means connected to said computation means for directing the computation of bowling scores.

36. An apparatus for scoring a bowling game having a multiplicity of scoring frames in which pinfall occurs from the rolling of at least one bowling ball, comprising: means for receiving pinfall information, a computation means connectable to said pinfall receiving means and including electronic means for adding pinfall to a stored score to produce a new score, an electronic storage means connectable to the electronic adding means to supply a stored score, and a control means connected to said computation means for directing the computation of bowling scores.

37. In a bowling scoring apparatus for computing the cumulative bowling scores of a plurality of players for each frame in a bowling game wherein the scores are based upon pinfall earned and bonus values for strikes and spares, the combination of: means for providing pinfall information relative to each of said plurality of players; a single counting register comprised of a plurality of bi-stable electronic elements, said register having at least one input for receiving said pinfall information and for receiving cumulative score information relative to each of said plurality of players; a multi-player electronic memory comprised of a multiplicity of bi-stable bits, said multiplicity of bits forming a plurality of words, one for each of said plurality of players, each word being adapted to contain cumulative score and computation control information based upon the past pinfall history of the player for its associated player; a single computation control register comprised of a plurality of bi-stable electronic elements for reciving said computation control information relative to each of said plurality of players; means for reading the contents of a selected one of said plurality of words in said memory corresponding to a selected one of said plurality of bowlers into said registers so that said cumulative score information will be placed in said counting register and said computation control information will be placed in said computation control register; means, including a first electronic gating circuit, responsive to the computation control information in said computation control register for causing the addition of said pinfall information to said cumulative score information for each of said plurality of players in said counting register including bonus values for strikes and spares in accordance with said computation control information to compute the updated cumulative score for each frame for the corresponding one of said plurality of bowlers; means, including a second electronic gating circuit, responsive to said computation control information and to said pinfall information for updating the computation control information for each of said plurality of players whereby the updated computation control information may be subsequently used to direct subsequent computation; and means for writing said updated cumulative score and said updated computation control information into the memory word for the corresponding one of said plurality of players whereby the information may be subsequently utilized in the computation of subsequent cumulative scores for the corresponding player.

38. A bowling scoring apparatus that is suited for simultaneous computing of bowling scores of bowling games rolled on a plurality of lanes according to claim 37 further including a plurality of said pinfall information providing means, one for each of said plurality of lanes, each of said pinfall information providing means being operable after each ball is rolled on the corresponding lane; means for operating said reading means after each operation of any one of said plurality of pinfall information providing means so that computation may take place as required; and means for operating said writing means after each operation of said reading means to preserve the information in said registers in said memory for use in subsequent computation whereby said registers may be cleared without destroying information in readiness to accept information relative to another player bowling on another lane.

39. A bowling scoring apparatus according to claim 37 further including bowling score error correction means; said error correction means comprising: means for selecting the word in the memory corresponding to the player whose bowling score is to be corrected and for causing said reading means to read said selected word into said registers, means for entering correct bowling score information into said registers, and means for causing said writing means to write said selected word containing said correct bowling score information into said memory whereby said corrected bowling score information may be used for subsequent computation.

40. In a bowling scoring device for simultaneously computing bowling scores achieved by a plurality of players bowling on a plurality of lanes, the combination of: means for providing pinfall information after each ball is rolled relative to each of said plurality of bowlers bowling on each of said plurality of lanes; computation means connectable to said pinfall information providing means for computing the bowling scores of each of the plurality of players; memory means including means associated with each of said plurality of players for storing information relative to the past history of the bowling game bowled by each respective one of said plurality of players; a single control means for receiving past history information after each ball is rolled and for actuating said computation means to cause the latter to perform such computation as may be required by said past history information after pinfall information is provided after each ball is rolled; player identification means for associating pinfall information with the player achieving the same; and means associated with said player identification means for providing said single control means with the past history information from said storing means that corresponds to the player whose pinfall information has been provided by said pinfall information providing means after each ball is rolled, whereby pinfall information of one player may be processed by said scoring device after another player has rolled a first ball in a frame and before said another player has rolled a second ball in a frame.

41. The bowling scoring device of claim 40 further including a plurality of temporary storage means, one for each of said plurality of lanes, for storing first ball pinfall information for subsequent use in the event an illegal ball is rolled as the second ball in a frame, said temporary storage means being connected to said pinfall information providing means and connectable to said computation means.

42. The bowling scoring device of claim 40 wherein said past history information is stored as one of at least the following states of a player's game— first: first ball following an open frame
second: first ball following a single strike
third: second ball in an open frame (if not preceded by a strike)
fourth: first ball following two strikes
fifth: second ball in a frame following a strike
sixth: first ball following a spare said scoring device further including means for receiving said pinfall information and said past history information in the form of one of said states and for updating said state after each ball bowled by a player for subsequent use in directing computation of that player's score following the rolling of the next succeeding ball by that player.

43. The bowling scoring device of claim 42 wherein said updating means comprises an electronic gating matrix having inputs for receiving signals representative of the existence of any one of said states and a signal representative of a pinfall of ten, and outputs for providing signals representative of the updated state.

44. In a bowling scorer for calculating scores of a bowling game wherein balls are rolled during each of a succession of scoring frames, the combination of: a means for receiving pinfall information, means for totalizing pinfall information connected to said pinfall receiving means, and means for producing frame and total game scores connected to said totalizing means, said totalizing means and said score producing means comprising semiconductor electronic elements.

45. The bowling scorer of claim 44 further including a memory having a code word for each of a multiplicity of players of which a portion of each word is a player's identification code, means for selecting an identification code of a player, and a comparator for comparing the identification code selected by said selecting means and the identification code portion of each of said code words.

46. A bowling scorer as specified in claim 44, wherein said score producing means includes means for producing individual ball scores for both the first and second balls rolled during each frame.

47. A bowling scorer as specified in claim 44, wherein said score producing means includes means for producing ball scores, frame scores, total game scores, and total team scores.

48. A bowling scorer as specified in claim 44, wherein said totalizing means includes a memory containing a code word for each one of a multiplicity of players and a single computing unit connected to said memory to receive any one of said words for totalizing pinfalls for each of said multiplicity of players.

49. A bowling scorer as specified in claim 48, wherein each said word contains the determinable earned score of a player at a given point in a bowling game and an instruction for subsequent computation of a score; and said computing unit is connectable to said memory to receive at least one of said words for totalizing pinfall counts in accordance with the instruction of said word; and wherein said score producing means includes means for computing a new instruction; and means for returning said one word to said memory.

50. The bowling scorer of claim 48 wherein said memory is an electronic serial memory containing a binary code word for each one of a multiplicity of players.

51. A bowling scorer as specified in claim 50, wherein said totalizing means includes an electronic serial register connected to said memory to receive said words sequentially and means for sequentially shifting said words from said memory to said register and from said register to said memory.

References Cited

UNITED STATES PATENTS

| | | | |
|---|---|---|---|
| 2,590,444 | 3/1952 | Millman et al. | |
| 3,043,593 | 7/1962 | Koci. | |
| 3,093,374 | 6/1963 | Rothberg et al. | 235—151 X |
| 3,124,355 | 3/1964 | Mentzer et al. | 235—151 X |
| 3,184,583 | 5/1965 | Bawtinheimer | 273—54 X |
| 3,202,803 | 8/1965 | Markstrom | 235—92 |

MALCOLM A. MORRISON, *Primary Examiner.*

MARTIN P. HARTMAN, *Examiner.*

I. KESCHNER, *Assistant Examiner.*